US012797834B2

(12) United States Patent
Lin et al.

(10) Patent No.: US 12,797,834 B2
(45) **Date of Patent: *Nov. 17, 2026**

(54) CORE-SHELL MOLECULAR SIEVE CONTAINING PHOSPHORUS AND METAL, SYNTHESIS THEREOF, AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Wei Lin, Beijing (CN); Peng Wang, Beijing (CN); Lei Han, Beijing (CN); Haitao Song, Beijing (CN); Xiang Zhou, Beijing (CN); Lixia Wang, Beijing (CN); Zhenbo Wang, Beijing (CN); Yaoqing Guo, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 888 days.

This patent is subject to a terminal disclaimer.

(21) Appl. No.: 18/003,220

(22) PCT Filed: Jun. 24, 2021

(86) PCT No.: PCT/CN2021/102013

§ 371 (c)(1),
(2) Date: Dec. 23, 2022

(87) PCT Pub. No.: WO2021/259348

PCT Pub. Date: Dec. 30, 2021

(65) Prior Publication Data

US 2023/0330648 A1 Oct. 19, 2023

(30) Foreign Application Priority Data

Jun. 24, 2020 (CN) ........................ 202010590438.5

(51) Int. Cl.

| | |
|---|---|
| ***B01J 29/46*** | (2006.01) |
| ***B01J 29/40*** | (2006.01) |
| ***B01J 29/70*** | (2006.01) |
| ***B01J 29/80*** | (2006.01) |
| ***B01J 35/00*** | (2024.01) |
| ***B01J 35/40*** | (2024.01) |
| ***B01J 35/45*** | (2024.01) |
| ***B01J 35/61*** | (2024.01) |
| ***B01J 35/64*** | (2024.01) |
| ***B01J 35/70*** | (2024.01) |
| ***B01J 35/77*** | (2024.01) |
| ***B01J 37/02*** | (2006.01) |
| ***B01J 37/08*** | (2006.01) |

(52) U.S. Cl.

CPC ............. *B01J 29/46* (2013.01); *B01J 29/405* (2013.01); *B01J 29/7007* (2013.01); *B01J 29/80* (2013.01); *B01J 35/19* (2024.01); *B01J 35/40* (2024.01); *B01J 35/45* (2024.01); *B01J 35/615* (2024.01); *B01J 35/617* (2024.01); *B01J 35/647* (2024.01); *B01J 35/70* (2024.01); *B01J 35/77* (2024.01); *B01J 37/0207* (2013.01); *B01J 37/0236* (2013.01); *B01J 37/08* (2013.01); *B01J 2229/18* (2013.01); *B01J 2229/40* (2013.01); *B01J 2229/62* (2013.01); *B01J 2235/05* (2024.01); *B01J 2235/15* (2024.01)

(58) Field of Classification Search

CPC ........ B01J 29/7007; B01J 29/80; B01J 29/46; B01J 35/45; B01J 35/19; B01J 35/647; B01J 35/615; B01J 35/77; B01J 35/70; B01J 35/617; B01J 35/40; B01J 2235/05; B01J 29/405; B01J 37/0207; B01J 37/0236; B01J 37/08

See application file for complete search history.

(56) References Cited

U.S. PATENT DOCUMENTS

| | | | | |
|---|---|---|---|---|
| 5,972,205 | A | 10/1999 | Tsang et al. | |
| 2023/0347330 | A1* | 11/2023 | Han | B01J 29/40 |

FOREIGN PATENT DOCUMENTS

| | | | | |
|---|---|---|---|---|
| CN | 1872685 | A | | 12/2006 |
| CN | 101885493 | A | * | 11/2010 |
| CN | 101885664 | A | | 11/2010 |
| CN | 103785457 | A | * | 5/2014 |
| CN | 103785458 | A | | 5/2014 |
| CN | 103787357 | A | | 5/2014 |
| CN | 103787358 | A | | 5/2014 |

* cited by examiner

*Primary Examiner* — Yong L Chu
(74) *Attorney, Agent, or Firm* — NKL Law; Allen Xue

(57) ABSTRACT

A phosphorus- and metal-containing core-shell molecular sieve has a core composed of a ZSM-5 molecular sieve, and a shell composed of a β molecular sieve. The phosphorus- and metal-containing core-shell molecular sieve has a phosphorus content, calculated as $P_2O_5$, of 1-10 wt %, and a metal content, calculated as metal oxide, of 0.1-10 wt %, based on the dry weight of the phosphorus- and metal-containing core-shell molecular sieve. It shows an $^{27}Al$ MAS NMR with a ratio of the area of a resonance signal peak at a chemical shift of 39±3 ppm to the area of a resonance signal peak at a chemical shift of 54±3 ppm of 0.01-∞:1.

19 Claims, 3 Drawing Sheets

CORE-SHELL MOLECULAR SIEVE CONTAINING PHOSPHORUS AND METAL, SYNTHESIS THEREOF, AND APPLICATION THEREOF

CROSS REFERENCE TO RELATED APPLICATIONS

This application is a U.S. national stage entry of PCT international application no. PCT/CN2021/102013, filed on Jun. 24, 2021, which claims the priority of Chinese patent application No. 202010590438.5, titled "a phosphorus- and metal-containing core-shell molecular sieve and method for synthesizing the same", filed on Jun. 24, 2020, the content of each is incorporated herein by reference in its entirety.

TECHNICAL FIELD

The present application relates to the technical field of catalytic materials, particularly to a phosphorus- and metal-containing core-shell molecular sieve, its synthesis and application thereof.

BACKGROUND ART

Zeolite molecular sieves are widely used in petroleum refining and processing, in which ZSM-5 molecular sieves having MFI structure and β molecular sieves having BEA structure are two molecular sieves that are widely used in industry. ZSM-5 belongs to the orthorhombic system, and has unit cell parameters a=20.07 Å, b=19.92 Å, c=13.42 Å, of which the number of Al atoms in the unit cell can be varied within a range from 0 to 27, the silica-alumina ratio may vary over a large range; the framework of ZSM-5 comprises two interdigitated 10-membered ring channel systems, in which one type of channels are S-curved with a pore diameter of 5.5 Å×5.1 Å; the other type of channels are linear with a pore diameter of 5.3 Å×5.6 Å. β molecular sieves are the only macroporous high-silica zeolite having a three-dimensional structure and a crossed twelve-membered ring channel system ever discovered. Due to its special structure, the molecular sieve has both acid catalysis property and structural selectivity, has good thermal and hydrothermal stability, moderate acidity and acid stability and hydrophobicity, and shows the characteristics of difficult coking and long service life in hydrocarbon reaction in catalysis applications.

Originally synthesized ZSM-5 molecular sieves and β molecular sieves cannot achieve desired effects in some cases when being used directly, and therefore modification of the originally synthesized ZSM-5 molecular sieves and β molecular sieves is needed for different reactions, for example, in order to provide the molecular sieves with better selectivity to propylene in catalytic cracking, modification by introduction of metals into ZSM-5 molecular sieves and β molecular sieves is under study, and the use of ZSM-5 molecular sieves in combination with β molecular sieves for converting hydrocarbon oils has also been studied in prior arts. However, no prior art is directed to how to provide ZSM-5 molecular sieves and β molecular sieves with better catalytic cracking effects.

DISCLOSURE OF THE INVENTION

It is an object of the present application to provide a novel core-shell molecular sieve, its synthesis and application thereof, which shows better performance in catalytic conversion of hydrocarbon oils, such as higher propylene selectivity.

To achieve the above object, in an aspect, the present application provides a phosphorus- and metal-containing core-shell molecular sieve, having a core composed of a ZSM-5 molecular sieve, and a shell composed of a β molecular sieve, wherein the phosphorus- and metal-containing core-shell molecular sieve has a phosphorus content, calculated as $P_2O_5$, of 1-10 wt %, and a metal content, calculated as metal oxide, of 0.1-10 wt %, based on the dry weight of the phosphorus- and metal-containing core-shell molecular sieve; and the phosphorus- and metal-containing core-shell molecular sieve shows an $^{27}$Al MAS NMR with a ratio of the area of a resonance signal peak at a chemical shift of 39±3 ppm to the area of a resonance signal peak at a chemical shift of 54±3 ppm of 0.01-∞:1.

In another aspect, the present application provides a method for synthesizing a phosphorus- and metal-containing core-shell molecular sieve, comprising a step of loading phosphorus and metal on a hydrogen-type core-shell molecular sieve and calcining, wherein the core of the hydrogen-type core-shell molecular sieve is composed of a ZSM-5 molecular sieve, the shell of the hydrogen-type core-shell molecular sieve is composed of a β molecular sieve, and the sodium content, calculated as sodium oxide, of the hydrogen-type core-shell molecular sieve is not more than 0.2 wt %.

Preferably, the metal is selected from Fe, Co, Ni, Ga, Zn, Cu, Ti, K, Mg, or combinations thereof.

In yet another aspect, the present application provides a catalyst comprising, on a dry basis and based on the weight of the catalyst, 30-85 wt % of a carrier, 5-50 wt % of a phosphorus- and metal-containing core-shell molecular sieve according to the present application, and 0-55 wt % of an additional molecular sieve.

Preferably, the phosphorus- and metal-containing core-shell molecular sieve has a sodium content, calculated as $Na_2O$, of no more than 0.2 wt %, more preferably no more than 0.1 wt %.

In yet another aspect, the present application provides a process for the catalytic conversion of a hydrocarbon-containing feedstock, comprising a step of contacting the hydrocarbon-containing feedstock with the catalyst according to the present application.

The phosphorus- and metal-containing core-shell molecular sieve material according to the present application has at least one of the following advantages:

(1) a relatively higher hydrothermal stability;

(2) higher propylene yield, relatively higher ethylene yield, higher heavy oil conversion activity and/or relatively higher liquefied gas yield when being used for catalytic conversion of hydrocarbon oils; and (3) lower coke selectivity as compared to existing ZSM-5 and β molecular sieves containing phosphorus and metal.

The phosphorus- and metal-containing core-shell molecular sieves according to the present application can be used in hydrocarbon conversion reactions such as catalytic cracking reactions, alkylation reactions, and isomerization reactions. When used as an active component of a catalyst or promoter in catalytic cracking or deep catalytic cracking processes, the core-shell molecular sieve according to the present application shows a good effect on hydrocarbon oil conversion. For example, when a catalyst comprising the core-shell molecular sieve is used for catalytic cracking of hydrocarbon oils comprising naphthenic ring, it shows a high propylene yield and/or ethylene yield.

In the method for synthesizing the core-shell molecular sieve according to the present application, by introducing phosphorus and metal into the hydrogen-type core-shell molecular sieve, a core-shell molecular sieve with good performance can be obtained. In preferred cases, the core in the resulting modified core-shell molecular sieve is fully coordinated with the framework aluminum of the shell and the phosphorus, so that the tetracoordinated framework aluminum can be fully stabilized, and the hydrothermal stability and the selectivity to target product of the molecular sieve can be improved.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
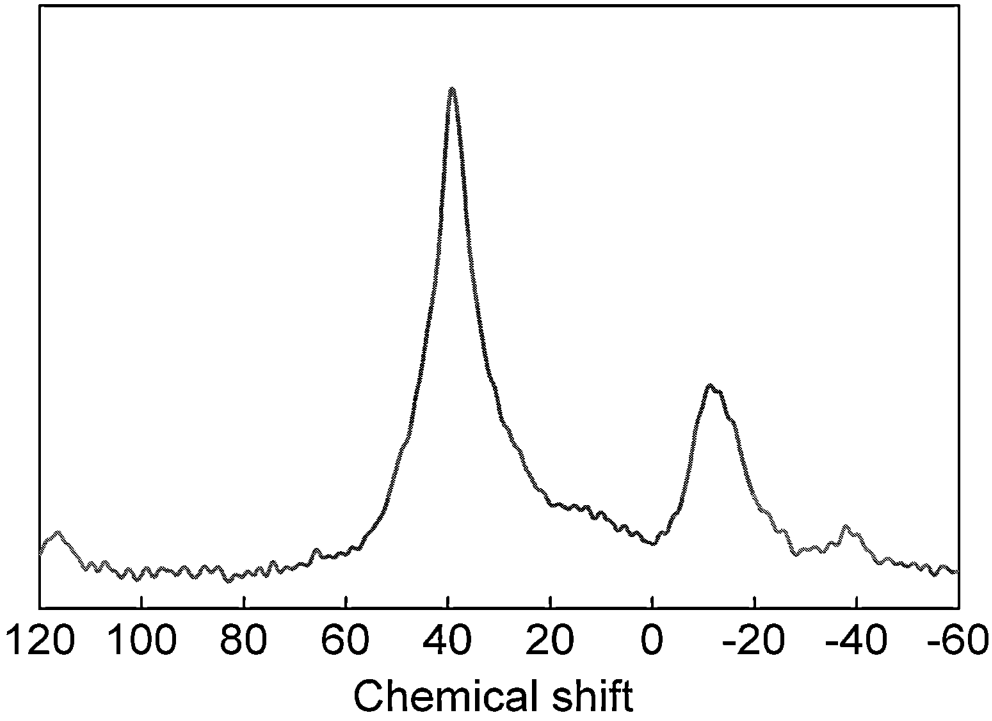
FIG. 1 shows an $^{27}Al$ MAS NMR spectra of the phosphorus- and metal-containing ZSM-5/β core-shell molecular sieve obtained in Example I-1 of the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the "grain size" refers to the size of the widest part of a crystal grain, which can be obtained by measuring the size of the widest part of the projection plane of the crystal grain in an SEM or TEM image of a sample. The average of the grain sizes of a plurality of crystal grains is the average grain size of the sample.

In the present application, the "particle size" refers to the size of the widest part of a particle, which can be obtained by measuring the size of the widest part of the projection plane of the particle in an SEM or TEM image of a sample, and the average of the particle sizes of a plurality of particles is the average particle size of the sample. It can also be measured by a laser particle sizer. One particle may comprise one or more crystal grains therein.

In the present application, the "dry weight" refers to the weight of a solid product measured after being calcined in air at 850° C. for 1 hour.

In the present application, the "catalyst-to-oil ratio" refers to the weight ratio of the catalyst to the feedstock participate in the reaction.

In the present application, the total pore volume and the pore diameter distribution can be measured by a low-temperature nitrogen adsorption volume method, and the pore diameter distribution can be calculated using a BJH calculation method, in accordance with the RIPP-151-90 method (see "Petrochemical Analysis Methods (RIPP Test Methods)", edited by Cuiding YANG et al., Science Press, published in 1990, pages 424-427, "Determination of the pore volume and pore diameter distribution of a catalyst by nitrogen adsorption volume method").

In the present application, the term "hydrogen-type" molecular sieve has the meaning commonly understood in the art and typically refers to a molecular sieve having a sodium oxide content of less than 0.2%. For example, the term "hydrogen-type core-shell molecular sieve" refers to a core-shell molecular sieve that has been treated (e.g., through ammonium exchange for sodium removal) to reduce the sodium oxide content.

In the present application, the term "sodium-type" molecular sieve has the meaning commonly understood in the art and typically refers to a molecular sieve having a relatively higher sodium oxide content, e.g., greater than 0.2%. For example, the term "sodium-type core-shell molecular sieve" refers to a core-shell molecular sieve that has not been subjected to a treatment (e.g., ammonium exchange for sodium removal) for reducing the sodium oxide content after being synthesized.

In the present application, the term "light hydrocarbon" has the meaning commonly understood by those skilled in the art and can be, for example, naphtha (including both the whole fraction of naphtha and a partial fraction of naphtha, e.g., light naphtha, heavy naphtha) or oils comprising pentane and heavier hydrocarbons (e.g., C6-8 alkanes) as a main component. The naphtha is a light oil with a distillation range within a range of 20-220° C. or a narrower fraction thereof, the light naphtha has a distillation range of 70-145° C., and the heavy naphtha has a distillation range of 70-180° C.

In the present application, the term "hydrogenated LCO" refers to a product obtained by subjecting LCO to hydrogenation. For example, the hydrogenated LCO may have a naphthene content of 20-40 wt % and an aromatics content of 45-60 wt %.

In the present application, the term "heavy oil" has the meaning commonly understood by those skilled in the art and includes, but is not limited to, atmospheric gas oils, vacuum gas oils, atmospheric residues, vacuum residues, propane deasphalted oils, butane deasphalted oils, and coker gas oils.

In the present application, the expression "calculated as metal oxide" means calculated as an oxide of the corresponding metal in which the metal is present in the highest valence state that allows the oxide to be stable under ordinary conditions.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

Phosphorus- and Metal-Containing Core-Shell Molecular Sieve

As described above, in the first aspect, the present application provides a phosphorus- and metal-containing core-shell molecular sieve, having a core composed of a ZSM-5 molecular sieve, and a shell composed of a β molecular sieve, wherein the core-shell molecular sieve has a phosphorus content, calculated as $P_2O_5$, of 1-10 wt %, and a metal content, calculated as metal oxide, of 0.1-10 wt %, based on the dry weight of the core-shell molecular sieve; and the phosphorus- and metal-containing core-shell molecular sieve shows an $^{27}$Al MAS NMR with a ratio of the area of a resonance signal peak at a chemical shift of 39±3 ppm to the area of a resonance signal peak at a chemical shift of 54±3 ppm of 0.01-∞:1.

In a preferred embodiment, the $^{27}$Al MAS NMR of the core-shell molecular sieve shows a ratio of the area of the resonance signal peak at the chemical shift of 39±3 ppm to the area of the resonance signal peak at the chemical shift of 54±3 ppm of 0.05-∞:1, 0.3-∞:1, 1-∞:1, 50-1000:1 or 80-950:1, more preferably 300-1000:1 or 500-1000:1.

In a preferred embodiment, the core-shell molecular sieve shows an X-ray diffraction pattern with a ratio of the height (D1) of a diffraction peak at 2θ=22.4°±0.1° to the height (D2) of a diffraction peak at 2θ=23.1°±0.1° of 0.1-10:1, such as 0.1-8:1, 0.1-5:1, 0.12-4:1 or 0.8-8:1.

In a preferred embodiment, the mass ratio of the core to the shell of the core-shell molecular sieve is 0.2-20:1, for example 1-15:1, wherein the mass ratio of the core to the shell can be calculated using the peak area of the X-ray diffraction pattern.

In a preferred embodiment, the proportion of the specific surface area of mesopores (i.e. pores having a pore diameter of 2 to 50 nm) of the core-shell molecular sieve to the total specific surface area thereof is 10% to 40%, for example 12% to 35%, 20% to 35% or 25% to 35%; preferably, the specific surface area of the phosphorus- and metal-containing core-shell molecular sieve is greater than 420 $m^2/g$, preferably 420-650 $m^2/g$, more preferably greater than 450 $m^2/g$, such as 450-620 $m^2/g$, 480-600 $m^2/g$, 490-580 $m^2/g$ or 500-560 $m^2/g$.

In preferred embodiments, the total pore volume of the core-shell molecular sieve is from 0.28 to 0.42 mL/g, such as from 0.3 to 0.4 mL/g or from 0.32 to 0.38 mL/g.

In a preferred embodiment, the ZSM-5 molecular sieve in the core of the core-shell molecular sieve is present in the form of particles composed of at least two ZSM-5 molecular sieve crystal grains. Further preferably, the average grain size of the ZSM-5 molecular sieve crystal grains is in a range of from 0.05 to 15 μm, preferably in a range of from 0.1 to 10 μm, for example in a range of from 0.1 to 1.2 μm, and the average particle size of the ZSM-5 molecular sieve particles in the core is in a range of from 0.1 to 30 μm.

In a preferred embodiment, the β molecular sieve in the shell of the core-shell molecular sieve is present in the form of particles composed of at least one β molecular sieve crystal grain, and the average grain size of the β molecular sieve crystal grain is 10-500 nm, such as 50-500 nm, 100-500 nm or 200-400 nm.

In a preferred embodiment, the shell thickness of the core-shell molecular sieve is 10-2000 nm, and may be, for example, 50-2000 nm, 100-2000 nm or 200-1500 nm.

In a preferred embodiment, the shell molecular sieve (i.e. the β molecular sieve in the shell) of the core-shell molecular sieve has a silica-alumina ratio (i.e. a silica to alumina molar ratio calculated as $SiO_2/Al_2O_3$) of 10 to 500, preferably 10 to 300, for example 30 to 200 or 25 to 200.

In a preferred embodiment, the core molecular sieve (i.e., the ZSM-5 molecular sieve in the core) of the core-shell molecular sieve has a silica-alumina ratio of 10-∞, such as 20-∞, 50-∞, 30-300, 30-200, 40-70 or 30-80.

In a preferred embodiment, the core-shell molecular sieve has a shell coverage of 50% to 100%, such as 80% to 100%.

In a preferred embodiment, the core-shell molecular sieve has a phosphorus content, calculated as $P_2O_5$, of 2-8 wt %, and a metal content, calculated as metal oxide, of 0.2-7 wt %.

In a preferred embodiment, the metal in the core-shell molecular sieve is selected from Fe, Co, Ni, Ga, Zn, Cu, Ti, K, Mg, or combinations thereof.

Method for Synthesizing a Phosphorus- and Metal-Containing Core-Shell Molecular Sieve As described above, in a second aspect, the present application provides a method for synthesizing a phosphorus- and metal-containing core-shell molecular sieve, comprising a step of loading phosphorus and metal on a hydrogen-type core-shell molecular sieve and calcining, wherein the core of the hydrogen-type core-shell molecular sieve is composed of a ZSM-5 molecular sieve, and the shell of the hydrogen-type core-shell molecular sieve is composed of a β molecular sieve.

In a preferred embodiment, the sodium oxide content (i.e., sodium content calculated as sodium oxide) of the hydrogen-type core-shell molecular sieve is no more than 0.2 wt %, more preferably no more than 0.1 wt %.

In a preferred embodiment, the loading of phosphorus and metal on the hydrogen-type core-shell molecular sieve is achieved by contacting the hydrogen-type core-shell molecular sieve with a solution of a phosphorus-containing compound and a solution of a metal-containing compound.

In the preferred embodiment, there is no particular limitation to the contacting manner of the hydrogen-type core-shell molecular sieve with the solution of the phosphorus-containing compound and the solution of the metal-containing compound. For example, the hydrogen-type core-shell molecular sieve may be sequentially contacted with the solution of the phosphorus-containing compound and the solution of the metal-containing compound, may be simultaneously contacted with the solution of the phosphorus-containing compound and the solution of the metal-containing compound, or may be contacted with a solution comprising both the phosphorus-containing compound and the metal-containing compound; and the sequential contact may be performed by contacting with the solution of the phosphorus-containing compound first and then with the solution of the metal-containing compound, or contacting with the solution of the metal-containing compound first and then with the solution of the phosphorus-containing compound, and the contact with each solution may be performed one or more times.

In a further preferred embodiment, the hydrogen-type core-shell molecular sieve is contacted with the solution of the phosphorus-containing compound and the solution of the metal-containing compound sequentially, and more preferably, is contacted with the solution of the phosphorus-containing compound first and then with the solution of the metal-containing compound.

In a further preferred embodiment, the phosphorus-containing compound is selected from phosphoric acid, ammonium hydrogen phosphate, ammonium dihydrogen phosphate, ammonium phosphate, or combinations thereof.

In a further preferred embodiment, the metal (expressed as M) in the metal-containing compound is selected from Fe, Co, Ni, Ga, Zn, Cu, Ti, K, Mg or combinations thereof. Even more preferably, the metal-containing compound is selected from water soluble salts of the metal, such as one or more of nitrate, chloride, and sulfate. For example, the metal-containing compound may be selected from the group consisting of nitrates, chlorides and sulfates of iron, nitrates, sulfates, and chlorides of cobalt, nitrates, chlorides, and sulfates of nickel, nitrates, chlorides, and sulfates of gallium, nitrates, chlorides, and sulfates of zinc, nitrates, chlorides, and sulfates of copper, nitrates, chlorides, and sulfates of titanium, potassium nitrate, potassium chloride, magnesium nitrate, magnesium sulfate, or combinations thereof.

In a preferred embodiment, the method for synthesizing the core-shell molecular sieve according to the present application comprises the steps of:

1) loading phosphorus on the hydrogen-type core-shell molecular sieve to obtain a modified core-shell molecular sieve material I;
2) calcining the resulting modified core-shell molecular sieve material I in an atmosphere comprising steam to obtain a modified core-shell molecular sieve material II; and
3) loading the metal on the modified core-shell molecular sieve material II and calcining to obtain the phosphorus- and metal-containing core-shell molecular sieve.

In a further preferred embodiment, the method is carried out by:

1) mixing the hydrogen-type core-shell molecular sieve with a solution of a phosphorus-containing compound with a pH of 4-10, drying, optionally calcining to obtain the modified core-shell molecular sieve material I,
2) carrying out hydrothermal activation (also called hydrothermal treatment) on the resulting modified core-shell molecular sieve material I at 400-1000° C. in the presence of steam to obtain the modified core-shell molecular sieve material II; and
3) mixing the resulting modified core-shell molecular sieve material II with a solution comprising a metal-containing compound, drying and calcining to obtain the phosphorus- and metal-containing core-shell molecular sieve.

The method of this further preferred embodiment allows better binding of phosphorus to aluminum, and reducing the formation of metal phosphates, so that the resulting molecular sieve has better cracking activity and/or propylene selectivity.

In this further preferred embodiment, said drying and calcining of step 1) and step 3) may be carried out in a conventional manner. For example, the drying may be air drying, flash drying, oven drying, air drying, and the drying temperature may be room temperature to 200° C.; the calcining temperature may be 300-700° C. and the calcining time may be 0.5-8 hours. Further preferably, independently in step 1) and step 3), the drying temperature is 80-120° C., the drying time is 2-24 h, the calcining temperature is 300-650° C., and the calcining time is 1-6 h.

In this further preferred embodiment, the hydrogen-type core-shell molecular sieve is contacted in step 1) with a solution of a phosphorus-containing compound having a pH of 4 to 10 to introduce phosphorus in the core-shell molecular weight. Preferably, the contact can be carried out by impregnation, namely, the core-shell molecular sieve is subjected to impregnation modification with the solution of the phosphorus-containing compound; the impregnation may be, for example, isovolumetric impregnation or excessive impregnation. Further preferably, the pH value of the solution of the phosphorus-containing compound used in step (1) is 5-8.

In a still further preferred embodiment, the hydrothermal activation in step (2) is performed by calcining the modified core-shell molecular sieve material I in an atmosphere comprising steam. Still more preferably, the hydrothermal activation temperature or calcining temperature is 400-1000° C., preferably 500-900° C., for example 600-800° C., and the hydrothermal activation time or calcining time is 0.5-24 h, preferably 2-18 h; and the atmosphere comprising steam has a steam content by volume of preferably 10-100%, and is more preferably a 100% steam atmosphere.

In a further preferred embodiment, in step 3), the modified core-shell molecular sieve material II is contacted with a solution comprising a metal-containing compound to perform metal impregnation modification.

In a preferred embodiment, the method for synthesizing the phosphorus- and metal-containing core-shell molecular sieve according to the present application further comprises the steps of: contacting the sodium-type core-shell molecular sieve with an acid and/or ammonium salt solution for ion exchange, drying and calcining to obtain a hydrogen-type core-shell molecular sieve, wherein the core of the sodium-type core-shell molecular sieve is composed of a ZSM-5 molecular sieve, and the shell of the sodium-type core-shell molecular sieve is composed of a β molecular sieve.

In a further preferred embodiment, the shell molecular sieve of the sodium-type core-shell molecular sieve (i.e. the β molecular sieve in the shell) has an average grain size of 10 to 500 nm, such as 50 to 500 nm.

In a further preferred embodiment, the shell of the sodium-type core-shell molecular sieve has a thickness of 10 to 2000 nm, which may be, for example, 50 to 2000 nm.

In a further preferred embodiment, the shell molecular sieve of the sodium-type core-shell molecular sieve has a silica to alumina molar ratio calculated as $SiO_2/Al_2O_3$, i.e. a silica-alumina ratio, of 10 to 500, preferably 10 to 300, for example 30 to 200 or 25 to 200.

In a further preferred embodiment, the core molecular sieve of the sodium-type core-shell molecular sieve (i.e., the ZSM-5 molecular sieve in the core) has a silica-alumina ratio of 10-∞, such as 20-∞, or 50-∞, or 30-300, or 30-200, or 20-80, or 25-70, or 30-60.

In a further preferred embodiment, the particles of the core molecular sieve of the sodium-type core-shell molecular sieve are agglomerates of a plurality of ZSM-5 molecular sieve crystal grains, and the number of the crystal grains in a single ZSM-5 molecular sieve particle of the core molecular sieve is not less than 2.

In a still further preferred embodiment, the average grain size of the ZSM-5 molecular sieve crystal grains in the core molecular sieve of the sodium-type core-shell molecular sieve is in a range of from 0.05 to 15 μm, preferably from 0.1 to 10 μm, e.g. from 0.1 to 5 μm or from 0.1 to 1.2 μm.

In a still further preferred embodiment, the ZSM-5 molecular sieve particles in the core molecular sieve of the sodium-type core-shell molecular sieve have an average particle size of 0.1 to 30 μm, such as 0.2 to 25 μm or 0.5 to 10 μm or 1 to 5 μm or 2 to 4 μm. In a further preferred embodiment, the sodium-type core-shell molecular sieve has a shell coverage of 50% to 100%, such as 80% to 100%.

In a further preferred embodiment, the hydrogen-type core-shell molecular sieve is obtained by subjecting the sodium-type core-shell molecular sieve to exchanging with ammonium ions and/or hydrogen ions, drying, and calcining.

In a further preferred embodiment, the sodium-type core-shell molecular sieve shows an X-ray diffraction pattern with a ratio of the height (D1) of a diffraction peak at 2θ=22.4°±0.1° to the height (D2) of a diffraction peak at 2θ=23.1°±0.1° in a range of 0.1-10:1, preferably 0.1-8:1, such as 0.1-5:1, 0.12-4:1 or 0.8-8:1.

In a further preferred embodiment, the mass ratio of the core to the shell of the sodium-type core-shell molecular sieve is 0.2-20:1, for example 1-15:1, wherein the mass ratio of the core to the shell can be calculated by using the peak area of the X-ray diffraction pattern.

In a further preferred embodiment, the total specific surface area of the sodium-type core-shell molecular sieve is greater than 420 $m^2/g$, such as 420-650 $m^2/g$, and the total specific surface area is preferably greater than 450 $m^2/g$, such as 450-620 $m^2/g$, 480-600 $m^2/g$, 490-580 $m^2/g$ or 500-560 $m^2/g$.

In a further preferred embodiment, the proportion of the specific surface area of mesopores of the sodium-type core-shell molecular sieve to the total specific surface area thereof (or the surface area of mesopores to the total surface area) is from 10% to 40%, for example from 12% to 35%. Here, the term "mesopore" refers to pores having a pore diameter of 2 to 50 nm.

In a further preferred embodiment, in the sodium-type core-shell molecular sieve, the pore volume of pores with a pore diameter of 0.3 to 0.6 nm accounts for 40% to 90%, such as 40% to 88%, 50% to 85%, 60% to 85%, or 70% to 82%, of the total pore volume of the sodium-type core-shell molecular sieve.

In a further preferred embodiment, in the sodium-type core-shell molecular sieve, in the pore volume of pores with a pore diameter of 0.7 to 1.5 nm accounts for 3% to 20%, such as 3% to 15% or 3% to 9%, of the total pore volume of the sodium-type core-shell molecular sieve.

In a further preferred embodiment, in the sodium-type core-shell molecular sieve, the pore volume of pores with a pore diameter of 2 to 4 nm accounts for 4% to 50%, such as 4% to 40%, 4% to 20%, or 4% to 10%, of the total pore volume of the sodium-type core-shell molecular sieve.

In a further preferred embodiment, in the sodium-type core-shell molecular sieve, the pore volume of pores with a pore diameter of 20 to 80 nm accounts for 5% to 40%, such as 5% to 30%, 6% to 20%, 7% to 18%, or 8% to 16%, of the total pore volume of the sodium-type core-shell molecular sieve.

In a further preferred embodiment, the method for synthesizing the phosphorus- and metal-containing core-shell molecular sieve further comprises preparing the hydrogen-type core-shell molecular sieve by:

i) treating a particulate ZSM-5 molecular sieve (starting material) with a surfactant solution to obtain a ZSM-5 molecular sieve material I;
ii) treating the ZSM-5 molecular sieve material I with a slurry comprising a particulate β molecular sieve to obtain a ZSM-5 molecular sieve material II;
iii) providing a mixture comprising a silicon source, an aluminum source, an optional alkali source, a template and water and crystallizing it at a temperature of 50-300° C. for 4-100 h (also referred to herein as first crystallization or pre-crystallization) to obtain a pre-crystallized synthesis liquid III;
iv) mixing the ZSM-5 molecular sieve material II with the pre-crystallized synthesis liquid III and crystallizing (also referred to as second crystallization in the present application) at a temperature of 50-300° C. for 10-400 h, to obtain the sodium-type core-shell molecular sieve; and
v) contacting the resulting sodium-type core-shell molecular sieve with an acid and/or ammonium salt solution for ion exchange, drying and calcining to obtain the hydrogen-type core-shell molecular sieve.

In this further preferred embodiment, the properties of the sodium-type core-shell molecular sieve obtained in step iv) are as described hereinbefore and will not be repeated here.

In this further preferred embodiment, the first crystallization of step iii) is performed so that the resulting pre-crystallized synthesis liquid III is present in a crystallization state, where crystal grains are to be appear but have not been appeared yet, that is near the end of the crystallization induction period and going to enter the rapid growth stage of crystal nucleus. Preferably, XRD analysis of the resulting pre-crystallized synthesis liquid III shows a peak at 2θ=22.4°±0.1° and no peak at 2θ=21.2°±0.1°. Preferably, the ratio of the intensity of the peak at 2θ=22.4°±0.1° to the intensity of the peak at 2θ=21.2°±0.1° is infinite. The XRD analysis of the pre-crystallized synthesis liquid III can be carried out according to the following method: filtering the pre-crystallized synthesis liquid III, washing, drying and calcining at 550° C. for 4 hours, and then carrying out the XRD analysis.

In a further preferred embodiment, the treatment of step i) is carried out by: adding the particulate ZSM-5 molecular sieve (starting material) into the surfactant solution for contacting, preferably under stirring, and then filtering and drying to obtain the ZSM-5 molecular sieve material I; wherein the surfactant solution has a surfactant concentration of 0.05-50 wt %, preferably 0.1-30 wt %, for example 0.1-5 wt %.

In a further preferred embodiment, the surfactant solution further comprises a salt capable of separating or dispersing the surfactant, for example, the salt is one or more selected from sodium chloride, potassium chloride, ammonium chloride and ammonium nitrate; the concentration of the salt in the surfactant solution is preferably 0.05 wt % to 10.0 wt %, for example 0.1 wt % to 2 wt %. The addition of the salt is beneficial to the adsorption of the surfactant on the ZSM-5 molecular sieve.

In a still further preferred embodiment, in step i), the weight ratio of the surfactant solution to the ZSM-5 molecular sieve (starting material) on a dry basis is 10-200:1.

In a still further preferred embodiment, the particulate ZSM-5 molecular sieve (starting material) in step i) may have a silica to alumina molar ratio of 10-∞, calculated as $SiO_2/Al_2O_3$; for example, the ZSM-5 molecular sieve (starting material) in the step i) may have a silica to alumina molar ratio of 20-∞, 50-∞, 20 to 300, 30 to 200, 20 to 80, 25 to 70, or 30 to 60, calculated as $SiO_2/Al_2O_3$.

In a still further preferred embodiment, the particles of the particulate ZSM-5 molecular sieve (starting material) in step i) are composed of at least two ZSM-5 molecular sieve crystal grains, wherein the ZSM-5 molecular sieve crystal grains have an average grain size of from 0.05 to 20 μm; for example, 0.1 to 10 μm; and the particles of the ZSM-5 molecular sieve (starting material) have an average particle size of from 0.1 to 30 μm, for example from 0.5 to 25 μm, from 1 to 25 μm, from 1 to 20 μm, from 1 to 5 μm or from 2 to 4 μm.

In a still further preferred embodiment, the ZSM-5 molecular sieve (starting material) used in step i) is a Na-type, hydrogen-type or metal ion-exchanged ZSM-5 molecular sieve, wherein the metal ion-exchanged molecular sieve is obtained by replacing Na ions in the ZSM-5 molecular sieve with other metal ions through an ion exchange process. For example, said other metal ions are transition metal ions, ammonium ion, alkaline earth metal ions, Group IIIA metal ions, Group IVA metal ions or Group VA metal ions.

In a still further preferred embodiment, the treatment of step i) is carried out at 20-70° C. for at least 0.5 h, such as 0.5-48 h, preferably 1-36 h.

In a further preferred embodiment, the drying in step i) may be oven drying, flash drying, air drying, and the drying conditions are not particularly limited as long as the sample can be dried, for example, the drying temperature may be 50 to 150° C., and the drying time may be 0.5 to 4 hours.

In a still further preferred embodiment, the surfactant used in step i) may be at least one selected from polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, and tetrabutylammonium hydroxide.

In a further preferred embodiment, the particles of the β molecular sieve in the slurry comprising the particulate β molecular sieve in step ii) are composed of at least one β molecular sieve crystal grain, preferably are single-grain particles, the average grain size of the β molecular sieve crystal grain is preferably 10-500 nm, for example 50-400 nm, 100-300 nm, 10-300 nm or more than 100 nm and not more than 500 nm; preferably, the average grain size of the β molecular sieve crystal grains in the slurry comprising the β molecular sieve is 10-500 nm smaller than the average grain size of the ZSM-5 molecular sieve crystal grain of the ZSM-5 molecular sieve (starting material); preferably, the average grain size of the ZSM-5 molecular sieve crystal grain of the ZSM-5 molecular sieve (starting material) is 1.5 or more times, such as 2 to 50 times or 5 to 20 times, the average grain size of the β molecular sieve crystal grain. The average particle size of the β molecular sieve particles is preferably in a range of from 0.01 to 0.5 μm, for example from 0.05 to 0.5 μm, or from 0.1 to 0.5 μm.

In a still further preferred embodiment, the concentration of the β molecular sieve in the slurry comprising the particulate β molecular sieve in step ii) is in a range of from 0.1 wt % to 10 wt %, such as from 0.3 wt % to 8 wt % or from 0.2 wt % to 1 wt %.

In a further preferred embodiment, the treatment of step ii) is carried out by: adding the ZSM-5 molecular sieve material I into the slurry comprising the β molecular sieve, and contacting at 20-60° C. for at least 0.5 hour, such as 1-24 hours; preferably under stirring, then filtering and drying to obtain the ZSM-5 molecular sieve material II.

In a still further preferred embodiment, in step ii), the weight ratio of the slurry comprising the β molecular sieve to the ZSM-5 molecular sieve material I on a dry basis is preferably in a range of 10-50:1. Preferably, the weight ratio of the β zeolite on a dry basis to the ZSM-5 molecular sieve material I on a dry basis is 0.01-1:1, for example 0.02-0.35:1.

In a still further preferred embodiment, the β molecular sieve used in step ii) may have a silica to alumina molar ratio $SiO_2/Al_2O_3$ of from 10 to 500, for example from 30 to 200 or from 25 to 200; preferably, the silica-alumina ratio of the β molecular sieve is different from the silica-alumina ratio of the shell molecular sieve of the core-shell molecular sieve obtained in step iv) by not more than ±10%, for example, the β molecular sieve has the same silica-alumina ratio as the shell molecular sieve obtained in step iv).

In a further preferred embodiment, in step iii), the molar ratio of the silicon source, the aluminum source, the optional alkali source, the template and water is: $R/SiO_2$=0.1-10:1, such as 0.1-3:1 or 0.2-2.2:1, $H_2O/SiO_2$=2-150:1, such as 10-120:1, $SiO_2/Al_2O_3$=10-800:1, such as 20-800:1, $Na_2O/SiO_2$=0-2:1, such as 0.01-1.7:1 or 0.05-1.3:1 or 0.1-1.1:1, where R represents the template, $SiO_2$ represents the silicon source calculated as $SiO_2$, $Al_2O_3$ represents the aluminum source calculated as $Al_2O_3$, and $Na_2O$ represents the alkali source calculated as $Na_2O$.

In a further preferred embodiment, in step iii), the silicon source is, for example, at least one selected from tetraethoxysilane, water glass, coarse silica gel, silica sol, silica white or activated clay; the aluminum source is, for example, at least one selected from aluminum sulfate, aluminum isopropoxide, aluminum nitrate, alumina sol, sodium metaaluminate or γ-alumina; the alkali source is, for example, at least one selected from sodium hydroxide and potassium hydroxide; the template is, for example, one or more selected from tetraethylammonium fluoride, tetraethylammonium hydroxide, tetraethylammonium bromide, polyvinyl alcohol, triethanolamine, and sodium carboxymethylcellulose.

In a further preferred embodiment, in step III), mixing the silicon source, the aluminum source, the optional alkali source, the template and deionized water to form a synthesis liquid, and then performing the first crystallization to obtain the pre-crystallized synthesis liquid III; the first crystallization is performed by crystalizing at 75-250° C. for 10-80 h; preferably, the crystallization temperature of the first crystallization is 80-180° C., and the crystallization time is 18-50 hours.

In a still further preferred embodiment, in step iv), the ZSM-5 molecular sieve material II is added to the pre-crystallized synthesis liquor III at a weight ratio of the pre-crystallized synthesis liquor III to the ZSM-5 molecular sieve material II on a dry basis of 2-10:1, for example 4-10:1. Preferably, the weight ratio of the ZSM-5 molecular sieve on a dry basis to the pre-crystallized synthesis liquid III on a dry basis is greater than 0.2:1, for example 0.3-20:1, 1-15:1, 0.5-10:1, 0.5-5:1, 0.8-2:1 or 0.9-1.7:1.

In a further preferred embodiment, the crystallization temperature of the second crystallization in step iv) is 50 to 300° C. and the crystallization time is 10 to 400 h; more preferably, the temperature of the second crystallization is 100-250° C., the crystallization time is 30-350 h, for example, the temperature of the second crystallization is 100-200° C., and the second crystallization time is 50-120 h.

In a further preferred embodiment, step iv) further comprises, after the completion of the second crystallization, a step that is one or more selected from filtering and optionally washing, drying and calcining. The drying conditions include, for example, a temperature of 50-150° C., and a time of 0.5-4 h. The washing is performed in a conventional manner, and may be, for example, washing with water, such as deionized water, wherein the ratio of core-shell molecular sieve to water may be, for example, 1: 5-20, and the washing may be performed for one or more times until the pH value of the washed water is 8-9. Alternatively, it is also possible to carry out the exchange of step v) directly after filtering.

In a further preferred embodiment, the sodium-type core-shell molecular sieve obtained in step iv) has a core composed of ZSM-5 molecular sieve and a shell composed of β molecular sieve, the silica-alumina ratio of the shell molecular sieve being in a range of 10 to 500, for example 25 to 200.

In a further preferred embodiment, the ammonium exchange and the acid exchange in step v) can be carried out in a conventional manner, for example, the ammonium exchange can be carried out by contacting the sodium-type core-shell molecular sieve obtained in step iv) with a solution of an ammonium salt, then filtering and washing; the ammonium salt is, for example, one or more selected from ammonium chloride, ammonium nitrate, and ammonium sulfate. Preferably, the ammonium exchange conditions include: a weight ratio of molecular sieve:ammonium salt: $H_2O$=1:0.1-1:10-20, an ammonium exchange temperature of 70-100° C., an ammonium exchange time of 0.5-4 h, and after ammonium exchange, the molecular sieve is filtered, washed and dried, for example, after being dried, the molecular sieve is calcined for 1-5 h at 400-600° C.; the above process may be repeated so that the resulting hydrogen-type core-shell molecular sieve has a sodium oxide content meeting the requirement, for example a sodium oxide content of less than 0.2 wt %, preferably less than 0.1 wt %. The washing can be carried out by washing with water to wash out sodium ions exchanged out from the molecular sieve.

In a second aspect, the present application also provides a phosphorus- and metal-containing core-shell molecular sieve obtained by the method for synthesizing a phosphorus- and metal-containing core-shell molecular sieve according to the present application.

Catalyst Comprising a Phosphorus- and Metal-Containing Core-Shell Molecular Sieve As noted above, in a third aspect, the present application provides a catalyst comprising, on a dry basis and based on the weight of the catalyst, 30-85 wt % of a carrier, 5-50 wt % of a phosphorus- and metal-containing core-shell molecular sieve according to the present application, and 0-55 wt % of an additional molecular sieve.

According to the present application, the carrier may be any of various carriers commonly used in catalytic cracking catalysts. In a preferred embodiment, the carrier comprises one or more selected from clay, alumina carrier, silica carrier, aluminophosphate, zirconia sol, and silicon-based matrix containing an additive selected from boron oxide, aluminum oxide, magnesium oxide, zirconium oxide, or combinations thereof.

According to the present application, the clay may be one or more selected from natural clays such as kaolin, montmorillonite, diatomite, halloysite, metahalloysite, saponite, rectorite, sepiolite, attapulgite, hydrotalcite, bentonite, and the like.

According to the present application, the alumina carrier can be one or more selected from acidified pseudo-boehmite, alumina sol, hydrated alumina and activated alumina. The hydrated alumina is, for example, one or more selected from pseudo-boehmite (not acidified), boehmite, gibbsite, bayerite, nordstrandite and amorphous aluminum hydroxide. The active alumina is one or more selected from γ-alumina, η-alumina, χ-alumina, δ-alumina, θ-alumina and κ-alumina.

According to the present application, the acidified pseudo-boehmite can be obtained by acidifying a pseudo-boehmite, wherein the acidification may be carried out in a manner well known to the skilled person, for example by slurrying the pseudo-boehmite with water to form a slurry, then adding an acid and stirring at 50-85° C. for 0.2-1.5 hours, wherein the molar ratio of acid to pseudo-boehmite, calculated as alumina, is, for example, 0.10-0.25.

According to the present application, the silica carrier may be, for example, one or more selected from silica sol, silica gel, and solid silica gel. The silica sol may be, for example, one or more selected from neutral silica sol, acidic silica sol, and basic silica sol.

First Type of Embodiments

The first type of embodiments of the catalyst according to the present application is a catalyst suitable for catalytic cracking of light hydrocarbons, comprising, on a dry basis and based on the weight of the catalyst, 50-85 wt % of a carrier and 15-50 wt % of the phosphorus- and metal-containing core-shell molecular sieve, wherein the carrier comprises one or more selected from clay, alumina, silica, and aluminophosphate.

In the first type of embodiments, the carrier may comprise one or more selected from clay, alumina carrier, silica-alumina carrier, aluminophosphate carrier; optionally, the carrier may comprise a phosphorus oxide additive. Preferably, the carrier is a natural clay and alumina carrier, or a natural clay, alumina carrier and silica carrier. Further preferably, the carrier comprises a silica carrier. The silica carrier such as solid silica gel carrier and/or silica sol carrier is more preferably silica sol carrier. The silica carrier is present in the catalyst in an amount of from 0 wt % to 15 wt %, e.g. from 1 wt % to 15 wt % or from 10 wt % to 15 wt %, calculated as $SiO_2$.

In the first type of embodiments, preferably, based on the dry weight of the catalyst, the carrier is present in an amount of 50 wt % to 85 wt %, preferably 55 wt % to 75 wt %, and the phosphorus- and metal-containing core-shell molecular sieve is present in an amount of 15 wt % to 50 wt %, preferably 20 wt % to 45 wt %.

In the first type of embodiments, the catalyst preferably comprises, on a dry basis, 15 to 40 wt % of the phosphorus- and metal-containing core-shell molecular sieve, 20 to 60 wt %, for example 25 to 50 wt % of clay, 5 to 35 wt %, for example 10 to 30 wt % of acidified pseudo-boehmite (boehmite for short), 3 to 25 wt %, for example 5 to 15 wt % or 3 to 20 wt % of alumina sol and 0 to 15 wt %, for example 3 to 10 wt % or 5 to 15 wt % of silica sol. The sodium oxide content in the catalytic cracking catalyst is preferably not more than 0.15 wt %.

In the first type of embodiments, the catalytic cracking catalyst has a specific surface area of 80-450 $m^2$/g, such as 100-400 $m^2$/g, an external surface area of 20-220 $m^2$/g, such as 50-200 $m^2$/g, a total pore volume of 0.15-0.35 $cm^3$/g, such as 0.18-0.33 $cm^3$/g, and a mesopore volume of 0.10-0.30 $cm^3$/g, such as 0.12-0.28 $cm^3$/g.

In the first type of embodiments, the catalyst shows a pore diameter distribution diagram with a peak of mesopore at a pore diameter of 3 to 25 nm, preferably a peak of mesopore at a pore diameter of 4 to 20 nm, for example 10 to 20 nm or 4 to 10 nm.

The light hydrocarbon catalytic cracking catalyst according to the first type of embodiments of the present application has excellent light hydrocarbon cracking capability, and has higher light olefin yield, especially higher ethylene, propylene, and butylene yields when used for catalytic cracking of light hydrocarbons.

The present application also provides a method for preparing a catalyst according to the first type of embodiments, comprising: forming a slurry comprising the phosphorus- and metal-containing core-shell molecular sieve and a carrier, drying, and optionally calcining.

In the method for preparing the catalyst according to the first type of embodiments of the present application, the carrier used therein may be any carrier commonly used in catalytic cracking catalysts. Preferably, the carrier comprises one or more selected from clay, alumina carrier, silica carrier, aluminophosphate carrier, and silica alumina carrier. The clay is, for example, one or more selected from natural clays, such as kaolin, montmorillonite, diatomite, halloysite, metahalloysite, saponite, rectorite, sepiolite, attapulgite, hydrotalcite, and bentonite. The alumina carrier is, for example, one or more selected from acidified pseudo-boehmite, alumina sol, hydrated alumina and activated alumina. The hydrated alumina is, for example, one or more selected from pseudo-boehmite (acidified or not acidified), boehmite, gibbsite, bayerite, nordstrandite and amorphous aluminum hydroxide. The active alumina is, for example, one or more selected from γ-alumina, η-alumina, χ-alumina, δ-alumina, θ-alumina and κ-alumina. The silica carrier is, for example, one or more selected from silica sol, silica gel and solid silica gel. The silica alumina carrier is, for example, one or more selected from silica alumina material, silica alumina sol and silica alumina gel. For example, the silica sol is one or more selected from neutral silica sol, acidic silica sol and basic silica sol.

According to the method for preparing the catalyst of the first type of embodiments of the present application, preferably, the carrier comprises clay and a carrier having a binding effect. The carrier having a binding effect is called a binder, the binder is, for example, one or more selected from silica binders, such as silica sol, alumina binders, such as alumina sol and/or pseudo-boehmite, and aluminophosphate gel/sol, wherein the pseudo-boehmite is preferably acidified pseudo-boehmite. Preferably, the carrier comprises one or more selected from acidified pseudo-boehmite, alumina sol, and silica sol. For example, the binder may comprise alumina sol and/or acidified pseudo-boehmite; or the binder may comprise silica sol, as well as alumina sol and/or acidified pseudo-boehmite; the silica sol is added in such an amount that the resulting catalyst has a silica content (calculated as $SiO_2$) derived from the silica sol of 1-15 wt %, wherein the silica sol is, for example, one or more selected from neutral silica sol, acidic silica sol and basic silica sol, and the molar ratio of acid, such as hydrochloric acid or nitric acid, to the pseudo-boehmite, calculated as alumina, in the acidified pseudo-boehmite is preferably 0.1 to 0.3. Preferably, on a dry basis, the weight ratio of phosphorus- and metal-containing core-shell molecular sieve:clay:alumina sol:acidified pseudo-boehmite:silica sol is 15-45:15-50:3-25:5-35:0-15, or 20-40:20-50:5-25:5-30:1-15 or 15-40:35-50:5-15:10-30:0-15. Optionally, the carrier may also comprise an inorganic oxide matrix, such as one or more selected from silica alumina material, activated alumina, and silica gel.

In the method for preparing the catalyst according to the first type of embodiments of the present application, water, the phosphorus- and metal-containing core-shell molecular sieve and a carrier are formed into a slurry comprising the core-shell molecular sieve and the carrier, and then dried. Preferably, the weight ratio, on a dry basis, of core-shell molecular sieve to carrier in the slurry formed comprising core-shell molecular sieve and carrier is 15-50:50-85, for example 20-45:55-75. The slurry comprising the core-shell molecular sieve and the carrier typically has a solid content of 10 to 50 wt %, preferably 15 to 30 wt %. The drying conditions are those commonly used in the preparation of catalytic cracking catalysts. Typically, the drying temperature is 100-350° C., preferably 200-300° C. The drying may be performed by oven drying, air drying or spray drying, preferably by spray drying.

The method for preparing the catalyst according to the first type of embodiments of the present application may further comprise an exchange (i.e., ion exchange) step. The exchange is carried out after spray drying, and preferably, the exchange is performed to an extent that the sodium oxide content in the resulting catalytic cracking catalyst is not more than 0.15 wt %. The exchange can be an exchange with an ammonium salt solution and/or an acid solution. For example, the exchange may be carried out by contacting the catalyst with the ammonium salt solution at a weight ratio of catalyst:ammonium salt:$H_2O$=1:(0.1-1):(5-15) at 50-100° C. and filtering, which process can be carried out one or more times, for example at least two times; the ammonium salt is selected from ammonium chloride, ammonium sulfate, ammonium nitrate, or mixtures thereof. Optionally, a washing step is further comprised to wash out sodium ions exchanged out from the catalyst, which may be performed by washing with water, such as decationized water, distilled water or deionized water.

According to the method for preparing the catalyst of the first type of embodiments of the present application, after the slurry comprising the modified core-shell molecular sieve and the carrier is dried, a calcining step may be further comprised, and preferably, the calcining is performed before the exchange. For example, the calcining temperature is 400-600° C. and the calcining time is 1-10 hours, such as 2-6 hours.

Particularly preferably, the method for preparing the catalyst according to the first type of embodiments of the present application comprises the steps of: mixing the phosphorus- and metal-containing core-shell molecular sieve, clay, a silica binder and/or alumina binder, an optional inorganic oxide matrix and water, and slurrying to form a slurry having a solid content typically of 10-50 wt %, and preferably 15-30 wt %; and then spray-drying, optionally calcining and/or exchanging, washing and drying to obtain the catalyst.

Particularly preferably, the method for preparing the catalyst according to the first type of embodiments of the present application comprises the steps of:

A1) mixing the phosphorus- and metal-containing core-shell molecular sieve with a carrier, slurrying, and spray drying, to obtain catalyst microspheres;

A2) calcining the catalyst microspheres obtained in step A1) at a temperature of 400-600° C. for 2-10 h to obtain calcined catalyst microspheres;

A3) optionally, subjecting the calcined catalyst microspheres to ammonium exchange and washing, to reduce the $Na_2O$ content in the catalyst microspheres to a level of less than 0.15 wt %.

Second Type of Embodiments

The second type of embodiments of the catalyst according to the present application is a catalyst suitable for catalytic cracking of hydrogenated LCO, comprising, on a dry basis and based on the weight of the catalyst, 50-85 wt % of a carrier comprising a silicon-based matrix containing an additive selected from boron oxide, aluminum oxide, magnesium oxide, zirconium oxide, or combinations thereof, and 15-50 wt % of the phosphorus- and metal-containing core-shell molecular sieve, the additive being present in an amount of 5-50 wt %, calculated as oxide and based on the dry weight of the additive-containing silicon-based matrix.

In the catalyst of the second type of embodiments, based on the dry weight of the catalyst, the carrier is present in an amount of 50 wt % to 85 wt %, preferably 55 wt % to 75 wt %, and the phosphorus- and metal-containing core-shell molecular sieve is present in an amount of 15 wt % to 50 wt %, preferably 20 wt % to 45 wt %, wherein the additive-containing silicon-based matrix is present in an amount of 1 wt % to 15 wt %, calculated as $SiO_2$.

In the hydrogenated LCO catalytic cracking catalyst according to the second type of embodiments of the present application, the additive-containing silicon-based matrix may comprise a silica carrier and an additive, and the silica carrier is, for example, a silicon-based matrix, which may be one or more selected from neutral silicon-based matrix, acidic silicon-based matrix, or basic silicon-based matrix, such as one or more selected from silica gel, acidic silica sol, basic silica sol, and neutral silica sol, the additive is, for example, one or more selected from boron oxide, aluminum oxide, magnesium oxide, and zirconium oxide. The additive-containing silicon-based matrix may have an additive content, calculated as oxide, of 5 to 50 wt %, for example 5 to 30 wt %, and a silica content of 50 to 95 wt %, based on the dry weight of the additive-containing silicon-based matrix. The additive-containing silicon-based matrix is present in the hydrocracked LCO catalytic cracking catalyst in an amount, calculated as $SiO_2$, of from 1 to 15 wt %, preferably from 5 to 15 wt %, e.g. from 10 to 15 wt %, based on the weight of the hydrocracked LCO catalytic cracking catalyst.

In the second type of embodiments, preferably, the carrier may further comprise an additional carrier used in catalytic cracking catalysts, for example, said additional carrier may comprise one or more selected from clay, alumina carrier, silica carrier (excluding silica in the additive-containing silicon-based matrix), silica-alumina carrier, and aluminophosphate carrier. The additional carrier is preferably present in the hydrogenated LCO catalytic cracking catalyst in an amount of 35-84 wt %, based on the weight of the hydrogenated LCO catalytic cracking catalyst.

In the second type of embodiments, the total content of the silica carrier in said additional carrier and the additive-containing silicon-based matrix, calculated as $SiO_2$, in the catalyst is preferably in a range of 1 to 15 wt %, for example 5 to 15 wt %. The silica carrier is, for example, solid silica gel carrier and/or silica sol carrier, and more preferably silica sol.

In the second type of embodiments, it is particularly preferable that the catalyst comprises 15 to 40 wt %, on a dry basis, of the phosphorus- and metal-containing core-shell molecular sieve, 35 to 50 wt %, on a dry basis, of the clay, 5 to 35 wt %, such as 10 to 30 wt %, calculated as alumina, of an acidified pseudo-boehmite (boehmite for short), 3 to 20 wt %, such as 5 to 15 wt %, calculated as alumina, of an alumina sol, and 1 to 15 wt %, such as 5 to 15 wt %, calculated as silica, of the silicon-based matrix containing an additive. The sodium oxide content in the catalyst is preferably not more than 0.15 wt %.

In the second type of embodiments, the catalyst has a specific surface area of preferably 100-450 $m^2/g$, such as 120-400 $m^2/g$, and an external surface area of 60-220 $m^2/g$, such as 80-200 $m^2/g$.

In the second type of embodiments, the catalyst preferably has a total pore volume of from 0.15 to 0.35 $cm^3/g$, e.g., from 0.18 to 0.33 $cm^3/g$, and a mesopore volume of preferably from 0.10 to 0.30 $cm^3/g$, e.g., from 0.12 to 0.28 $cm^3/g$.

In the second type of embodiments, the catalyst preferably shows a pore diameter distribution diagram with a peak of mesopore at a pore diameter of 4 to 35 nm, preferably at a pore diameter of 5 to 25 nm.

When the catalyst according to the second type of embodiments of the application is used for conversion of hydrogenated LCO, the catalyst shows an excellent hydrogenated LCO cracking capability and higher yields of light olefins and aromatics.

According to the second type of embodiments of the present application, the additive-containing silicon-based matrix may be obtained by modifying a silica carrier by adding thereto a metal salt solution. For example, the additive-containing silicon-based matrix may be prepared by a method comprising the steps of:

a) preparing a metal salt solution, wherein the concentration of the metal salt solution is 10-50 wt %;

b) adding the metal salt solution into a silica carrier, and adding aqueous ammonia to adjust the pH value to 6-7; and c) filtering the resulting material, drying and calcining.

Preferably, the calcining temperature is 400-600° C. and the calcining time is 1-8 hours.

Preferably, the most probable distribution of mesopores of the resulting additive-containing silicon-based matrix is in a range of 4 to 10 nm.

The present application also provides a method for preparing the catalyst according to the second type of embodiments, comprising the steps of: forming a slurry comprising the phosphorus- and metal-containing core-shell molecular sieve, water, and a carrier comprising a silicon-based matrix containing an additive, drying, and optionally calcining.

In the method for preparing the catalyst according to the second type of embodiments of the present application, the phosphorus- and metal-containing core-shell molecular sieve is formed into a slurry with the carrier and water, and the slurry has a solid content of typically 10 to 50 wt %, preferably 15 to 30 wt %. The carrier comprises the additive-containing silicon-based matrix and an additional carrier other than the additive-containing silicon-based matrix, which may be any of those carriers commonly used in catalytic cracking catalysts. Preferably, said additional carrier comprises one or more selected from clay, alumina carrier, silica carrier, aluminophosphate carrier, and silica alumina carrier. In the slurry comprising the core-shell molecular sieve and the carrier, the weight ratio, on a dry basis, of the core-shell molecular sieve to the carrier is 15-50:50-85, for example 20-45:55-75.

According to the method for preparing the catalyst of the second type of embodiments of the present application, preferably, the carrier comprises clay, the additive-containing silicon-based matrix, and a carrier having a binding effect. The carrier having a binding effect is called a binder, the binder is, for example, one or more selected from silica binder, alumina binder and aluminophosphate gel/sol, the silica binder is, for example, silica sol, the alumina binder is, for example, alumina sol and/or acidified pseudo-boehmite. Preferably, the carrier comprises one or more selected from acidified pseudo-boehmite, alumina sol, and silica sol. For example, the binder comprises alumina sol and/or acidified pseudo-boehmite; or the binder comprises silica sol, as well as alumina sol and/or acidified pseudo-boehmite; the silica sol is added in such an amount that the silica content (calculated as $SiO_2$) derived from the silica sol in the resulting catalyst is 1 to 15 wt %. Preferably, the weight ratio, on a dry basis, of the core-shell molecular sieve:clay: alumina sol:acidified pseudo-boehmite:silica sol is 15-40: 35-50:5-15:10-30:0-15. The carrier may also comprise an inorganic oxide matrix, such as one or more selected from silica alumina material, activated alumina, and silica gel.

According to the method for preparing the catalyst of the second type of embodiments of the present application, further preferably, the clay is, for example, one or more selected from natural clays, such as kaolin, montmorillonite, diatomite, halloysite, metahalloysite, saponite, rectorite, sepiolite, attapulgite, hydrotalcite, bentonite, and the like. The alumina carrier is, for example, one or more selected from acidified pseudo-boehmite, alumina sol, hydrated alumina and activated alumina. The hydrated alumina is, for example, one or more selected from pseudo-boehmite (not acidified), boehmite, gibbsite, bayerite, nordstrandite, and amorphous aluminum hydroxide. The active alumina is, for example, one or more selected from $\gamma$-alumina, $\eta$-alumina, $\chi$-alumina, $\delta$-alumina, $\theta$-alumina and $\kappa$-alumina. The silica carrier is, for example, one or more selected from silica sol, silica gel, silica-based matrix and solid silica gel. The silica alumina carrier is, for example, one or more selected from silica alumina material, silica alumina sol and silica alumina gel. The silica carrier is, for example, one or more selected from neutral silica sol, acidic silica sol or basic silica sol.

The method for preparing the catalyst according to the second type of embodiments of the present application preferably comprises: mixing the phosphorus- and metal-containing core-shell molecular sieve, clay, a silica binder and/or alumina binder, an optional inorganic oxide matrix and water, and slurrying to form a slurry having a solid content typically of 10-50 wt %, and preferably 15-30 wt %; and then drying to obtain the catalyst. The drying conditions are those commonly used in the preparation of catalytic cracking catalysts. Typically, the drying temperature is 100-350° C., preferably 200-300° C. The drying may be performed by oven drying, air drying or spray drying, preferably by spray drying.

The method for preparing the catalyst according to the second type of embodiments of the present application may further comprise an exchange step. The exchange is carried out after spray drying, and preferably, the exchange is performed to an extent that the sodium oxide content in the resulting catalytic cracking catalyst is not more than 0.15 wt %. The exchange may be performed using an ammonium salt solution. For example, the exchange may be carried out by contacting the catalyst with the ammonium salt solution at a weight ratio of catalyst:ammonium salt:$H_2O$=1:(0.1-1): (5-15) at 50-100° C., and filtering, which process can be carried out one or more times, for example at least two times; the ammonium salt is one selected from ammonium chloride, ammonium sulfate, and ammonium nitrate, or a mixture of two or more thereof. Optionally, a washing step is further comprised to wash out sodium ions exchanged out from the catalyst, which may be performed by washing with water, such as decationized water, distilled water or deionized water.

According to the method for preparing the catalyst of the second type of embodiments of the present application, after the slurry comprising the core-shell molecular sieve and the carrier is dried, a calcining step may be further comprised, preferably, the calcining is performed before the exchange. In an embodiment, the calcining temperature is 400-600° C., and the calcining time is 1-10 hours, such as 2-6 hours. The drying is, for example, spray drying.

Particularly preferably, the method for preparing the catalyst according to the second type of embodiments of the present application comprises the steps of:

(B1) mixing the phosphorus- and metal-containing core-shell molecular sieve with a carrier, slurrying, and spray drying, to obtain catalyst microspheres;

(B2) calcining the catalyst microspheres obtained in step (B1) at a temperature of 400-600° C. for 2-10 h to obtain calcined catalyst microspheres; and (B3) optionally, subjecting the calcined catalyst microspheres to ammonium exchange and washing, to reduce the $Na_2O$ content in the catalyst microspheres to a level of less than 0.15 wt %.

Third Type of Embodiments

The third type of embodiments of the catalyst of the present application is a catalytic cracking catalyst suitable for producing gasoline and light olefins by catalytic cracking of heavy oil, comprising, on a dry basis, 30 to 79 wt % of a carrier, 5 to 15 wt % of the phosphorus- and metal-containing modified core-shell molecular sieve (referred to as a first molecular sieve), 15 to 45 wt % of a Y molecular sieve (referred to as a second molecular sieve), and 1-10 wt % of a molecular sieve having a pore opening diameter of 0.65 to 0.70 nm (referred to as a third molecular sieve).

According to the third type of embodiments of the present application, the catalyst comprises, on a dry basis and based on the weight of the catalyst, from 30 to 79 wt %, preferably from 40 to 70 wt %, of a carrier, from 5 to 15 wt %, preferably from 8 to 12 wt %, of the phosphorus- and metal-containing core-shell molecular sieve, from 15 to 45 wt %, preferably from 20 to 35 wt %, of a Y molecular sieve, and from 1 to 15 wt %, preferably from 4 to 10 wt %, of a molecular sieve having a pore opening diameter of from 0.65 to 0.70 nm. Preferably, the phosphorus- and metal-containing core-shell molecular sieve has a $Na_2O$ content of no more than 0.15 wt %.

In the third type of embodiments, the Y molecular sieve may be one or more selected from DASY molecular sieve, rare earth-containing DASY molecular sieve, HRY molecular sieve, rare earth-containing HRY molecular sieve, DOSY molecular sieve, USY molecular sieve, rare earth-containing USY molecular sieve, REY molecular sieve, HY molecular sieve, and REHY molecular sieve. Preferably, the Y molecular sieve is a rare earth-containing Y molecular sieve, and the content of the rare earth in the rare earth-containing Y molecular sieve is preferably 5-17 wt % calculated as $RE_2O_3$. Further preferably, the framework silica-alumina ratio of the Y molecular sieve is 4.9-14 calculated as the $SiO_2/Al_2O_3$ molar ratio.

In the third type of embodiments, the molecular sieve having a pore opening diameter of 0.65 to 0.70 nanometers may be one or more selected from molecular sieves having an AET, AFR, AFS, AFI, BEA, BOG, CFI, CON, GME, IFR, ISV, LTL, MEI, MOR, OFF, or SAO structure; preferably at least one selected from Beta, SAPO-5, SAPO-40, SSZ-13, CIT-1, ITQ-7, ZSM-18, mordenite and gmelinite. Preferably, the molecular sieve having a pore opening diameter of 0.65-0.70 nm is a β molecular sieve, such as a hydrogen-type β molecular sieve (i.e. Hβ molecular sieve).

In the third type of embodiments, the carrier may be a carrier commonly used in cracking catalysts, and for example, may comprise one or more selected from alumina sol carrier, zirconia sol carrier, silica sol carrier, pseudo-boehmite carrier, and clay carrier. The clay is, for example, one or more selected from kaolin, montmorillonite, diatomite, halloysite, metahalloysite, saponite, rectorite, sepiolite, attapulgite, hydrotalcite and bentonite.

In the third type of embodiments, preferably, the carrier comprises one or more selected from clay, alumina carrier, silica carrier, aluminophosphate carrier, and silica alumina carrier, and more preferably one or more selected from clay, alumina carrier, and silica carrier.

In the third type of embodiments, the silica carrier is, for example, one or more selected from silica sol, silica gel, and solid silica gel. The silica sol is, for example, one or more selected from neutral silica sol, acidic silica sol and basic silica sol. Preferably, the content of silica sol in the catalytic cracking catalyst is 1-15 wt % calculated as $SiO_2$ based on the weight of the catalytic cracking catalyst. The silica alumina carrier is, for example, one or more selected from silica alumina material, silica alumina sol and silica alumina gel. The alumina carrier is, for example, one or more selected from acidified pseudo-boehmite, alumina sol, hydrated alumina and activated alumina. The hydrated alumina is, for example, one or more selected from pseudo-boehmite, gibbsite, Bayer stone, nordstrandite and amorphous aluminum hydroxide. The pseudo-boehmite is preferably partially or completely acidified to form acidified pseudo-boehmite, and then mixed with other components. The active alumina is, for example, one or more selected from γ-alumina, η-alumina, χ-alumina, δ-alumina, θ-alumina and κ-alumina. The alumina carrier is preferably one or more selected from alumina sol, hydrated alumina and active alumina, more preferably one or more selected from pseudo-boehmite and alumina sol, and the pseudo-boehmite is acidified. For example, the catalytic cracking catalyst comprises 2-25 wt % of alumina sol, calculated as alumina, and 5-30 wt % of pseudo-boehmite, calculated as alumina.

In the third type of embodiments, the carrier preferably comprises clay, and a carrier having a binding effect. The carrier having a binding effect is called a binder, the binder is, for example, one or more selected from silica binder, alumina binder and aluminophosphate gel/sol, the silica binder is, for example, silica sol, the alumina binder is, for example, alumina sol and/or acidified pseudo-boehmite. Preferably, the carrier comprises one or more selected from acidified pseudo-boehmite, alumina sol and silica sol.

In the third type of embodiments, it is further preferrable that the binder comprises alumina sol and/or acidified pseudo-boehmite; or the binder comprises silica sol, as well as alumina sol and/or acidified pseudo-boehmite; the silica sol is added in such an amount that the silica content (calculated as $SiO_2$) derived from the silica sol in the resulting catalytic cracking catalyst is 1 to 15 wt %. The carrier may also comprise an inorganic oxide matrix, such as one or more selected from silica alumina material, activated alumina, and silica gel.

In the third type of embodiments, it is particularly preferable that the catalyst comprises, based on the weight of the catalyst, 10 to 50 wt %, for example 15 to 45 wt %, on a dry basis, of clay, 2 to 25 wt %, for example 3 to 23 wt %, calculated as alumina, of an alumina sol, 5 to 30 wt %, for example 8 to 25 wt %, calculated as alumina, of pseudo-boehmite, 1 to 15 wt %, calculated as silica, of silica sol, 5 to 15 wt %, preferably 8 to 12 wt %, on a dry basis, of the phosphorus- and metal-containing core-shell molecular sieve, 15-45 wt %, preferably 20-35 wt %, on a dry basis, of Y molecular sieve, and 1-15 wt %, preferably 4-10 wt %, on a dry basis, of a molecular sieve having a pore opening diameter of 0.65-0.70 nm.

The catalyst according to the third type of embodiments of the present application is rich in pore structure, and has excellent heavy oil cracking capability and higher selectivity to light olefins (ethylene and propylene). When used for heavy oil conversion, the catalyst can provide higher yields of liquefied gas and gasoline, and a higher yield of two olefins (i.e. ethylene and propylene).

The present application also provides a method for preparing the catalyst according to the third type of embodiments, comprising the steps of: forming a slurry comprising a first molecular sieve, a second molecular sieve, a third molecular sieve, a carrier and water, and spray drying; wherein the first molecular sieve is a phosphorus- and metal-containing core-shell molecular sieve according to the present application, the second molecular sieve is a Y molecular sieve, and the third molecular sieve is a molecular sieve having a pore opening diameter of 0.65-0.70 nm.

According to the method for preparing the catalyst according to the third type of embodiments of the present application, preferably, the first molecular sieve, the second molecular sieve and the third molecular sieve, the carrier and water are mixed to form a slurry having a solid content of typically 10 to 50 wt %, preferably 15 to 30 wt %.

According to the method for preparing the catalyst according to the third type of embodiments of the present application, the spray drying conditions may be those commonly used in the preparation of catalytic cracking catalysts. Typically, the spray drying temperature is 100-350° C., preferably 200-300° C.

According to the method for preparing the catalyst according to the third type of embodiments of the present application, preferably, the method further comprises an exchange step after the spray drying. Preferably, the exchange is performed to an extent that the resulting catalytic cracking catalyst has a sodium oxide content of no more than 0.15 wt %. The exchange may be performed using an ammonium salt solution. For example, the exchange may be carried out by contacting the catalyst with the ammonium salt solution at a weight ratio of catalyst:ammonium salt: $H_2O$=1:(0.1-1):(5-15) at 50-100° C., and filtering, which process can be carried out one or more times, for example at least two times; the ammonium salt is one selected from ammonium chloride, ammonium sulfate, and ammonium nitrate, or a mixture of two or more thereof. Optionally, a washing step is further comprised to wash out sodium ions exchanged out from the catalyst, which may be performed by washing with water, such as decationized water, distilled water or deionized water. After the exchange and washing, the catalyst may be dried.

According to the method for preparing the catalyst according to the third type of embodiments of the present application, preferably, after the slurry comprising the molecular sieve and the carrier is spray-dried, a calcining step may be further comprised. The calcining may be performed before and/or after the exchange. Preferably, the calcining is performed before the exchange. The calcining can be performed in a conventional manner, for example, the calcining temperature is 350-650° C., and the calcining time is 1-10 hours; preferably, the calcining is carried out at 400-600° C. for 2-6 h.

The method for preparing the catalyst according to the third type of embodiments of the present application preferably comprises the steps of: mixing the phosphorus- and metal-containing core-shell molecular sieve, the second molecular sieve, the third molecular sieve, clay, a silica binder and/or alumina binder, an optional inorganic oxide matrix and water, and slurrying to form a slurry having a solid content typically of 10-50 wt %, and preferably 15-30 wt %; then spray drying to obtain catalyst microspheres. The spray drying conditions may be those commonly used in the preparation of catalytic cracking catalysts. Typically, the spray drying temperature is 100-350° C., preferably 200-300° C. The catalyst microspheres can be directly used as the catalytic cracking catalyst, or can be subjected to exchange and/or calcining.

Particularly preferably, the method for preparing the catalyst according to the third type of embodiments of the present application comprises the steps of:

(C1) mixing the phosphorus- and metal-containing core-shell molecular sieve, the Y molecular sieve, the molecular sieve having a pore opening diameter of 0.65-0.70 nanometer, a carrier and water, slurrying, and spray drying to obtain catalyst microspheres; and (C2) optionally, calcining the catalyst microspheres obtained in step (C1) at 400-600° C. for 2-6 h, and then exchanging and washing; or, subjecting the catalyst microspheres obtained in step (C1) to ammonium exchange and washing, and then to calcining at 400-600° C. for 2-6 h.

Preferably, the exchange and washing are performed to reduce the $Na_2O$ content in the resulting catalyst to a level of less than 0.15 wt %.

Catalytic Conversion Process

As mentioned above, in a fourth aspect, the present application provides a process for the catalytic conversion of a hydrocarbon-containing feedstock, comprising a step of contacting the hydrocarbon-containing feedstock with the catalyst according to the present application.

In some preferred embodiments, the catalytic conversion process according to the present application comprises a step of contacting a light hydrocarbon feedstock with the light hydrocarbon catalytic cracking catalyst according to the first type of embodiments of the present application. In such preferred embodiments, the reaction conditions used may be those commonly used for the catalytic cracking of light hydrocarbons, for example the reaction conditions may include: a reaction temperature of 550-700° C., preferably 590-680° C.; a weight hourly space velocity of 1-30 $h^{-1}$, preferably 2-15 $h^{-1}$; and a catalyst-to-oil weight ratio of 1-15, preferably 2-12. In such preferred embodiments, a diluent gas, such as one or more selected from steam and nitrogen, may be introduced during the reaction.

When the catalytic conversion process of such preferred embodiments is used for the conversion of light hydrocarbons, it shows a higher conversion rate, and a higher yield of light olefins, particularly a higher yield of ethylene, propylene and butylene. The catalytic conversion process of such preferred embodiments can be used for catalytic cracking of naphtha, especially naphtha comprising naphthenic ring.

In some other preferred embodiments, the catalytic conversion process of the present application comprises a step of contacting a hydrogenated LCO with a hydrogenated LCO catalytic cracking catalyst according to the second type of embodiments of the present application. In such preferred embodiments, the reaction conditions used may be those commonly used for catalytic cracking of hydrogenated LCO, for example, the reaction conditions may include: a reaction temperature of 550-700° C., preferably 590-680° C.; a weight hourly space velocity of 1-30 $h^{-1}$, preferably 2-15 $h^{-1}$; and a catalyst-to-oil weight ratio of 5-30, preferably 10-25.

When the catalytic conversion process of such preferred embodiments is used for the conversion of hydrogenated LCO, it shows a good conversion effect, a higher yield of light olefins, especially ethylene and propylene, and a higher yield of C10 or lower aromatic hydrocarbons (i.e. aromatic hydrocarbons with 10 or less carbon atoms, such as methyl benzene).

In some other preferred embodiments, the catalytic conversion process according to the present application comprises a step of contacting a heavy oil with the catalytic cracking catalyst according to the third type of embodiments of the present application. In such preferred embodiments, the reaction conditions employed may be those commonly used for the production of gasoline and light olefins by catalytic cracking of heavy oil, for example, the reaction conditions may include: a reaction temperature of 480-600° C., such as 500-600° C., preferably 500-550° C.; a weight hourly space velocity of 5-30 $h^{-1}$, preferably 8-20 $h^{-1}$; and a catalyst-to-oil ratio of 1-15, preferably 2-12.

When the catalytic conversion process of such preferred embodiments is used for the catalytic cracking of heavy oil, it shows a higher conversion rate of heavy oil, a higher yield of liquefied gas, a higher yield of gasoline, and a higher yield of ethylene and propylene.

In particularly preferred embodiments, the present application provides the following technical solutions:

A1, a phosphorus- and metal-containing core-shell molecular sieve, wherein its core molecular sieve is a ZSM-5 molecular sieve, its shell molecular sieve is a β molecular sieve, and, based on the dry weight of the phosphorus- and metal-containing core-shell molecular sieve, it comprises 1-10 wt % of phosphorus, calculated as $P_2O_5$, and 0.1-10 wt % of metal, calculated as metal oxide; and the phosphorus- and metal-containing core-shell molecular sieve shows an $^{27}Al$ MAS NMR with a ratio of the area of a resonance signal peak at a chemical shift of 39±3 ppm to the area of a resonance signal peak at a chemical shift of 54±3 ppm of 0.01-∞:1.

A2, the phosphorus- and metal-containing core-shell molecular sieve according to Item A1, wherein the phosphorus- and metal-containing core-shell molecular sieve shows an $^{27}Al$ MAS NMR with a ratio of the area of the resonance signal peak at the chemical shift of 39±3 ppm to the area of the resonance signal peak at the chemical shift of 54±3 ppm of 0.3-∞:1.

A3, the phosphorus- and metal-containing core-shell molecular sieve according to Item A1, wherein the phosphorus- and metal-containing core-shell molecular sieve shows an X-ray diffraction pattern with a ratio of the height of a peak at 2θ=22.4°±0.1° to the height of a peak at 2θ=23.1°±0.1° of 0.1-10:1.

A4, the phosphorus- and metal-containing core-shell molecular sieve according to Item A3, wherein the ratio of the height of the peak at 2θ=22.4°±0.1° to the height of the peak at 2θ=23.1°±0.1° is 0.1-5:1.

A5, the phosphorus- and metal-containing core-shell molecular sieve according to Item A1, wherein the ratio of the core to the shell of the phosphorus- and metal-containing core-shell molecular sieve is 0.2-20:1, such as 1-15:1.

A6, the phosphorus- and metal-containing core-shell molecular sieve according to Item A1, wherein the proportion of the mesopore surface area of the phosphorus- and metal-containing core-shell molecular sieve accounts for 10% to 40%, such as 20% to 35%, of the total specific surface area thereof.

A7, the phosphorus- and metal-containing core-shell molecular sieve according to Item A1, wherein the average grain size of the shell molecular sieve of the phosphorus- and metal-containing core-shell molecular sieve is 10 nm to 500 nm.

A8, the phosphorus- and metal-containing core-shell molecular sieve according to Item A1, wherein the thickness of the shell molecular sieve of the phosphorus- and metal-containing core-shell molecular sieve is 10 nm to 2000 nm.

A9, the phosphorus- and metal-containing core-shell molecular sieve according to Item A1, wherein the silica-alumina ratio, calculated as $SiO_2/Al_2O_3$, of the shell molecular sieve of the phosphorus- and metal-containing core-shell molecular sieve is 10-500.

A10, the phosphorus- and metal-containing core-shell molecular sieve according to Item A1, wherein the silica-alumina ratio, calculated as $SiO_2/Al_2O_3$, of the core molecular sieve of the phosphorus- and metal-containing core-shell molecular sieve is 10-∞.

A11, the phosphorus- and metal-containing core-shell molecular sieve according to Item A1, wherein the average grain size of the core molecular sieve of the phosphorus- and metal-containing core-shell molecular sieve is 0.05 μm to 15 μm.

A12, the phosphorus- and metal-containing core-shell molecular sieve according to Item A1, wherein the number of crystal grains in the core molecular sieve particles of the phosphorus- and metal-containing core-shell molecular sieve is not less than 2.

A13, the phosphorus- and metal-containing core-shell molecular sieve according to Item A1, wherein the phosphorus- and metal-containing core-shell molecular sieve has a shell coverage of 50% to 100%.

A14, the phosphorus- and metal-containing core-shell molecular sieve according to Item A1, wherein the phosphorus- and metal-containing core-shell molecular sieve has a phosphorus content, calculated as $P_2O_5$, of 2 wt % to 8 wt %, and a metal content, calculated as metal oxide, of 0.2 wt % to 7 wt %.

A15, the phosphorus- and metal-containing core-shell molecular sieve according to Item A1, wherein the metal is one or more selected from Fe, Co, Ni, Ga, Zn, Cu, Ti, K and Mg.

A16, the phosphorus- and metal-containing core-shell molecular sieve according to any of Items A1 to A15, wherein the pore volume of pores with a pore diameter of 2 nm to 80 nm accounts for 10% to 30% of the total pore volume of the phosphorus- and metal-containing core-shell molecular sieve.

A17, a method for synthesizing a phosphorus- and metal-containing core-shell molecular sieve, comprising the steps of: contacting a hydrogen-type core-shell molecular sieve with a solution of a phosphorus-containing compound and a metal-containing compound, wherein the core molecular sieve of the hydrogen-type core-shell molecular sieve is a ZSM-5 molecular sieve, and the shell molecular sieve of the hydrogen-type core-shell molecular sieve is a β molecular sieve.

A18, a method for synthesizing a phosphorus- and metal-containing core-shell molecular sieve, comprising the steps of:

(1) contacting a hydrogen-type core-shell molecular sieve with a solution of a phosphorus-containing compound with a pH of 4-10, drying, and optionally calcining to obtain a modified core-shell molecular sieve I;

(2) subjecting the modified core-shell molecular sieve I to hydrothermal activation at 400-1000° C. in the presence of steam to obtain a modified core-shell molecular sieve II;

(3) contacting the modified core-shell molecular sieve II with a solution comprising a metal-containing compound, drying and calcining to obtain the phosphorus- and metal-containing core-shell molecular sieve.

A19, the method for synthesizing phosphorus- and metal-containing core-shell molecular sieve according to Item A18, wherein in step (1), the pH value of the solution of the phosphorus-containing compound is 5-8.

A20, the method for synthesizing phosphorus- and metal-containing core-shell molecular sieve according to Item A18, wherein in step (2), the hydrothermal activation is performed by calcining the modified core-shell molecular sieve I in an atmosphere comprising steam, the calcining temperature is 400-1000° C., the calcining time is 0.5-24 h, and the content by volume of steam in the atmosphere comprising steam is preferably 10-100%.

A21, the method for synthesizing phosphorus- and metal-containing core-shell molecular sieve according to Item A18, wherein in step (3), the modified core-shell molecular sieve II is contacted with the solution comprising the metal-containing compound; wherein the metal-containing compound is one or more selected from nitrate, chloride and sulfate of the metal.

A22, the method for synthesizing phosphorus- and metal-containing core-shell molecular sieve according to Item A17 or A18, wherein the hydrogen-type core-shell molecular sieve is obtained by a method comprising the steps of:

(A) contacting a ZSM-5 molecular sieve with a surfactant solution to obtain a ZSM-5 molecular sieve I;

(B) contacting the ZSM-5 molecular sieve I with a slurry comprising a β molecular sieve to obtain a ZSM-5 molecular sieve II that is a ZSM-5 molecular sieve comprising the molecular sieve;

(C) forming a mixture of a silicon source, an aluminum source, a template and water, and carrying out a first crystallization at 50-300° C. for 4-100 h to obtain a synthesis liquid III;

(D) mixing the ZSM-5 molecular sieve II with the synthesis liquid III, carrying out a second crystallization at 50-300° C. for 10-400 h, and filtering, optionally washing, optionally drying and optionally calcining after the completion of the second crystallization to obtain a core-shell molecular sieve IV;

(E) subjecting the core-shell molecular sieve IV to ammonium and/or acid exchange, drying and calcining to obtain the H-type molecular sieve.

A23, the method for synthesizing phosphorus- and metal-containing core-shell molecular sieve according to Item A22, wherein the contacting in step (A) is performed by: adding the ZSM-5 molecular sieve into the surfactant solution for treatment for at least 0.5 hour, filtering and drying to obtain the ZSM-5 molecular sieve I; wherein the concentration expressed in weight percentage of the surfactant in the surfactant solution is 0.05-50%, and the weight ratio of the surfactant solution to the ZSM-5 molecular sieve, on a dry basis, in step (A) is 10-200:1.

A24, the method for synthesizing phosphorus- and metal-containing core-shell molecular sieve according to Item A22, wherein the surfactant solution further comprises a salt; the concentration of the salt in the surfactant solution is preferably 0.05 wt % to 10 wt %, and the salt is, for example, one or more selected from sodium chloride, potassium chloride, ammonium chloride and ammonium nitrate.

A25, the method for synthesizing phosphorus- and metal-containing core-shell molecular sieve according to Item A22, wherein the ZSM-5 molecular sieve used in step (A) has a silica to alumina molar ratio of 10-∞ or 20-300 or 25-70, calculated as $SiO_2/Al_2O_3$.

A26, the method for synthesizing phosphorus- and metal-containing core-shell molecular sieve according to Item A22, wherein the ZSM-5 molecular sieve used in step (A) has an average grain size of 0.05 μm to 20 μm; the ZSM-5 molecular sieve has an average particle size of 0.1 μm to 30 μm.

A27, the method for synthesizing phosphorus- and metal-containing core-shell molecular sieve according to Item A22, wherein the ZSM-5 molecular sieve used in step (A) is a Na-type ZSM-5 molecular sieve, a hydrogen-type ZSM-5 molecular sieve or a metal ion-exchanged ZSM-5 molecular sieve.

A29, the method for synthesizing phosphorus- and metal-containing core-shell molecular sieve according to Item A22, wherein in step (A), the contacting temperature is 20° C. to 70° C. and the contacting time is at least 0.5 h.

A29, the method for synthesizing phosphorus- and metal-containing core-shell molecular sieve according to Item A22, wherein the surfactant is at least one selected from the group consisting of polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, and tetrabutylammonium hydroxide.

A30, the method for synthesizing phosphorus- and metal-containing core-shell molecular sieve according to Item A22, wherein the concentration of the β molecular sieve in the slurry comprising the β molecular sieve used in step (B) is 0.1-10 wt %.

A31, the method for synthesizing phosphorus- and metal-containing core-shell molecular sieve according to Item A22, wherein the contacting of step (B) is performed by: adding the ZSM-5 molecular sieve I into the slurry comprising the β molecular sieve, stirring for 0.5 hour or more at a temperature of 20-60° C., and then filtering and drying to obtain the ZSM-5 molecular sieve II.

A32, the method for synthesizing phosphorus- and metal-containing core-shell molecular sieve according to Item A22 or A31, wherein, in step (B), the weight ratio of the slurry comprising the β molecular sieve to the ZSM-5 molecular sieve I, on a dry basis, is 10-50:1.

A33, the method for synthesizing phosphorus- and metal-containing core-shell molecular sieve according to Item A22, wherein in the slurry comprising the β molecular sieve used in step (B), the average grain size of the β molecular sieve is 10 nm to 500 nm.

A34, the method for synthesizing phosphorus- and metal-containing core-shell molecular sieve according to Item A22, wherein the silica to alumina molar ratio $SiO_2/Al_2O_3$ of the β molecular sieve used in step (B) is 10-500.

A35, the method for synthesizing phosphorus- and metal-containing core-shell molecular sieve according to Item A23, wherein in step (C), the molar ratio of the silicon source, the aluminum source, the template R and water is: $R/SiO_2$=0.1-10:1, $H_2O/SiO_2$=2-150:1, $SiO_2/Al_2O_3$=20-800:1, and $Na_2O/SiO_2$=0-2:1.

A36, the method for synthesizing phosphorus- and metal-containing core-shell molecular sieve according to Item A22, wherein in step (C), the silicon source is at least one selected from tetraethoxysilane, water glass, coarse silica gel, silica sol, silica white and activated clay; the aluminum source is at least one selected from aluminum sulfate, aluminum isopropoxide, aluminum nitrate, alumina sol, sodium metaaluminate or γ-alumina; the template is at least one selected from tetraethyl ammonium fluoride, tetraethyl ammonium hydroxide, tetraethyl ammonium bromide, polyvinyl alcohol, triethanolamine and sodium carboxymethyl cellulose.

A37, the method for synthesizing phosphorus- and metal-containing core-shell molecular sieve according to Item A22, wherein in step (C), the silicon source, the aluminum source, the template and deionized water are mixed to form a synthesis liquid, and then the first crystallization is performed to obtain the synthesis liquid III; wherein the first crystallization is carried out at a crystallization temperature of 75-250° C. for a crystallization time of 10-80 h; preferably, the first crystallization is carried out at a crystallization temperature of 80-180° C. for a crystallization time of 18-50 hours.

A38, the method for synthesizing phosphorus- and metal-containing core-shell molecular sieve according to Item A22, wherein the first crystallization in step (C) produces the synthetic fluid III, of which the XRD pattern shows a peak at 2θ=22.4°±0.1° and no peak at 2θ=21.2°±0.1°.

A39, the method for synthesizing phosphorus- and metal-containing core-shell molecular sieve according to Item A22, wherein in step (D), the ZSM-5 molecular sieve II is added into the synthesis solution III, and the weight ratio of the synthesis solution III to the ZSM-5 molecular sieve II, on a dry basis, is 2-10:1.

A40, the method for synthesizing phosphorus- and metal-containing core-shell molecular sieve according to Item A22, wherein in step (D), the second crystallization is carried out at a crystallization temperature of 50-300° C. for a crystallization time of 10-400 h.

A41, the method for synthesizing phosphorus- and metal-containing core-shell molecular sieve according to Item A22, wherein, in step (D), the temperature of the second crystallization is 100-250° C., the crystallization time of the second crystallization is 30-350 h, for example, the second crystallization temperature is 100-200° C., and the second crystallization time is 50-120 h.

A42, the method for synthesizing phosphorus- and metal-containing core-shell molecular sieve according to Item A22, wherein the H-type molecular sieve has a sodium oxide content of not more than 0.2 wt %.

A43, the method for synthesizing phosphorus- and metal-containing core-shell molecular sieve according to Item A17 or A18, wherein the metal is one or more selected from Fe, Co, Ni, Ga, Zn, Cu, Ti, K and Mg.

A44, a phosphorus- and metal-containing core-shell molecular sieve obtained by the method for synthesizing the phosphorus- and metal-containing core-shell molecular sieve according to any one of Items A17 to A43.

A45, use of the phosphorus- and metal-containing core-shell molecular sieve according to any of Items A1 to A16 and Item A44 in a hydrocarbon conversion catalyst.

B1, a light hydrocarbon catalytic cracking catalyst, comprising 50-85 wt % of a carrier, and 15-50 wt % of a phosphorus- and metal-containing core-shell molecular sieve; of which the core molecular sieve is a ZSM-5 molecular sieve, and the shell molecular sieve is a molecular sieve; the phosphorus- and metal-containing core-shell molecular sieve shows an $^{27}$Al MAS NMR with a ratio of the area of a resonance signal peak at a chemical shift of 39±3 ppm to the area of a resonance signal peak at a chemical shift of 54±3 ppm of 0.01-∞:1, the total specific surface area of the core-shell molecular sieve is more than 420 $m^2/g$; based on the dry weight of the phosphorus- and metal-containing core-shell molecular sieve, the phosphorus- and metal-containing core-shell molecular sieve comprises 1-10 wt % of phosphorus, calculated as $P_2O_5$, and 0.1-10 wt % of metal, calculated as metal oxide, wherein the metal is one or more selected from Fe, Co, Ni, Ga, Zn, Cu, Ti, K and Mg.

B2, the light hydrocarbon catalytic cracking catalyst according to Item B1, wherein the phosphorus- and metal-containing core-shell molecular sieve shows an $^{27}$Al MAS NMR with a ratio of the area of the resonance signal peak at the chemical shift of 39±3 ppm to the area of the resonance signal peak at the chemical shift of 54±3 ppm of 0.3-∞:1.

B3, the light hydrocarbon catalytic cracking catalyst according to Item B1, wherein the phosphorus- and metal-containing core-shell molecular sieve shows an X-ray diffraction pattern with a ratio of the height of a peak at 2θ=22.4°±0.1° to the height of a peak at 2θ=23.1°±0.1° of 0.1-10:1.

B4, the light hydrocarbon catalytic cracking catalyst according to Item B1, wherein the mesopore surface area of the phosphorus- and metal-containing core-shell molecular sieve accounts for 10% to 40%, such as 20% to 35%, of the total specific surface area thereof.

B5, the light hydrocarbon catalytic cracking catalyst according to Item B1, wherein the average grain size of the shell molecular sieve of the phosphorus- and metal-containing core-shell molecular sieve is 10 nm to 500 nm.

B6, the light hydrocarbon catalytic cracking catalyst according to Item B1, wherein the shell molecular sieve of the phosphorus- and metal-containing core-shell molecular sieve has a thickness of 10 nm to 2000 nm.

B7, the light hydrocarbon catalytic cracking catalyst according to Item B1, wherein the shell molecular sieve of the phosphorus- and metal-containing core-shell molecular sieve has a silica-alumina ratio, calculated as $SiO_2/Al_2O_3$, of 10 to 500.

B8, the light hydrocarbon catalytic cracking catalyst according to Item B1, wherein the core molecular sieve of the phosphorus- and metal-containing core-shell molecular sieve has a silica-alumina ratio, calculated as $SiO_2/Al_2O_3$, of 10-∞.

B9, the light hydrocarbon catalytic cracking catalyst according to Item B1, wherein the average grain size of the core molecular sieve of the phosphorus- and metal-containing core-shell molecular sieve is 0.05 μm to 15 and the number of crystal grains in the core molecular sieve particles is not less than 2.

B10, the light hydrocarbon catalytic cracking catalyst according to Item B1, wherein the phosphorus- and metal-containing core-shell molecular sieve has a shell coverage of 50% to 100%.

B11, the light hydrocarbon catalytic cracking catalyst according to Item B1, wherein the phosphorus- and metal-containing core-shell molecular sieve has a phosphorus content, calculated as $P_2O_5$, of 2 wt % to 8 wt %, and a metal content, calculated as metal oxide, of 0.2 wt % to 7 wt %.

B12, the light hydrocarbon catalytic cracking catalyst according to Item B1, wherein the carrier comprises one or more selected from clay, alumina, silica, aluminophosphate; optionally, the carrier comprises one or more additives such as phosphorus oxides, alkaline earth metal oxides; in an embodiment, the light hydrocarbon catalytic cracking catalyst comprises, on a dry basis, 15 to 40 wt % of the phosphorus- and metal-containing core-shell molecular sieve, 20 to 60 wt %, for example 25 to 50 wt %, of clay, 5 to 35 wt %, for example 10 to 30 wt %, of an acidified pseudo-boehmite, 3 to 25 wt %, for example 5 to 15 wt % or 3 to 20 wt %, of an alumina sol, and 0 to 15 wt %, for example 3 to 10 wt % or 5 to 15 wt %, of a silica sol; and the sodium oxide content in the catalytic cracking catalyst is preferably not more than 0.15 wt %.

B13. A method for preparing the light hydrocarbon catalytic cracking catalyst according to any one of Items B1 to B12, comprising the steps of:

forming a slurry comprising the phosphorus- and metal-containing core-shell molecular sieve and a carrier, drying, and optionally calcining.

B14, the method according to Item B13, comprising the steps of:

(A1) mixing the phosphorus- and metal-containing core-shell molecular sieve with the carrier, slurrying, and spray drying to obtain catalyst microspheres;

(A2) calcining the catalyst microspheres obtained in step (A1) at a temperature of 400-600° C. for 2-10 h; and (A3) optionally, subjecting the calcined catalyst microspheres obtained in step (A2) to ammonium exchange and/or washing to reduce the $Na_2O$ content in the catalyst microspheres to a level of less than 0.15 wt %.

B15, the method according to Item B13 or B14, wherein the phosphorus- and metal-containing core-shell molecular sieve is obtained by a method comprising the steps of:

(B1) contacting a hydrogen-type core-shell molecular sieve with a solution of a phosphorus-containing compound with a pH of 4-10, drying, and optionally calcining to obtain a modified core-shell molecular sieve I;

(B2) subjecting the modified core-shell molecular sieve I to hydrothermal activation at 400-1000° C. in the presence of steam to obtain a modified core-shell molecular sieve II;

(B3) contacting the modified core-shell molecular sieve II with a solution comprising a metal-containing compound, drying and calcining to obtain the phosphorus- and metal-containing core-shell molecular sieve, wherein the metal is one or more selected from Fe, Co, Ni, Ga, Zn, Cu, Ti, K and Mg.

B16, the method according to Item B15, wherein, in the step (B1) of synthesizing the phosphorus- and metal-containing core-shell molecular sieve, the pH of the solution of the phosphorus-containing compound is 5-8.

B17, the method according to Item B15, wherein, in the step (B2) of synthesis of the phosphorus- and metal-containing core-shell molecular sieve, the hydrothermal activation is performed by: calcining the modified core-shell molecular sieve I in an atmosphere comprising steam at a calcining temperature of 400-1000° C. for 0.5-24 h; the content by volume of steam in the atmosphere comprising steam is preferably 10-100%.

B18, the method according to Item B15, wherein, in the step (B3) of synthesizing the phosphorus- and metal-containing core-shell molecular sieve, the modified core-shell molecular sieve II is contacted with the solution comprising the metal-containing compound; the metal-containing compound is one or more selected from nitrate, chloride and sulfate of the metal.

B19, the method according to Item B15, wherein the hydrogen-type core-shell molecular sieve is obtained by a method comprising the steps of:

(C1) contacting a ZSM-5 molecular sieve with a surfactant solution to obtain a ZSM-5 molecular sieve I;

(C2) contacting the ZSM-5 molecular sieve I with a slurry comprising a β molecular sieve to obtain a ZSM-5 molecular sieve II that is a ZSM-5 molecular sieve comprising the β molecular sieve;

(C3) forming a mixture of a silicon source, an aluminum source, a template and deionized water, and carrying out a first crystallization at 50-300° C. for 4-100 h to obtain a synthesis liquid III;

(C4) mixing the ZSM-5 molecular sieve II with the synthesis liquid III, carrying out a second crystallization at 50-300° C. for 10-400 h, and filtering, optionally washing, optionally drying and optionally calcining after the completion of the second crystallization to obtain a core-shell molecular sieve IV;

(C5) subjecting the core-shell molecular sieve IV to ammonium and/or acid exchange, drying and calcining to obtain the hydrogen-type molecular sieve.

B20, the method according to Item B19, wherein the contacting in the step (C1) for synthesizing the hydrogen-type core-shell molecular sieve is performed by: adding the ZSM-5 molecular sieve into the surfactant solution for treatment for at least 0.5 hour, filtering and drying to obtain the ZSM-5 molecular sieve I; wherein the concentration expressed in weight percentage of the surfactant in the surfactant solution is 0.05-50%, and the weight ratio of the surfactant solution to the ZSM-5 molecular sieve, on a dry basis, used in step (C1) is 10-200:1.

B21, the method according to Item B19, wherein the surfactant solution further comprises a salt; the concentration of the salt in the surfactant solution is preferably 0.05 wt % to 10 wt %, and the salt is, for example, one or more selected from sodium chloride, potassium chloride, ammonium chloride and ammonium nitrate.

B22, the method according to Item B19, wherein, in step (C1), the ZSM-5 molecular sieve has a silica to alumina molar ratio of 10-∞ or 20-300 or 25-70, calculated as $SiO_2/Al_2O_3$, and the ZSM-5 molecular sieve has an average grain size of 0.05 μm to 20 μm; the ZSM-5 molecular sieve has an average particle size of 0.1 μm to 30 μm; the ZSM-5 molecular sieve is a Na-type ZSM-5 molecular sieve, a hydrogen-type ZSM-5 molecular sieve or a metal ion-exchanged ZSM-5 molecular sieve.

B23, the method according to Item B19, wherein in step (C1), the contacting temperature is 20° C. to 70° C. and the contacting time is at least 0.5 h.

B24, the method according to Item B19, wherein the surfactant is at least one selected from polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, and tetrabutylammonium hydroxide.

B25, the method according to Item B19, wherein the concentration of the β molecular sieve in the slurry comprising the β molecular sieve of step (C2) is 0.1 wt % to 10 wt %.

B26, the method according to Item B19, wherein the contacting in step (C2) is performed by: adding the ZSM-5 molecular sieve I into the slurry comprising the β molecular sieve, stirring for 0.5 hour or more at a temperature of 20-60° C., and then filtering and drying to obtain the ZSM-5 molecular sieve II.

B27, the method according to Item B19 or B26, wherein, in step (C2), the weight ratio of the slurry comprising the β molecular sieve to the ZSM-5 molecular sieve I, on a dry basis, is 10-50:1.

B28, the method according to Item B19, wherein, in the slurry comprising the β molecular sieve of step (C2), the average grain size of the β molecular sieve is 10 nm to 500 nm; the silica to alumina molar ratio $SiO_2/Al_2O_3$ of the β molecular sieve is 10-500.

B29, the method according to Item B19, wherein in step (C3), the molar ratio of the silicon source, the aluminum source, the template R and water is: $R/SiO_2$=0.1-10:1, $H_2O/SiO_2$=2-150:1, $SiO_2/Al_2O_3$=20-800:1, and $Na_2O/SiO_2$=0-2:1; the silicon source is at least one selected from tetraethoxysilane, water glass, coarse silica gel, silica sol, silica white or activated clay; the aluminum source is at least one selected from aluminum sulfate, aluminum isopropoxide, aluminum nitrate, alumina sol, sodium metaaluminate or γ-alumina; the template is at least one selected from tetraethyl ammonium fluoride, tetraethyl ammonium hydroxide, tetraethyl ammonium bromide, polyvinyl alcohol, triethanolamine and sodium carboxymethyl cellulose.

B30, the method according to Item B19, wherein, in step (C3), the silicon source, the aluminum source, the template, and deionized water are mixed to form a synthesis liquid, and then the first crystallization is performed to obtain the synthesis liquid III; wherein the first crystallization is carried out at a crystallization temperature of 75-250° C. for a crystallization time of 10-80 h; preferably, the first crystallization is carried out at a crystallization temperature of 80-180° C. for a crystallization time of 18-50 hours.

B31, the method according to Item B19, wherein the first crystallization in step (C3) produces the synthetic fluid III, of which the XRD pattern shows a peak at $2\theta=22.4°\pm0.1°$ and no peak at $2\theta=21.2°\pm0.1°$.

B32, the method according to Item B19, wherein, in step (C4), the ZSM-5 molecular sieve II is added to the synthesis liquid III at a weight ratio of the synthesis liquid III to the ZSM-5 molecular sieve II, on a dry basis, of 2-10:1; the second crystallization is performed at a crystallization temperature of 50-300° C. for 10-400 h; the temperature of the second crystallization is 100-250° C., the crystallization time is 30-350 h, for example, the second crystallization temperature is 100-200° C., and the second crystallization time is 50-120 h.

B33, the method according to Item B19, wherein the H-type molecular sieve has a sodium oxide content of no more than 0.2 wt %.

B34, the method according to Item B13 or B14, wherein the carrier is one or more selected from natural clay, alumina carrier, silica carrier, aluminophosphate carrier, silica alumina carrier, optionally, the slurry comprising the core-shell molecular sieve and the carrier comprises an additive.

B35, the method according to Item B34, wherein the silica carrier is one or more selected from neutral silica sol, acidic silica sol and basic silica sol; the alumina carrier is one or more selected from alumina sol, acidified pseudo-boehmite, hydrated alumina and activated alumina, the aluminophosphate carrier is aluminophosphate gel/sol, and the silica alumina carrier is one or more selected from solid silica alumina material, silica alumina sol and silica alumina gel.

B36, the method according to Item B34 or B35, wherein the catalytic cracking catalyst comprises a silica sol carrier in an amount of 1 to 15 wt %, calculated as $SiO_2$, based on the weight of the catalyst, wherein the silica sol is one or more selected from neutral silica sol, acidic silica sol and basic silica sol.

B37, the method according to Item B14, wherein, in step (A3), the ammonium exchange is performed by exchanging at a weight ratio of catalyst:ammonium salt:$H_2O$=1:(0.1-1):(5-15) at 50-100° C., and filtering, wherein the exchanging and filtering process is carried out for one, two or more times; the ammonium salt is one selected from ammonium chloride, ammonium sulfate, and ammonium nitrate, or a mixture of two or more thereof.

B38, a light hydrocarbon catalytic cracking catalyst obtained by the method according to any one of Items B13 to B37.

B39, the catalytic cracking catalyst according to any one of Items B1 to B12 or Item B38, wherein the catalytic cracking catalyst shows a pore diameter distribution diagram having a pore distribution peak at a pore diameter of 3 to 25 nm, preferably 4 to 20 nm, and has a specific surface area of 80 to 450 $m^2/g$, an external surface area of 20 to 220 $m^2/g$, a total pore volume of 0.15 to 0.35 $cm^3/g$, and a mesopore volume of 0.10 to 0.30 $cm^3/g$.

B40, a light hydrocarbon catalytic cracking process, comprising a step of contacting a light hydrocarbon with a catalytic cracking catalyst, wherein the catalytic cracking catalyst is the catalytic cracking catalyst according to any one of Items B1 to B12, Item B38, or Item B39; the reaction conditions of the contact and reaction include, for example: a reaction temperature of 550-700° C., and a catalyst-to-oil weight ratio of 1-15; a WHSV of 1-30 $h^{-1}$.

C1, a hydrogenated LCO catalytic cracking catalyst, comprising 50-85 wt % of a carrier, and 15-50 wt % of a phosphorus- and metal-containing core-shell molecular sieve; wherein the carrier comprises a silicon-based matrix containing an additive that is one or more selected from boron oxide, aluminum oxide, magnesium oxide and zirconium oxide, and the content of the additive is 5 to 50 wt %, calculated as oxide and based on the dry weight of the additive-containing silicon-based matrix; the core molecular sieve of the phosphorus- and metal-containing core-shell molecular sieve is a ZSM-5 molecular sieve, the shell-layer molecular sieve of the phosphorus- and metal-containing core-shell molecular sieve is a β molecular sieve; based on the dry weight of the phosphorus- and metal-containing core-shell molecular sieve, the phosphorus content, calculated as $P_2O_5$, in the phosphorus- and metal-containing core-shell molecular sieve is 1-10 wt %, the metal content in the phosphorus- and metal-containing core-shell molecular sieve, calculated as metal oxide, is 0.1-10 wt %, and the metal is one or more selected from Fe, Co, Ni, Ga, Zn, Cu, Ti, K and Mg; the phosphorus- and metal-containing core-shell molecular sieve shows an $^{27}$AlMASNMR with a ratio of the area of a resonance signal peak at a chemical shift of 39±3 ppm to the area of a resonance signal peak at a chemical shift of 54±3 ppm of 0.01-∞:1, and the total specific surface area of the core-shell molecular sieve is more than 420 $m^2/g$.

C2, the hydrogenated LCO catalytic cracking catalyst according to Item C1, wherein the phosphorus- and metal-containing core-shell molecular sieve shows an X-ray diffraction pattern with a ratio of the height of a peak at 2θ=22.4°±0.1° to the height of a peak at 2θ=23.1°±0.1° of 0.1-10:1;

the proportion of the mesopore surface area of the phosphorus- and metal-containing core-shell molecular sieve to the total specific surface area thereof is preferably 10% to 40%, for example 20% to 35%;

the average grain size of the shell molecular sieve of the phosphorus- and metal-containing core-shell molecular sieve is preferably 10 nm-500 nm;

the thickness of the shell molecular sieve of the phosphorus- and metal-containing core-shell molecular sieve is preferably 10 nm-2000 nm;

the average grain size of the core molecular sieve of the phosphorus- and metal-containing core-shell molecular sieve is preferably 0.05-15 μm, and the number of crystal grains in the core molecular sieve particles is preferably not less than 2;

the shell coverage of the phosphorus- and metal-containing core-shell molecular sieve is 50-100%.

C3, the hydrogenated LCO catalytic cracking catalyst according to Item C1, wherein the shell molecular sieve of the phosphorus- and metal-containing core-shell molecular sieve has a silica-alumina ratio, calculated as $SiO_2/Al_2O_3$, of 10-500, and the core molecular sieve of the phosphorus- and metal-containing core-shell molecular sieve has a silica-alumina ratio, calculated as $SiO_2/Al_2O_3$, of 10-∞.

C4, the hydrogenated LCO catalytic cracking catalyst according to Item C1, wherein the phosphorus- and metal-containing core-shell molecular sieve has a phosphorus content, calculated as $P_2O_5$, of 2 wt % to 8 wt %, and a metal content, calculated as metal oxide, of 0.2 wt % to 7 wt %.

C5, the hydrogenated LCO catalytic cracking catalyst according to Item C1, wherein the phosphorus- and metal-containing core-shell molecular sieve shows an $^{27}$Al MAS NMR with a ratio of the area of the resonance signal peak at the chemical shift of 39±3 ppm to the area of the resonance signal peak at the chemical shift of 54±3 ppm of 0.3-∞:1.

C6, the hydrogenated LCO catalytic cracking catalyst according to Item C1, wherein the carrier further comprises an additional carrier that is, for example, one or more selected from clay, alumina carrier, silica carrier, silica-alumina carrier, aluminophosphate carrier; based on the weight of the catalytic cracking catalyst, the content, on a dry basis, of the phosphorus- and metal-containing core-shell molecular sieve in the catalytic cracking catalyst is 15-50 wt %, the content, calculated as $SiO_2$, of the additive-containing silicon-based matrix is 1-15 wt %, such as 5-15 wt %, and the content, on a dry basis, of said additional carrier is 35-84 wt %.

C7, the hydrogenated LCO catalytic cracking catalyst according to Item C1, wherein the catalytic cracking catalyst has a sodium oxide content of 0-0.15 wt %.

C8, a method for preparing the hydrocracked LCO catalytic cracking catalyst according to any one of Items C1 to C7, comprising the steps of:

forming a slurry comprising a phosphorus- and metal-containing core-shell molecular sieve, a carrier, and water, drying, and optionally calcining.

C9, the method according to Item C8, comprising the steps of:

(A1) mixing the phosphorus- and metal-containing core-shell molecular sieve, water and a carrier, slurrying, and spray drying to obtain catalyst microspheres;

(A2) calcining the catalyst microspheres obtained in step (A1) at a temperature of 400-600° C. for 2-10 h; and (A3) optionally, subjecting the calcined catalyst microspheres obtained in step (A2) to ammonium exchange, optionally washing, to reduce the $Na_2O$ content in the catalyst microspheres to a level of less than 0.15 wt %;

in an embodiment, the ammonium exchange in step (A3) is performed by exchanging at a weight ratio of catalyst microspheres:ammonium salt:$H_2O$=1:(0.1-1):(5-15) at 50-100° C., and filtering, wherein the exchanging and filtering process is carried out for one, two or more times; the ammonium salt is preferably one selected from ammonium chloride, ammonium sulfate and ammonium nitrate, or a mixture of two or more thereof.

C10, the method according to Item C8 or C9, wherein the method for synthesizing the phosphorus- and metal-containing core-shell molecular sieve comprises a step of contacting the hydrogen-type core-shell molecular sieve with a solution comprising a phosphorus-containing compound and a solution comprising a metal-containing compound sequentially or with a solution comprising both a phosphorus-containing compound and a metal-containing compound, or comprises the steps of:

(B1) contacting a hydrogen-type core-shell molecular sieve with a solution of a phosphorus-containing compound with a pH of 4-10, drying, and optionally calcining to obtain a modified core-shell molecular sieve I;

(B2) subjecting the modified core-shell molecular sieve I to hydrothermal activation at 400-1000° C. in the presence of steam to obtain a modified core-shell molecular sieve II;

(B3) contacting the modified core-shell molecular sieve II with a solution comprising a metal-containing compound, drying and calcining to obtain the phosphorus- and metal-containing core-shell molecular sieve.

C11, the method according to Item C10, wherein, in step (B1), the pH of the solution of the phosphorus-containing compound is 5-8.

C12, the method according to Item C10, wherein, in step (B2), the hydrothermal activation is performed by calcining the modified core-shell molecular sieve I in an atmosphere comprising steam at a calcining temperature of 400° C. to 1000° C. for a calcining time of 0.5 h to 24 h; the content by volume of steam in the atmosphere comprising steam is preferably 10-100%.

C13, the method according to Item C10, wherein, in step (B3), the modified core-shell molecular sieve II is contacted with the solution comprising the metal-containing compound; the metal-containing compound is one or more selected from nitrate, chloride and sulfate of the metal.

C14, the method according to Item C10, wherein the hydrogen-type core-shell molecular sieve is obtained by a method comprising the steps of:

(C1) contacting a ZSM-5 molecular sieve with a surfactant solution to obtain a ZSM-5 molecular sieve I;

(C2) contacting the ZSM-5 molecular sieve I with a slurry comprising a β molecular sieve to obtain a ZSM-5 molecular sieve II that is a ZSM-5 molecular sieve comprising the β molecular sieve;

(C3) forming a mixture of a silicon source, an aluminum source, a template and deionized water, and carrying out a first crystallization at 50-300° C. for 4-100 h to obtain a synthesis liquid III;

(C4) mixing the ZSM-5 molecular sieve II with the synthesis liquid III, carrying out a second crystallization at 50-300° C. for 10-400 h, and filtering, optionally washing, optionally drying and optionally calcining after the completion of the second crystallization to obtain a core-shell molecular sieve IV;

(C5) subjecting the core-shell molecular sieve IV to ammonium and/or acid exchange, drying and calcining to obtain a hydrogen-type core-shell molecular sieve.

C15, the method according to Item C14, wherein the contacting in step (C1) is performed by: adding the ZSM-5 molecular sieve into the surfactant solution for treatment for at least 0.5 hour, filtering and drying to obtain the ZSM-5 molecular sieve I; wherein the concentration expressed in weight percentage of the surfactant in the surfactant solution is 0.05-50%, and the weight ratio of the surfactant solution to the ZSM-5 molecular sieve, on a dry basis, in step (C1) is 10-200:1;

the contacting in step (C2) is performed by: adding the ZSM-5 molecular sieve I into the slurry comprising the β molecular sieve, stirring for 0.5 hour or more at a temperature of 20-60° C., and then filtering and drying to obtain the ZSM-5 molecular sieve II.

C16, the method according to Item C14, wherein the surfactant solution further comprises a salt; the concentration of the salt in the surfactant solution is preferably 0.05 wt % to 10 wt %, and the salt is, for example, one or more selected from sodium chloride, potassium chloride, ammonium chloride, and ammonium nitrate.

C17, the method according to Item C14 or C15, wherein in step (C1):

the ZSM-5 molecular sieve has a silica to alumina molar ratio of 10-∞, 20-300 or 25-70, calculated as $SiO_2/Al_2O_3$, and the ZSM-5 molecular sieve has an average grain size of 0.05-20 μm; the ZSM-5 molecular sieve has an average particle size of 0.1 μm to 30 μm; the ZSM-5 molecular sieve is one or more selected from a Na-type ZSM-5 molecular sieve, a hydrogen-type ZSM-5 molecular sieve or a metal ion-exchanged ZSM-5 molecular sieve;

in step (C1), the contacting temperature is 20-70° C., and the contacting time is at least 0.5 h;

the surfactant may be at least one selected from the group consisting of polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, and tetrabutylammonium hydroxide.

C18, the method according to Item C14, wherein the concentration of the β molecular sieve in the slurry comprising the β molecular sieve of step (C2) is 0.1-10 wt %; in step (C2), the weight ratio of the slurry comprising the β molecular sieve to the ZSM-5 molecular sieve I, on a dry basis, is 10-50:1; and in the slurry comprising the β molecular sieve used in step (C2), the average grain size of the β molecular sieve is 10 nm to 500 nm, and the silica to alumina molar ratio $SiO_2/Al_2O_3$ of the β molecular sieve is 10 to 500.

C19, the method according to Item C18, wherein, the step (C3) comprises:

mixing the silicon source, the aluminum source, the template and deionized water to form a synthesis liquid, and then carrying out a first crystallization to obtain the synthesis liquid III; wherein the first crystallization is carried out at a crystallization temperature of 75-250° C. for a crystallization time of 10-80 h; preferably, the first crystallization is carried out at a crystallization temperature of 80-180° C. for a crystallization time of 18-50 hours;

in step (C3), the molar ratio of the silicon source, the aluminum source, the template R, and water is:

$R/SiO_2$=0.1-10:1, $H_2O/SiO_2$=2-150:1, $SiO_2/Al_2O_3$=20-800:1, and $Na_2O/SiO_2$=0-2:1; the silicon source is at least one selected from tetraethoxysilane, water glass, coarse silica gel, silica sol, silica white or activated clay; the aluminum source is at least one selected from aluminum sulfate, aluminum isopropoxide, aluminum nitrate, alumina sol, sodium metaaluminate or γ-alumina; the template is at least one selected from tetraethyl ammonium fluoride, tetraethyl ammonium hydroxide, tetraethyl ammonium bromide, polyvinyl alcohol, triethanolamine and sodium carboxymethyl cellulose.

C20, the method according to Item C14 or C19, wherein in step (C3), the first crystallization produces the synthetic fluid III, of which the XRD pattern shows a peak at 2θ=22.4°±0.1°, and no peak at 2θ=21.2°±0.1°.

C21, the method according to Item C14, wherein, in step (C4), the ZSM-5 molecular sieve II is added to the synthesis solution III at a weight ratio of the synthesis solution III to the ZSM-5 molecular sieve II, on a dry basis, of 2-10:1; the second crystallization is performed at a crystallization temperature of 50-300° C. for 10-400 h; the temperature of the second crystallization is 100-250° C., the crystallization time is 30-350 h, for example, the second crystallization temperature is 100-200° C., and the second crystallization time is 50-120 h.

C22, the method according to Item C10 or C14, wherein the sodium oxide content of the hydrogen-type core-shell molecular sieve is not more than 0.2 wt %.

C23, the method according to Item C14 or C15, wherein the carrier comprises a silica-based matrix containing an additive and an additional carrier comprising one or more selected from clay, alumina carrier, silica carrier, aluminophosphate carrier; the additive-containing silicon-based matrix comprises silica and an additive that is one or more selected from boron oxide, aluminum oxide, magnesium oxide and zirconium oxide, and calculated as oxide and based on the weight of the additive-containing silicon-based matrix, the additive content is 5-50 wt % and the silica content is 50-95 wt %; and the content of the additive-containing silicon-based matrix in the catalytic cracking catalyst is 1-15 wt %, calculated as $SiO_2$ and based on the weight of the catalytic cracking catalyst.

C24, the method according to Item C14 or C23, wherein the silica carrier is one or more selected from neutral silicon-based matrix, acidic silicon-based matrix or basic silicon-based matrix, for example the silica carrier is one or more selected from neutral silica sol, acidic silica sol and basic silica sol.

C25, the method according to Item C14 or C23, wherein the additive-containing silicon-based matrix is obtained by modifying a silica carrier by adding thereinto a metal salt solution; and the additive-containing silicon-based matrix is obtained by a method comprising:

step (1): preparing a solution comprising a salt of an additive element at a concentration of 10-50 wt %, wherein the additive element is one or more selected from boron, aluminum, magnesium and zirconium;

step (2): adding the solution comprising the salt of the additive element into a silicon-based matrix, and adding aqueous ammonia to adjust the pH value to 6-7, and step (3): filtering, drying and calcining.

C26, the method according to Item C25, wherein the additive-containing silicon-based matrix obtained has a most probable distribution of mesopores in a range from 4 nm to 10 nm.

C27, a catalytic cracking catalyst obtained by the method according to any one of Items C8 to C26.

C28, the catalytic cracking catalyst according to any one of Items C1 to C7 or Item C27, wherein the catalytic cracking catalyst shows a pore distribution diagram in which there is a pore distribution peak at a pore diameter of 4 to 35 nm, preferably at a pore diameter of 5 to 25 nm; and has a specific surface area of preferably 100-450 $m^2/g$, an external surface area of preferably 60-220 $m^2/g$; a total pore volume of preferably 0.15-0.35 $cm^3/g$, and a mesopore volume of preferably 0.10-0.30 $cm^3/g$.

C29, a process for catalytic conversion of hydrogenated LCO, comprising a step of contacting a hydrogenated LCO with a catalytic cracking catalyst according to any one of Items C1 to C7, Item C27 and Item 28 for a catalytic cracking reaction; preferably, the reaction conditions include: a reaction temperature of 550-700° C., a weight hourly space velocity of 1-30 $h^{-1}$, and a catalyst-to-oil weight ratio of 5-30.

C30, an additive-containing silicon-based matrix, comprising a silica carrier and an additive, wherein the additive is one or more selected from boron oxide, aluminum oxide, magnesium oxide and zirconium oxide, and preferably, the additive-containing silicon-based matrix has a most probable distribution of mesopores in a range of 4 nm to 10 nm.

D1, a catalytic cracking catalyst for producing gasoline and light olefin by catalytic cracking of heavy oil, comprising 30-79 wt % of a carrier, 5-15 wt % of a phosphorus- and metal-containing core-shell molecular sieve, 15-45 wt % of a Y molecular sieve, 1-10 wt % of a molecular sieve having a pore opening diameter of 0.65-0.70 nm; wherein, the core of the phosphorus- and metal-containing core-shell molecular sieve is a ZSM-5 molecular sieve, the shell of the phosphorus- and metal-containing core-shell molecular sieve is a β molecular sieve, the phosphorus- and metal-containing core-shell molecular sieve has a phosphorus content, calculated as $P_2O_5$, of 1-10 wt %, and a metal content, calculated as metal oxide, of 0.1-10 wt %, and the metal is one or more selected from Fe, Co, Ni, Ga, Zn, Cu, Ti, K and Mg; the phosphorus- and metal-containing core-shell molecular sieve shows an $^{27}Al$ MAS NMR with a ratio of the area of a resonance signal peak at a chemical shift of 39±3 ppm to the area of a resonance signal peak at a chemical shift of 54±3 ppm of 0.01-∞:1, and has a total specific surface area of more than 420 $m^2/g$.

D2, the catalyst according to Item D1, wherein the phosphorus- and metal-containing core-shell molecular sieve shows an $^{27}Al$ MAS NMR with a ratio of the area of the resonance signal peak at the chemical shift of 39±3 ppm to the area of the resonance signal peak at the chemical shift of 54±3 ppm of 0.3-∞:1.

D3, the catalyst according to Item D1, wherein the phosphorus- and metal-containing core-shell molecular sieve shows an X-ray diffraction pattern with a ratio of the height of a peak at 2θ=22.4°±0.1° to the height of a peak at 2θ=23.1°±0.1° of 0.1-10:1, and the phosphorus- and metal-containing core-shell molecular sieve has a shell coverage of 50-100%.

D4, the catalyst according to Item D1, wherein the average grain size of the shell molecular sieve of the phosphorus- and metal-containing core-shell molecular sieve is 10 nm to 500 nm, the thickness of the shell molecular sieve of the phosphorus- and metal-containing core-shell molecular sieve is 10 nm to 2000 nm; and the silica-alumina ratio, calculated as $SiO_2/Al_2O_3$, of the shell molecular sieve of the phosphorus- and metal-containing core-shell molecular sieve is 10-500.

D5, the catalyst according to Item D1, wherein the silica-alumina ratio, calculated as $SiO_2/Al_2O_3$, of the core molecular sieve of the phosphorus- and metal-containing core-shell molecular sieve is 10-∞; the average grain size of the core molecular sieve is 0.05-15 and the number of crystal grains in the core molecular sieve particles is not less than 2.

D6, the catalyst according to Item D1, wherein the mesopore surface area of the phosphorus- and metal-containing core-shell molecular sieve accounts for 10% to 40%, such as 20% to 35%, of the total specific surface area thereof.

D7, the catalyst according to Item D1, wherein the phosphorus- and metal-containing core-shell molecular sieve has a metal content, calculated as metal oxide, of 0.2 wt % to 7 wt %, and a phosphorus content, calculated as $P_2O_5$, of 2 wt % to 8 wt %.

D8, the catalyst according to Item D1, wherein the carrier is one or more selected from alumina sol, zirconia sol, pseudo-boehmite, silica sol, and clay, the catalytic cracking catalyst comprises 10-50 wt %, on a dry basis, of clay, 2-25 wt %, calculated as alumina, of alumina sol, 5-30 wt %, calculated as alumina, pseudo-boehmite and 1-15 wt %, calculated as silica, of silica sol, 5-15 wt %, on a dry basis, of the phosphorus- and metal-containing core-shell molecular sieve, 15-45 wt %, on a dry basis, of a Y molecular sieve and 1-15 wt %, on a dry basis, of a molecular sieve having a pore opening diameter of 0.65-0.70 nm; the Y molecular sieve is preferably a rare earth-containing Y molecular sieve, the content of rare earth in the rare earth-containing Y molecular sieve is 5-17 wt %, calculated as $RE_2O_3$, the molecular sieve having a pore opening diameter of 0.65-0.70 nm is preferably a β molecular sieve, and the β molecular sieve is, for example, a hydrogen-type β molecular sieve.

D9, a method for preparing a catalytic cracking catalyst, comprising the steps of: forming a slurry comprising a first molecular sieve, a second molecular sieve, a third molecular sieve, a carrier and water, and spray drying; wherein the first molecular sieve is a phosphorus- and metal-containing core-shell molecular sieve, the second molecular sieve is a Y molecular sieve, and the third molecular sieve is a molecular sieve having a pore opening diameter of 0.65-0.70 nm.

D10, the method according to Item D9, comprising the steps of:

(A1) mixing the phosphorus- and metal-containing core-shell molecular sieve, the Y molecular sieve, the third molecular sieve, water and the carrier, slurrying, and spray drying to obtain catalyst microspheres;

(A2) calcining the catalyst microspheres obtained in step (A1) at a temperature of 400-600° C. for 2-10 h; and (A3) optionally, subjecting the calcined catalyst microspheres obtained in step (A2) to ammonium exchange and/or washing to reduce the $Na_2O$ content in the catalyst microspheres to a level of less than 0.15 wt %.

D11, the method according to Item D9, wherein the phosphorus- and metal-containing core-shell molecular sieve is obtained by a method comprising the steps of:

(B1) contacting a hydrogen-type core-shell molecular sieve with a solution of a phosphorus-containing compound with a pH of 4-10, drying, and optionally calcining to obtain a modified core-shell molecular sieve I;

(B2) subjecting the modified core-shell molecular sieve I to hydrothermal activation at 400-1000° C. in the presence of steam to obtain a modified core-shell molecular sieve II;

(B3) contacting the modified core-shell molecular sieve II with a solution comprising a metal-containing compound, drying and calcining to obtain the phosphorus- and metal-containing core-shell molecular sieve, wherein the metal is one or more selected from Fe, Co, Ni, Ga, Zn, Cu, Ti, K and Mg.

D12, the method according to Item D11, wherein, in step (B1), the pH of the solution of the phosphorus-containing compound is 5-8.

D13, the method according to Item D11, wherein, in step (B2), the hydrothermal activation is performed by calcining the modified core-shell molecular sieve I in an atmosphere comprising steam at a calcining temperature of 400-1000° C. for a calcining time of 0.5-24 h; wherein the content by volume of steam in the atmosphere comprising steam is preferably 10-100%.

D14, the method according to Item D11, wherein, in step (B3), the modified core-shell molecular sieve II is contacted with the solution comprising the metal-containing compound; and the metal-containing compound is one or more selected from nitrate, chloride and sulfate of the metal.

D15, the method according to Item D11, wherein the hydrogen-type core-shell molecular sieve is obtained by a method comprising the steps of:

(C1) contacting a ZSM-5 molecular sieve with a surfactant solution to obtain a ZSM-5 molecular sieve I;

(C2) contacting the ZSM-5 molecular sieve I with a slurry comprising a β molecular sieve to obtain a ZSM-5 molecular sieve II that is a ZSM-5 molecular sieve comprising the β molecular sieve;

(C3) forming a mixture of a silicon source, an aluminum source, a template and deionized water, and carrying out a first crystallization at 50-300° C. for 4-100 h to obtain a synthesis liquid III;

(C4) mixing the ZSM-5 molecular sieve II with the synthesis liquid III, carrying out a second crystallization at 50-300° C. for 10-400 h, and filtering, optionally washing, optionally drying and optionally calcining after the completion of the second crystallization to obtain a core-shell molecular sieve IV;

(C5) subjecting the core-shell molecular sieve IV to ammonium and/or acid exchange, drying and calcining to obtain the H-type molecular sieve.

D16, the method according to Item D15, wherein the contacting in step (C1) is performed by: adding the ZSM-5 molecular sieve into the surfactant solution for treatment for at least 0.5 hour, filtering and drying to obtain the ZSM-5 molecular sieve I; wherein the concentration expressed in weight percentage of the surfactant in the surfactant solution is 0.05-50%, and the weight ratio of the surfactant solution to the ZSM-5 molecular sieve, on a dry basis, used in step (C1) is 10-200:1.

D17, the method according to Item D15 or D16, wherein the surfactant solution further comprises a salt; the concentration of the salt in the surfactant solution is preferably 0.05 wt % to 10 wt %, and the salt is, for example, one or more selected from sodium chloride, potassium chloride, ammonium chloride and ammonium nitrate.

D18, the method according to Item D15, wherein, in step (C1), the ZSM-5 molecular sieve has a silica to alumina molar ratio, calculated as $SiO_2/Al_2O_3$, of 10-∞ or 20-300 or 25-70, and the ZSM-5 molecular sieve has an average grain size of 0.05 μm to 20 μm; the ZSM-5 molecular sieve has an average particle size of 0.1 μm to 30 μm; the ZSM-5 molecular sieve is a Na-type ZSM-5 molecular sieve, a hydrogen-type ZSM-5 molecular sieve or a metal ion-exchanged ZSM-5 molecular sieve;

in step (C1), the contacting temperature is preferably 20° C. to 70° C., and the contacting time is preferably at least 0.5 h.

D19, the method according to Item D15, wherein the surfactant is at least one selected from polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide.

D20, the method according to Item D15, wherein, in step (C2), the concentration of the β molecular sieve in the slurry comprising the β molecular sieve is 0.1 wt % to 10 wt %, the average grain size of the β molecular sieve in the slurry comprising the β molecular sieve is 10 nm to 500 nm, and the silica to alumina molar ratio, calculated as $SiO_2/Al_2O_3$, of the β molecular sieve in the slurry comprising the β molecular sieve is 10 to 500; the weight ratio of the slurry comprising the β molecular sieve to the ZSM-5 molecular sieve I, on a dry basis, is 10-50:1.

D21, the method according to Item D15, wherein the contacting in step (C2) is performed by: adding the ZSM-5 molecular sieve I into the slurry comprising the β molecular sieve, stirring for 0.5 hour or more at a temperature of 20-60° C., and then filtering and drying to obtain the ZSM-5 molecular sieve II.

D22, the method according to Item D15, wherein in step (C3), the molar ratio of the silicon source, the aluminum source, the template R and water is: $R/SiO_2$=0.1-10:1, $H_2O/SiO_2$=2-150:1, $SiO_2/Al_2O_3$=20-800:1, and $Na_2O/SiO_2$=0-2:1; and step (C3) comprises mixing the silicon source, the aluminum source, the template and deionized water to form a synthesis liquid, and then carrying out the first crystallization at a crystallization temperature of 75-250° C. for 10-80 h to obtain the synthesis liquid III; the silicon source is at least one selected from tetraethoxysilane, water glass, coarse silica gel, silica sol, silica white or activated clay; the aluminum source is at least one selected from aluminum sulfate, aluminum isopropoxide, aluminum nitrate, alumina sol, sodium metaaluminate or γ-alumina; the template is at least one selected from tetraethyl ammonium fluoride, tetraethyl ammonium hydroxide, tetraethyl ammonium bromide, polyvinyl alcohol, triethanolamine and sodium carboxymethyl cellulose.

D23, the method according to Item D15 or D22, wherein the first crystallization in step (C3) is performed at a crystallization temperature of 80-180° C. for a crystallization time of 18-50 hours;

preferably, the first crystallization in step (C3) is performed to obtain the synthetic fluid III, of which the XRD pattern shows a peak at 2θ=22.4°±0.1° and no peak at 2θ=21.2°±0.1°.

D24, the method according to Item D15, wherein, in step (C4), the ZSM-5 molecular sieve II is added to the synthesis solution III at a weight ratio of the synthesis solution III to the ZSM-5 molecular sieve II, on a dry basis, of 2-10:1; the second crystallization is performed at a crystallization temperature of 50-300° C. for 10-400 h; the second crystallization temperature is preferably 100-250° C., the crystallization time is preferably 30-350 h, for example, the second crystallization temperature is 100-200° C., and the second crystallization time is 50-120 h.

D25, the method according to Item D15, wherein the sodium oxide content of the H-type molecular sieve is not more than 0.2 wt %.

D26, the method according to Item D9, wherein the Y molecular sieve has a rare earth content of 5 to 17 wt %, calculated as $RE_2O_3$; the third molecular sieve is preferably a β molecular sieve, and the carrier is one or more selected from clay, alumina carrier and silica carrier.

D27, the method according to Item D26, wherein the silica carrier is one or more selected from neutral silica sol, acidic silica sol and basic silica sol; preferably, the content of silica sol in the catalytic cracking catalyst is 1-15 wt %, calculated as $SiO_2$.

D28, the method according to Item D15, wherein the ammonium exchange of step (A3) is performed by exchanging at a weight ratio of catalyst:ammonium salt:$H_2O$=1:(0.1-1):(5-15) at 50-100° C., and filtering, wherein the exchanging and filtering process is carried out for one, two or more times; the ammonium salt is one selected from ammonium chloride, ammonium sulfate, and ammonium nitrate, or a mixture of two or more thereof.

D29, a catalytic cracking catalyst obtained by the method according to any one of Items D10 to D28.

D30, a process for catalytic cracking of heavy oil, comprising a step of contacting a heavy oil with the catalytic cracking catalyst according to any one of Items D1 to D8 or Item D29 for reaction; preferred reaction conditions include: a reaction temperature of 480-600° C., more preferably 500-550° C., a weight hourly space velocity of 5-30 $h^{-1}$, preferably 8-20 $h^{-1}$, and a catalyst-oil ratio of 1-15, preferably 2-12.

EXAMPLES

The present application will be further illustrated with reference to the following examples, but the present application is not limited thereto.

In the following examples and comparative examples, the contents of $Na_2O$, $SiO_2$, $P_2O_5$ and $Al_2O_3$ in a molecular sieve were measured by an X-ray fluorescence method (see "Petrochemical Analysis Methods (RIPP Test Methods)", edited by Cuiding YANG et al., Science Press, published in 1990). The $^{27}$Al MAS NMR was determined using Bruker Avance III 500 MHz NMR instrument, and the peak area was calculated by peak-splitting fitting of the resonance peak spectrum.

In the following examples and comparative examples, XRD analysis was performed using the following instruments and test conditions: the instrument was Empyrean; and testing conditions included: tube voltage 40 kV, tube current 40 mA, Cu target and Kα radiation, 2θ scanning range 5-35°, scanning speed 2(°)/min. The mass ratio of the core to the shell was calculated based on the diffraction peak obtained in X-ray diffraction analysis, and the fitting calculation was performed using the JADE software by means of the fitting function pseudo-voigt.

The grain size and particle size of the molecular sieve was measured by SEM, in which the sizes of 10 crystal grains were randomly measured, of which the average value was taken as the average grain size of the molecular sieve sample; the sizes of 10 particles were randomly measured, of which the average value was taken as the average particle size of the molecular sieve sample.

The thickness of the shell is measured by TEM method, in which the thickness of the shell at a position of a core-shell molecular sieve particle is randomly measured, 10 particles were measured, and the average value of the 10 particles was taken.

The coverage of the molecular sieve was measured by SEM method, in which the proportion of the external surface area of the shell on a core particle to the external surface area of the core particle was calculated as the coverage of the particle, 10 particles were randomly measured, and the average value was taken.

The mesopore surface area (mesopore specific surface area), specific surface area, pore volume (total pore volume) and pore diameter distribution were measured by low-temperature nitrogen adsorption volume method, using an ASAP2420 adsorption apparatus from Micromeritics Instrument Corp, USA. The samples were vacuum degassed at 100° C. and 300° C. for 0.5 h and 6 h, respectively, and subjected to an $N_2$ adsorption/desorption test at 77.4K, and the adsorption amount and desorption amount of the samples for nitrogen were measured under different specific pressures, to obtain a $N_2$ adsorption-desorption isotherm curve. The BET specific surface area (total specific surface area) was calculated using the BET formula, and the micropore area was calculated using t-plot.

The core molecular sieve was measured using an XRF fluorescence method, and the silica-alumina ratio of the shell molecular sieve was measured using a TEM-EDS method.

XRD analysis of the pre-crystallized synthesis liquid III was carried as follows: the pre-crystallized synthetic fluid III was filtered, washed with deionized water 8 times the weight of the solid, dried at 120° C. for 4 hours, calcined at 550° C. for 4 hours, and cooled before XRD measurement (the XRD measurement was performed using the same equipment and analysis method as described above).

The example series I illustrates the preparation and properties of the phosphorus- and metal-containing ZSM-5/β core-shell molecular sieve according to the present application.

Example I-1

(1) at room temperature (25° C.), 10.0 g of ZSM-5 molecular sieve (hydrogen-type ZSM-5, with silica-alumina ratio of 30, average grain size of 1.2 μm, average particle size of the particles of agglomerated grains of 15 μm, crystallinity of 93.0%) was added as a core into 100.0 g of an aqueous solution containing methyl methacrylate and sodium chloride (having a sodium chloride concentration of 5.0%) with a methyl methacrylate content by mass of 0.2%, stirred for 1 h, filtered and dried at 50° C. in an air atmosphere to obtain a ZSM-5 molecular sieve material I;

(2) the ZSM-5 molecular sieve material I was added into a β molecular sieve suspension (a suspension formed by an Hβ molecular sieve and water, with a concentration by weight of the β molecular sieve in the suspension of 0.3 wt %, average grain size of the β molecular sieve of 200 nm, silica-alumina ratio of 30, crystallinity of 89.0%, and the particles of the β molecular sieve being composed of a single crystal grain) at a weight ratio of the ZSM-5 molecular sieve material I, on a dry basis, to the β molecular sieve suspension of 1:10, stirred for 1 hour at 50° C., filtered, and the resulting filter cake was dried in an air atmosphere at 90° C. to obtain a ZSM-5 molecular sieve material II;

(3) 2.0 g of aluminum isopropoxide was dissolved in 30 g of deionized water, 1.30 g of NaOH particles were added, 20.0 g of basic silica sol (with a $SiO_2$ content of 25.0 wt %, a pH value of 10.0 and a sodium oxide content of 0.10 wt %) and 40 g of tetraethylammonium hydroxide solution (with the content by mass of tetraethylammonium hydroxide in the tetraethylammonium hydroxide solution being 25 wt %) were added sequentially, stirred uniformly, then transferred into a reaction kettle with a polytetrafluoroethylene lining for crystallization, and crystallized at 80° C. for 48 hours to obtain a pre-crystallized synthesis liquid III; after a sample of the pre-crystallized synthesis liquid III was filtered, washed, dried and calcined, it can be observed that there was a peak at 2θ=22.4°±0.1° and no peak at 2θ=21.2°±0.1° in the XRD pattern, and the obvious upcoming peak at 22.4°±0.1° indicated that the pre-crystallization of the shell β molecular sieve was completed;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), crystallized at 120° C. for 60 hours, and filtered to obtain a ZSM-5/β core-shell molecular sieve (which was a sodium-type ZSM-5/β core-shell molecular sieve), designated as HK-I-1, of which the properties are shown in Table I-1;

(5) ammonium exchange was carried out on the ZSM-5/β molecular sieve HK-1 to reduce the sodium oxide content to a level of less than 0.1 wt %, to obtain a hydrogen-type core-shell molecular sieve, wherein the ammonium exchange conditions included: a weight ratio of HK-1 molecular sieve:ammonium chloride: $H_2O$=1:0.5:10, an ammonium exchange temperature of 80° C., and an ammonium exchange time of 1 h. After the ammonium exchange, the resultant was filtered, washed, dried and calcined for 3 hours at 500° C. to obtain a ZSM-5/β core-shell molecular sieve, designated as core-shell molecular sieve A1;

(6) 1.4 g of $H_3PO_4$ (with a concentration of 85 wt %) was dissolved in 10 g of deionized water, then added into 10 g of the core-shell molecular sieve A1, adjusted to a pH of 6 using aqueous ammonia with a concentration of 25 wt %, and fully and uniformly mixed; filtered, dried for 4 h at 115° C. in air atmosphere; then calcined for 2 h at 550° C.;

(7) the product obtained in step (6) was subjected to a hydrothermal treatment for 4 h at 600° C. under 100% steam;

(8) 0.55 g of $Fe(NO_3)_3 \cdot 6H_2O$ was dissolved in 10 g of deionized water, then added into the product obtained in step (7), and fully and uniformly mixed; and then dried for 4 hours at 115° C. in an air atmosphere, and calcined for 2 hours at 550° C. to obtain the phosphorus- and metal-containing core-shell molecular sieve of the present application, designated as PMH-I-1.

FIG. 1 shows the $^{27}Al$ MAS NMR spectrum of the phosphorus- and metal-containing ZSM-5/β core-shell molecular sieve obtained in Example I-1, from which it is apparent that the resonance signal peak of Al is concentrated at the position of a chemical shift of 39±3 ppm.

Figure 2A:
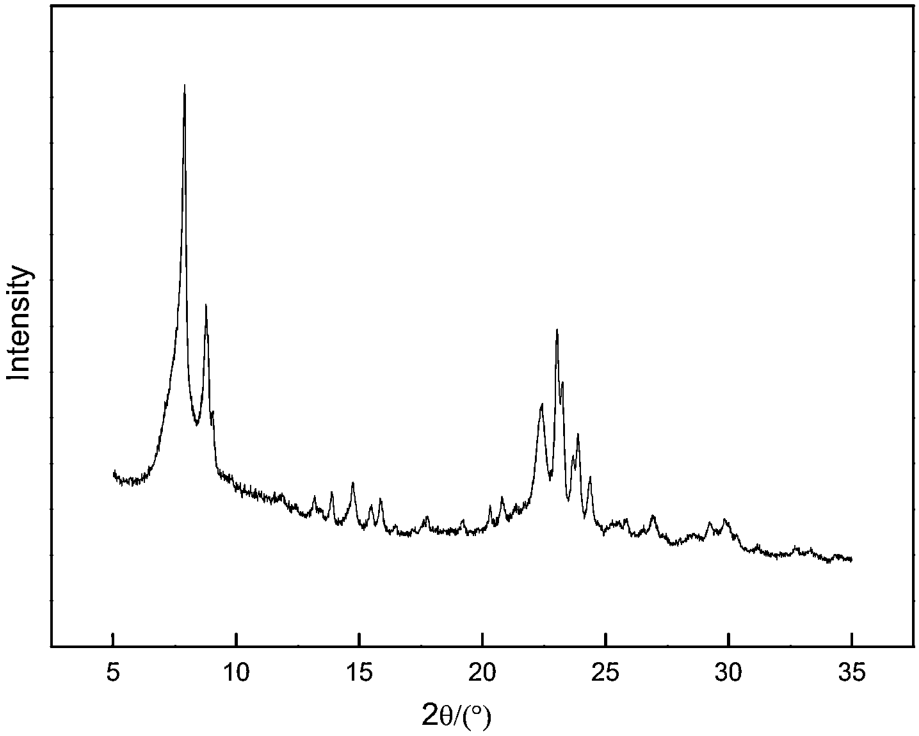
FIG. 2A shows an XRD pattern of the phosphorus- and metal-containing ZSM-5/β core-shell molecular sieve obtained in Example I-1 of the present application.
Figure 2B:
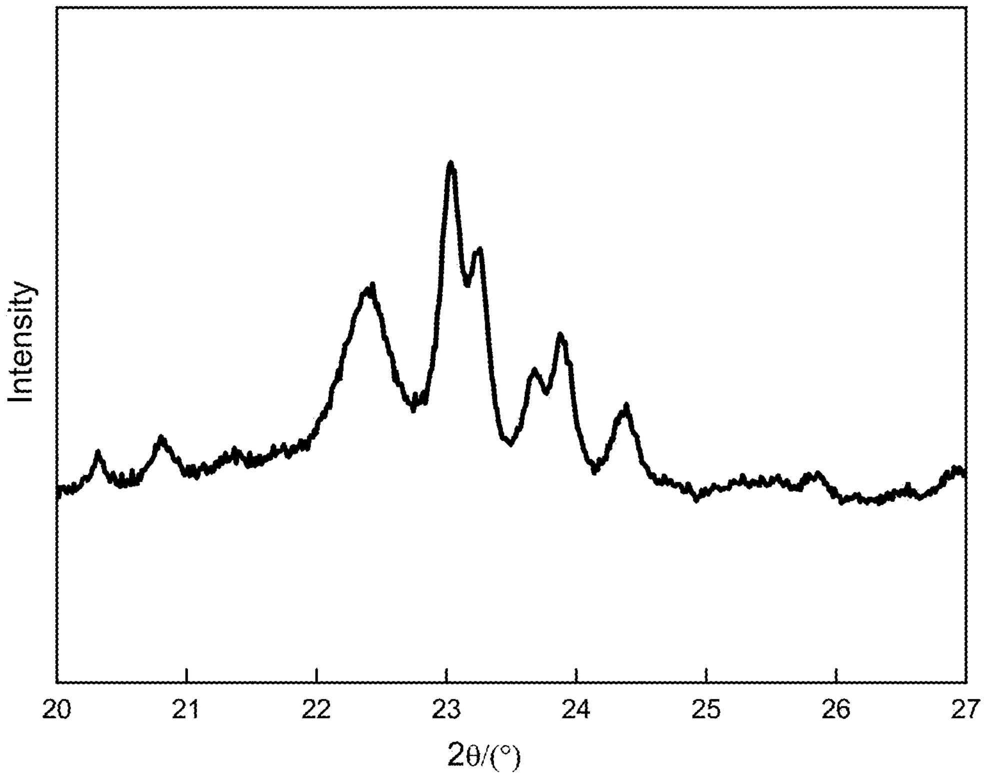
FIG. 2B shows a partial enlarged view of the XRD pattern.

FIG. 2A shows an XRD pattern of the phosphorous- and metal-containing ZSM-5/β core-shell molecular sieve obtained in Example I-1, and FIG. 2B shows a partial enlarged view of the XRD pattern, in which diffraction peaks at 2θ of 22.4°±0.1° and 2θ of 23.1°±0.1° are characteristic peaks of the shell and the core, respectively.

Figure 3A:
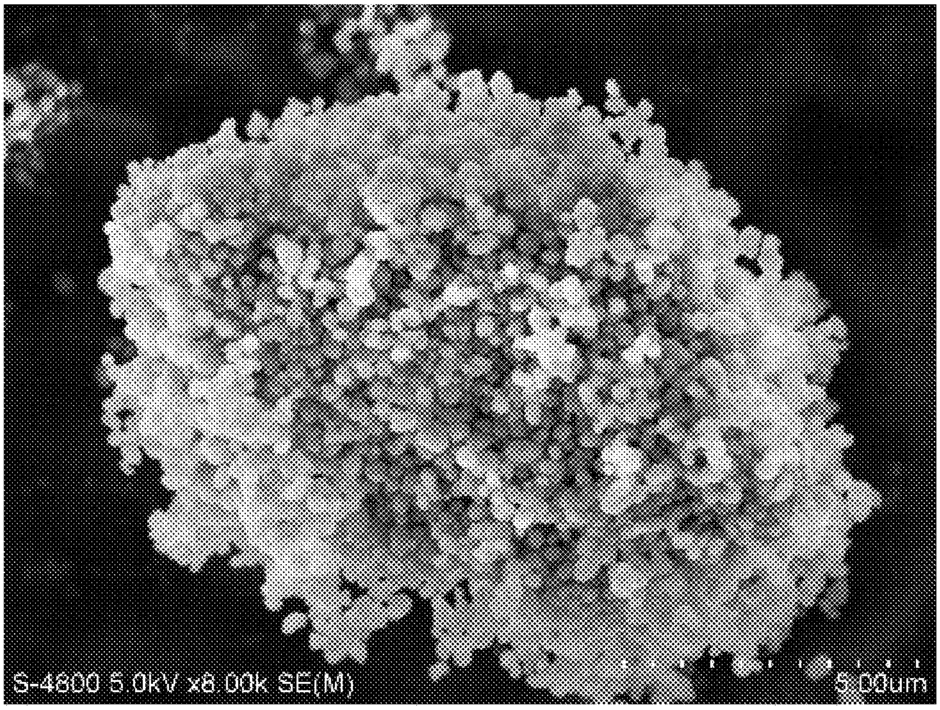
FIGS. 3A and 3B show a SEM image of the phosphorus- and metal-containing ZSM-5/β core-shell molecular sieve obtained in Example I-1 of the present application.
Figure 3B:
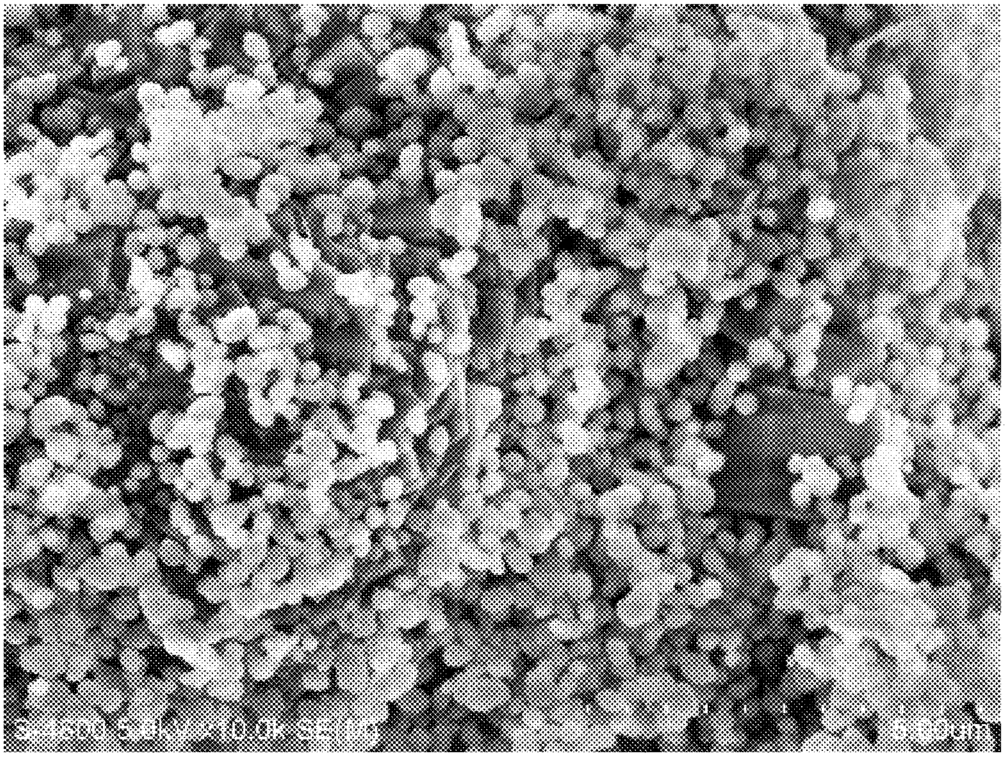
Figure 4:
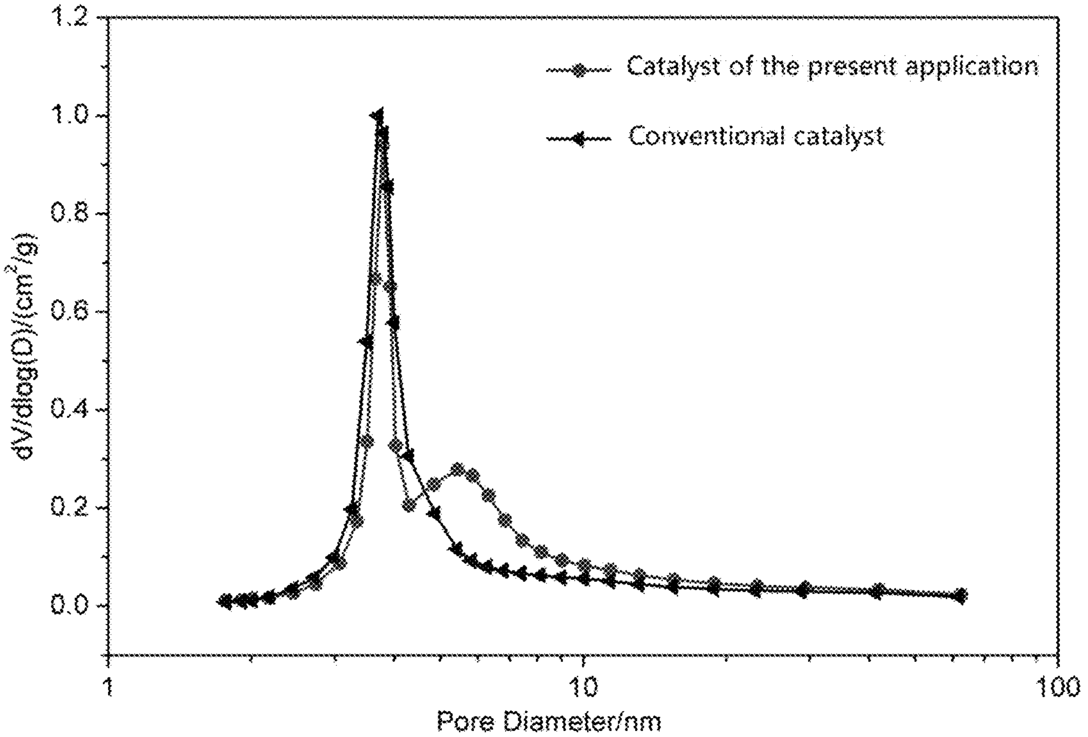
FIG. 4 is a diagram showing the pore diameter distribution of the light hydrocarbon catalytic cracking catalyst obtained in Example II-5 of the present application and the pore diameter distribution of a conventional catalyst prepared according to the prior art.

FIGS. 3A and 3B show SEM images of the phosphorus- and metal-containing ZSM-5/β core-shell molecular sieve obtained in Example I-1. As shown in the figure, the coverage of the shell β molecular sieve of the core-shell molecular sieve is good; at a high magnification (FIG. 3B), the structure of the core molecular sieve, which is composed of multiple crystal grains, can be seen.

Example I-2

The core-shell molecular sieve A1 obtained in step (5) of Example I-1 was used as a parent molecular sieve, 1.4 g of $H_3PO_4$ (with a concentration of 85%) and 0.55 g of $Fe(NO_3)_3 \cdot 6H_2O$ were dissolved in 10 g of deionized water, then added to 10 g of the core-shell molecular sieve A1, adjusted to a pH of 6 with 25% aqueous ammonia, fully and uniformly mixed; dried at 115° C. in an air atmosphere for 4 h; then calcined at 550° C. for 2 h, and the product was designated as PMH-I-2.

Comparative Example I-1

(1) 1.4 g of $H_3PO_4$ (with a concentration of 85%) and 0.55 g of $Fe(NO_3)_3 \cdot 6H_2O$ were dissolved in 10 g of deionized water, then added into 10 g of ZSM-5 molecular sieve (hydrogen-type ZSM-5, with silica-alumina ratio of 30, average grain size of 1.2 μm, average particle size of the particles of agglomerated grains of 25 μm, crystallinity of 93.0%), adjusted to a pH of 6 with 25% aqueous ammonia, and fully and uniformly mixed; dried at 115° C. in an air atmosphere for 4 h; then calcined for 2 hours at 550° C. to obtain a phosphorus- and metal-containing ZSM-5 molecular sieve;

(2) 2.0 g of aluminum isopropoxide was dissolved in 30 g of deionized water, 1.3 g of NaOH particles were added, 20.0 g of silica sol (with a $SiO_2$ content of 25.0 wt %) and 40 g of tetraethylammonium hydroxide solution (with the content by mass of tetraethylammonium hydroxide in the tetraethylammonium hydroxide solution being 25 wt %), uniformly stirred, then transferred into a reaction kettle with a polytetrafluoroethylene lining for crystallization, crystallized at 120° C. for 60 hours, filtered, washed, dried and calcined to obtain a β molecular sieve; ammonium exchange was carried out on the β molecular sieve under conditions including: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 2 h at 550° C.; 1.4 g of $H_3PO_4$ (with a concentration of 85%) and 0.55 g of $Fe(NO_3)_3 \cdot 6H_2O$ were dissolved in 10 g of deionized water, then added into 10 g of the resulting β molecular sieve, adjusted to a pH of 6 with 25% aqueous ammonia, and fully and uniformly mixed; dried at 115° C. in an air atmosphere for 4 h; then calcined for 2 hours at 550° C. to obtain a phosphorus- and metal-containing β molecular sieve;

(3) the molecular sieves obtained in step (1) and step (2) were mechanically mixed at a ratio of 6:4 to obtain a molecular sieve mixture, designated as DBF-I-1.

Comparative Example I-2

A ZSM-5 molecular sieve (with silica-alumina ratio of 30, average grain size of 1.2 μm, average particle size of the particles of agglomerated grains of 25 μm, crystallinity of 93.0%) and the ammonium exchanged hydrogen-type β molecular sieve obtained in step (2) of Comparative Example I-1 were mechanically mixed at a ratio of 6:4 to obtain a molecular sieve mixture, designated as DBF-I-2.

Comparative Example I-3

(1) water glass, aluminum sulfate and aqueous ethylamine solution were used as starting materials, and mixed at a molar ratio of $SiO_2$:$Al_2O_3$:$C2H_5NH_2$:$H_2O$=40:1:10:1792 and gelatinized, and crystallized at 140° C. for 3 days, to obtain a large-grain cylindrical ZSM-5 molecular sieve (with a grain size of 4.0 μm), designated as Z-I-1;

(2) the molecular sieve Z-I-1 was pretreated for 30 min with an aqueous solution of methyl methacrylate (with a concentration of 0.5 wt %) and sodium chloride (with a concentration of 5 wt %), filtered, dried, then added into a β molecular sieve suspension dispersed with deionized water to 0.5 wt % and adhered for 30 min (the weight ratio of the molecular sieve Z-I-1, on a dry basis, to the β molecular sieve suspension being 1:10), filtered, dried, and calcined at 540° C. for 5 h, to obtain a core molecular sieve;

(3) silica white and tetraethoxysilane (TEOS) were used as a silicon source, sodium aluminate and tetraethyl ammonium hydroxide (TEAOH) were used as a starting material, they were added at a ratio of R:$SiO_2$:$Al_2O_3$:$H_2O$=13:30:1:1500 (R represents TEAOH), the core molecular sieve obtained in step 2) was added, and then charged into a stainless steel kettle with a tetrafluoroethylene lining for crystallization at 140° C. for 54 hours;

(4) after crystallization, the resultant was filtered, washed, dried, and calcined at 550° C. for 4 hours, to obtain a core-shell molecular sieve D-I-3, of which the properties are shown in Table I-1;

(5) ammonium exchange was carried out on the molecular sieve D-I-3 to wash off sodium under conditions including: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed and dried, and then calcined for 2 h at 550° C. The molecular sieve obtained was designated as DBF-I-3.

Example I-3

(1) 1.2 g of $H_3PO_4$ (with a concentration of 85 wt %) was dissolved in 10 g of deionized water, and added to 10 g of the core-shell molecular sieve A1 obtained in step (5) of Example I-1, then adjusted to a pH of 6 with an aqueous ammonia having a concentration of 25 wt %, fully and uniformly mixed; filtered, dried at 115° C. in an air atmosphere for 4 h; then calcined for 2 h at 550° C.;

(2) the product obtained in step (1) was subjected to a hydrothermal treatment for 10 hours at 800° C. under 100% steam;

(3) 0.76 g of $Zn(NO_3)_2 \cdot 6H_2O$ was dissolved in 10 g of deionized water, added into the product obtained in step (2), and fully and uniformly mixed; the resulting mixture was dried at 115° C. in an air atmosphere for 4 h, and then calcined at 550° C. for 2 h, to obtain a phosphorus- and metal-containing core-shell molecular sieve, designated as PMH-I-3.

Example I-4

(1) 1.0 g of $NH_4H_2PO_4$ (with a content of 99 wt %) was dissolved in 10 g of deionized water, and added to 10 g of the core-shell molecular sieve A1 obtained in step (5) of Example I-1, then adjusted to a pH of 6 with an aqueous ammonia having a concentration of 25 wt %, fully and uniformly mixed; filtered, dried at 115° C. in an air atmosphere for 4 h; then calcined for 2 h at 550° C.;

(2) the product obtained in step (1) was subjected to a hydrothermal treatment for 14 h at 700° C. under 100% steam;

(3) 0.6 g of $ZnCl_2$ was dissolved into 10 g of deionized water, added into the product obtained in step (2), and fully and uniformly mixed; the resulting mixture was dried at 115° C. in an air atmosphere for 4 h, and then calcined at 550° C. for 2 h, to obtain a phosphorus- and metal-containing core-shell molecular sieve, designated as PMH-I-4.

Example I-5

(1) at room temperature (25° C.), 10.0 g of ZSM-5 molecular sieve (HZSM-5, silica-alumina ratio of 60, average grain size of 500 nm, average particle size of 10 μm, and crystallinity of 90.0%) was added into 100.0 g of sodium chloride solution of polydiallyldimethylammonium chloride (the content by mass of polydiallyldimethylammonium chloride in the solution being 0.2%, and the content by mass of sodium chloride being 0.2%), stirred for 2 h, filtered, and the resulting filter cake was dried at 50° C. in air atmosphere to obtain a ZSM-5 molecular sieve material I;

(2) the ZSM-5 molecular sieve material I was added into a β molecular sieve suspension (with a concentration expressed in weight percentage of the β molecular sieve in the β molecular sieve suspension of 2.5 wt %, average grain size of the β molecular sieve of 100 nm, silica-alumina ratio of 30, crystallinity of 92%, and hydrogen-type β molecular sieve) at a weight ratio of the ZSM-5 molecular sieve material I, on a dry basis, to the β molecular sieve suspension of 1:45, stirred for 2 hours at 50° C., filtered and dried in an air atmosphere at 90° C., to obtain a ZSM-5 molecular sieve material II;

(3) 4.0 g of alumina sol (with an $Al_2O_3$ concentration of 25 wt %, an aluminum-to-chlorine molar ratio of 1.1) was dissolved in 10.0 g of deionized water, 0.6 g of NaOH particles were added, 90.0 mL of water glass (with a $SiO_2$ concentration of 251 g/L, and a modulus of 2.5) and 32 g of tetraethylammonium hydroxide solution (with the concentration by mass of the tetraethylammonium hydroxide solution being 25%), fully and uniformly stirred, then transferred into a reaction kettle with a polytetrafluoroethylene lining for crystallization, and crystallized at 150° C. for 10 hours to obtain a pre-crystallized synthesis liquid III; after a sample of the pre-crystallized synthesis liquid III was filtered, washed, dried and calcined, it can be observed that there was a peak at 2θ=22.4°±0.1° and no peak at 2θ=21.2°±0.1° in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), and then crystallized for 80 hours at 130° C. to obtain a ZSM-5/β core-shell molecular sieve, designated as HK-I-5, of which the properties are shown in Table I-1;

(5) the resulting ZSM-5/β core-shell molecular sieve was subjected to ammonium exchange to reduce the sodium oxide content to a level of less than 0.1 wt %, to obtain a hydrogen-type core-shell molecular sieve, wherein the ammonium exchange conditions included: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed and dried, and then calcined for 3 hours at 500° C., and the product was designated as ZSM-5/β core-shell molecular sieve E1;

(6) 0.7 g $H_3PO_4$ (with a concentration of 85 wt %) was dissolved in 10 g of deionized water, added into 10 g core-shell molecular sieve E1, adjusted to a pH of 6 with 25 wt % aqueous ammonia, and uniformly mixed; filtered, and dried at 115° C. in an air atmosphere for 4 h; then calcined for 2 h at 550° C.;

(7) the product of the step (6) was subjected to a hydrothermal treatment for 4 h at 600° C. under 100% steam;

(8) 0.25 g $Ga(NO_3)_3$ was dissolved in 10 g of deionized water, then added into the product obtained in step (7), and uniformly mixed; the resulting mixture was dried at 115° C. for 4 h in an air atmosphere; and then calcined for 2 hours at 550° C. to obtain a phosphorus- and metal-containing core-shell molecular sieve, designated as PMH-I-5.

Example I-6

Phosphorus and iron were introduced into the product obtained in Comparative Example I-3 in the same manner as in step (1) of Comparative Example I-1, and the resulting molecular sieve was designated as PMH-I-6.

Example I-7

Phosphorus and iron were introduced into the product of Comparative Example I-3 in the same manner as in steps (6) to (8) of Example I-1, and the resulting molecular sieve was designated as PMH-I-7.

The ratio of the height (D1) of the diffraction peak at 2θ=22.4°±0.1° to the height (D2) of the diffraction peak at 2θ=23.1°±0.1° in the X-ray diffraction pattern and the ratio between the area of the peaks in the $^{27}$Al MAS NMR of the products of each example and comparative example are shown in Table I-2.

TABLE I-1

Properties of the sodium-type molecular sieves obtained as an intermediate product

| Example No. | Example I-1 | Example I-5 | Comparative Example I-3 |
|---|---|---|---|
| Molecular sieve No. | HK-I-1 | HK-I-5 | D-I-3 |
| D1/D2 | 2:3 | 4:1 | 0.01:1 |
| Mass ratio of core to shell | 1:1 | 1:5 | 80:1 |
| The proportion of the specific surface area of mesopores to the total specific surface area, % | 35 | 25 | 45 |
| Total specific surface area, $m^2/g$ | 533 | 547 | 398 |
| Average grain size of shell molecular sieve, μm | 0.2 | 0.05 | 0.02 |
| Average grain size of core molecular sieve, μm | 1.2 | 0.5 | 4 |
| Thickness of shell, μm | 0.5 | 0.05 | 0.06 |
| Silica-alumina ratio of core molecular sieve | 30 | 60 | 30 |
| Silica-alumina ratio of shell molecular sieve | 30 | 34 | 31 |

TABLE I-1-continued

Properties of the sodium-type molecular sieves obtained as an intermediate product

| Example No. | Example I-1 | Example I-5 | Comparative Example I-3 |
|---|---|---|---|
| Shell coverage, % | 100 | 100 | 75 |
| Number of ZSM-5 crystal grains in core molecular sieve | >1 | >1 | 1 |
| Pore volume, mL/g | 0.371 | 0.377 | 0.201 |
| Pore diameter distribution, % | | | |
| Proportion of the pore volume of pores with a diameter of 0.3-0.6 nm | 70 | 72 | 80 |
| Proportion of the pore volume of pores with a diameter of 0.7-1.5 nm | 5 | 3 | 10 |
| Proportion of the pore volume of pores with a diameter of 2-4 nm | 10 | 9 | 8 |
| Proportion of the pore volume of pores with a diameter of 20-80 nm | 15 | 16 | 2 |

In Table I-1, the proportion of pore volume refers to the ratio of the pore volume of pores with a corresponding pore diameter to the total pore volume, and the pore volume refers to the total pore volume (the same applies hereinafter).

TABLE I-2

Properties of the molecular sieves obtained in the examples and comparative examples

| Source of molecular sieves | Molecular sieve No. | D1/D2 | Number of crystal grains in core molecular sieve | Ratio of Peak 1 to Peak 2 in the NMR* | $P_2O_5$/ wt % | $Fe_2O_3$/ wt % | ZnO/ wt % | $Ga_2O_3$/ wt % |
|---|---|---|---|---|---|---|---|---|
| Example I-1 | PMH-I-1 | 2:3 | >1 | 1000 | 7.2 | 2.9 | — | — |
| Example I-2 | PMH-I-2 | 2:3 | >1 | 80 | 6.9 | 2.8 | — | — |
| Comparative Example I-1 | DBF-I-1 | 1:6 | None | 200 | 5.4 | 2.2 | — | — |
| Comparative Example I-2 | DBF-I-2 | 1:6 | None | 0 | 0.0 | 0.0 | — | — |
| Comparative Example I-3 | DBF-I-3 | 0.01:1 | 1 | 0 | 0.0 | 0.0 | — | — |
| Example I-3 | PMH-I-3 | 2:3 | >1 | 600 | 6.5 | — | 2.4 | — |
| Example I-4 | PMH-I-4 | 2:3 | >1 | 500 | 7.1 | — | 2.6 | — |
| Example I-5 | PMH-I-5 | 4:1 | >1 | 950 | 6.8 | — | — | 2.1 |
| Example I-6 | PMH-I-6 | 0.01:1 | 1 | 380 | 5.0 | 2.0 | — | — |
| Example I-7 | PMH-I-7 | 0.01:1 | 1 | 410 | 5.4 | 2.2 | — | — |

*Note:
Ratio of integrated area of Peak 1 (39 ± 3) ppm to that of Peak 2 (54 ± 3) ppm in $^{27}$Al MAS NMR (the same applies hereinafter).

Evaluation of Molecular Sieves:

The molecular sieves obtained in Examples I-1 to I-7 and Comparative Examples I-1 to I-3 were subjected to a deactivation treatment by aging at 800° C. under 100% steam for 17 hours, pressed into tablets and sieved to obtain particles of 40 to 60 mesh, and evaluated on a fixed bed microreactor ACE-MODEL FB (according the standard methods of ASTM D5154 and D7964). The feedstock oil was a hydrogenated tail oil (composition and physical properties are shown in Table I-3), and the evaluation conditions included: a reaction temperature of 620° C., a reaction pressure of 0.1 MPa, a catalyst-to-oil ratio (by weight) of 3, and a reaction time of 150 seconds. The results are shown in Table I-4.

TABLE I-3

Properties of the feedstock oil

| Properties | Hydrogenated tail oil |
|---|---|
| Density (20° C.)/(kg/$m^3$) | 880.4 |
| Sulfur/(μg/kg) | <100 |
| Ni + V/(μg/g) | <0.5 |
| Hydrogen content/% | 13.35 |
| Naphthene content/% | 39.56% |
| Freezing point | 28° C. |
| End boiling point | 515° C. |

TABLE I-4

| Evaluation results | | | | | | | | | |
|---|---|---|---|---|---|---|---|---|---|
| Source of molecular sieves | Example I-1 | Example I-2 | Example I-3 | Example I-4 | Example I-5 | Example I-6 | Example I-7 | Comparative Example I-1 | Comparative Example I-2 | Comparative Example I-3 |
| | | | | | Product yield/wt % | | | | | |
| $H_2$—$C_2$ (excluding ethylene) | 2.28 | 2.24 | 2.14 | 2.54 | 2.32 | 1.39 | 0.82 | 0.20 | 0.16 | 0.37 |
| Ethylene | 7.22 | 6.35 | 6.78 | 7.01 | 6.09 | 3.44 | 3.59 | 1.74 | 1.53 | 1.93 |
| $C_3$—$C_4$ (excluding propylene) | 7.14 | 5.87 | 6.54 | 8.13 | 6.46 | 6.37 | 5.47 | 4.37 | 3.48 | 5.31 |
| Propylene | 9.69 | 8.64 | 9.01 | 9.14 | 10.03 | 4.40 | 5.41 | 3.76 | 2.61 | 3.35 |
| Gasoline | 9.24 | 9.20 | 10.01 | 8.58 | 9.87 | 8.45 | 5.19 | 3.28 | 3.48 | 4.31 |
| Diesel oil | 12.50 | 12.46 | 12.34 | 13.21 | 14.49 | 9.39 | 11.01 | 10.76 | 9.62 | 10.49 |
| Heavy oil | 51.50 | 54.52 | 52.78 | 50.98 | 50.55 | 65.87 | 68.11 | 75.73 | 78.94 | 73.83 |
| Coke | 0.42 | 0.73 | 0.40 | 0.41 | 0.19 | 0.69 | 0.40 | 0.16 | 0.17 | 0.41 |

As can be seen from the results of Table I-4, when used in the catalytic conversion of hydrocarbon-containing feedstocks, the phosphorus- and metal-containing core-shell molecular sieve according to the present application shows a higher yield of propylene and/or a higher yield of ethylene, and in preferred cases, shows a higher yield of liquefied gas.

The example series II illustrates the preparation and properties of the catalyst according to the first type of embodiments of the present application.

Example II-1

(1) at room temperature (25° C.), 10.0 g of ZSM-5 molecular sieve (hydrogen-type ZSM-5, with silica-alumina ratio of 30, average grain size of 1.2 μm, average particle size of the particles of agglomerated grains of 15 μm, crystallinity of 93.0%) was added as a core into 100.0 g of an aqueous solution containing methyl methacrylate and sodium chloride (having a sodium chloride concentration of 5.0%) with a methyl methacrylate content by mass of 0.2%, stirred for 1 h, filtered and dried at 50° C. in an air atmosphere to obtain a ZSM-5 molecular sieve material I;

(2) the ZSM-5 molecular sieve material I was added into a β molecular sieve suspension (a suspension formed by an Hβ molecular sieve and water, with a concentration by weight of the β molecular sieve in the suspension of 0.3 wt %, average grain size of the β molecular sieve of 200 nm, silica-alumina ratio of 30, crystallinity of 89.0%, and the particles of the β molecular sieve being composed of a single crystal grain) at a weight ratio of the ZSM-5 molecular sieve material I, on a dry basis, to the β molecular sieve suspension of 1:10, stirred for 1 hour at 50° C., filtered, and the resulting filter cake was dried in an air atmosphere at 90° C. to obtain a ZSM-5 molecular sieve material II;

(3) 2.0 g of aluminum isopropoxide was dissolved in 30 g of deionized water, 1.30 g of NaOH particles were added, 20.0 g of basic silica sol (with a $SiO_2$ content of 25.0 wt %, a pH value of 10.0 and a sodium oxide content of 0.10 wt %) and 40 g of tetraethylammonium hydroxide solution (with the content by mass of tetraethylammonium hydroxide in the tetraethylammonium hydroxide solution being 25 wt %) were added sequentially, stirred uniformly, then transferred into a reaction kettle with a polytetrafluoroethylene lining for crystallization, and crystallized at 80° C. for 48 hours to obtain a pre-crystallized synthesis liquid III; after a sample of the pre-crystallized synthesis liquid III was filtered, washed, dried and calcined, it can be observed that there was a peak at 2θ=22.4°±0.1° and no peak at 2θ=21.2°±0.1° in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), crystallized for 60 hours at 120° C., and filtered to obtain a ZSM-5/β core-shell molecular sieve, designated as HK-II-1, of which the properties are shown in Table II-1;

(5) ammonium exchange was carried out on the ZSM-5/β molecular sieve HK-II-1 to reduce the sodium oxide content to a level of less than 0.1 wt %, to obtain a hydrogen-type molecular sieve, wherein the ammonium exchange conditions included: a ratio of the HK-II-1 molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 3 hours at 500° C. to obtain a ZSM-5/β core-shell molecular sieve, designated as core-shell molecular sieve A2;

(6) 1.4 g $H_3PO_4$ (with a concentration of 85 wt %) was dissolved in 10 g of deionized water, then added into 10 g of the core-shell molecular sieve A2, adjusted to a pH of 6 using aqueous ammonia with a concentration of 25 wt %, and fully and uniformly mixed; filtered, dried at 115° C. in an air atmosphere for 4 h; then calcined for 2 h at 550° C.;

(7) the product obtained in step (6) was subjected to a hydrothermal treatment at 600° C. in an atmosphere of 100 vol % of steam for 4 h;

(8) 0.55 g of $Fe(NO_3)_3 \cdot 6H_2O$ was dissolved in 10 g of deionized water, then added into the product obtained in step (7), and fully and uniformly mixed; and then dried for 4 h at 115° C. in an air atmosphere, and calcined for 2 h at 550° C., to obtain a phosphorus- and metal-containing core-shell molecular sieve, designated as PMH-II-1.

Example II-2

The core-shell molecular sieve A2 obtained in step (5) of Example II-1 was used as a parent molecular sieve, 1.4 g $H_3PO_4$ (with a concentration of 85 wt %) and 0.55 g $Fe(NO_3)_3 \cdot 6H_2O$ were dissolved in 10 g of deionized water, then added to 10 g of the core-shell molecular sieve A2, adjusted to a pH of 6 with 25 wt % aqueous ammonia, fully and uniformly mixed; dried at 115° C. in an air atmosphere for 4 h; then calcined at 550° C. for 2 h, and the product was designated as PMH-II-2.

Example II-3

The core-shell molecular sieve A2 obtained in step (5) of Example II-1 was used as a parent molecular sieve, 1.2 g of $H_3PO_4$ (with a concentration of 85 wt %) was dissolved in 10 g of deionized water, then added to 10 g of the core-shell molecular sieve A2, adjusted to a pH of 6 with 25 wt % aqueous ammonia, fully and uniformly mixed; filtered, dried at 115° C. in an air atmosphere for 4 h; then calcined for 2 h at 550° C.; the resulting product was subjected to a hydrothermal treatment for 10 hours at 800° C. under 100% steam; 0.76 g $Zn(NO_3)_2.6H_2O$ was dissolved in 10 g of deionized water, added into the product resulted from the hydrothermal treatment, and fully and uniformly mixed; the resulting mixture was dried at 115° C. in an air atmosphere for 4 h, and then calcined at 550° C. for 2 h, to obtain a phosphorus- and metal-containing core-shell molecular sieve, designated as PMH-II-3.

Example II-4

The core-shell molecular sieve A2 obtained in step (5) of Example II-1 was used as a parent molecular sieve, 1.0 g of $NH_4H_2PO_4$ (having a content of 99 wt %) was dissolved in 10 g of deionized water, then added into 10 g of the core-shell molecular sieve A2, adjusted to a pH of 6 using aqueous ammonia with a concentration of 25 wt %, and fully and uniformly mixed; filtered, dried at 115° C. in an air atmosphere for 4 h; then calcined for 2 h at 550° C.; the product was subjected to a hydrothermal treatment for 14 h at 700° C. under 100% steam; 0.6 g of $ZnCl_2$ was dissolved into 10 g of deionized water, added into the product resulted from the hydrothermal treatment, and fully and uniformly mixed; the resulting product was dried at 115° C. for 4 h in air atmosphere; and then calcined at 550° C. for 2 h, to obtain a phosphorus- and metal-containing core-shell molecular sieve, designated as PMH-II-4.

Comparative Example II-1

(1) 1.4 g $H_3PO_4$ (with a concentration of 85 wt %) and 0.55 g of $Fe(NO_3)_3 \cdot 6H_2O$ were dissolved in 10 g of deionized water, then added into 10 g of ZSM-5 molecular sieve (hydrogen-type ZSM-5, with silica-alumina ratio of 30, average grain size of 1.2 μm, average particle size of the particles of agglomerated grains of 25 μm, crystallinity of 93.0%), adjusted to a pH of 6 with 25% aqueous ammonia, and fully and uniformly mixed; dried at 115° C. in an air atmosphere for 4 h; then calcined for 2 hours at 550° C. to obtain a phosphorus- and metal-containing ZSM-5 molecular sieve;

(2) 2.0 g of aluminum isopropoxide was dissolved in 30 g of deionized water, 1.3 g of NaOH particles were added, 20.0 g of silica sol (with a $SiO_2$ content of 25.0 wt %) and 40 g of tetraethylammonium hydroxide solution (with the content by mass of tetraethylammonium hydroxide in the tetraethylammonium hydroxide solution being 25 wt %), uniformly stirred, then transferred into a reaction kettle with a polytetrafluoroethylene lining for crystallization, crystallized at 120° C. for 60 hours, filtered, washed, dried and calcined to obtain a β molecular sieve; ammonium exchange was carried out on the β molecular sieve under conditions including: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 2 h at 550° C.; 1.4 g of $H_3PO_4$ (with a concentration of 85%) and 0.55 g of $Fe(NO_3)_3 \cdot 6H_2O$ were dissolved in 10 g of deionized water, then added into 10 g of the resulting β molecular sieve, adjusted to a pH of 6 with 25% aqueous ammonia, and fully and uniformly mixed; dried at 115° C. in an air atmosphere for 4 h; then calcined for 2 hours at 550° C. to obtain a phosphorus- and metal-containing β molecular sieve;

(3) the molecular sieves obtained in step (1) and step (2) were mechanically mixed at a ratio of 6:4, and the resulting molecular sieve mixture was designated as DBF-II-1.

Comparative Example II-2

A ZSM-5 molecular sieve (with silica-alumina ratio of 30, average grain size of 1.2 μm, average particle size of the particles of agglomerated grains of 25 μm, crystallinity of 93.0%) and the ammonium exchanged hydrogen-type β molecular sieve obtained in step (2) of Comparative Example II-1 were mechanically mixed at a ratio of 6:4, and the resulting molecular sieve mixture was designated DBF-II-2.

Comparative Example II-3

(1) water glass, aluminum sulfate and aqueous ethylamine solution were used as starting materials, and mixed at a molar ratio of $SiO_2$:$Al_2O_3$:$C2H_5NH_2$:$H_2O$=40:1:10:1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the weight ratio of the ZSM-5 molecular sieve to the β molecular sieve suspension being 1:10) dispersed with deionized water to 0.5 wt %, adhered for 30 min, filtered, dried, and calcined for 5 h at 540° C., to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of TEAOH:$SiO_2$:$Al_2O_3$:$H_2O$=13:30:1:1500, and then charged into a stainless steel kettle with a tetrafluoroethylene lining for crystallization at 140° C. for 54 hours;

(4) after the completion of crystallization, filtered, washed, dried, and calcined at 550° C. for 4 h, to obtain a core-shell molecular sieve D-II-3;

(5) ammonium exchange was carried out on the molecular sieve D-II-3 to reduce the sodium oxide content to a level of less than 0.1 wt %, obtain a hydrogen-type molecular sieve, wherein the ammonium exchange conditions included: a weight ratio of D-II-3 molecular sieve:ammonium chloride:$H_2O$=1:0.5:10, an ammonium exchange temperature of 80° C., and an ammonium exchange time of 1 h. After the ammonium exchange, the resultant was filtered, washed and dried, and then calcined for 3 hours at 500° C. to obtain a hydrogen-type core-shell molecular sieve, designated as DBF-II-3.

Comparative Example II-4

The molecular sieve D-II-3 obtained in step (4) of Comparative Example II-3 was used as a parent molecular sieve, 1.4 g $H_3PO_4$ (with a concentration of 85%) and 0.55 g of $Fe(NO_3)_3\cdot 6H_2O$ were dissolved in 10 g of deionized water, then added into 10 g of the molecular sieve obtained in step (4), adjusted to a pH of 6 using 25% aqueous ammonia, and fully and uniformly mixed; dried at 115° C. in an air atmosphere for 4 h; then calcined for 2 h at 550° C., and the resulting molecular sieve was designated as DBF-II-4.

Comparative Example II-5

The molecular sieve D-II-3 obtained in step (4) of Comparative Example II-3 was used as a parent molecular sieve, 1.4 g $H_3PO_4$ (with a concentration of 85 wt %) was dissolved in 10 g of deionized water, then added into 10 g of the molecular sieve obtained in step (4), adjusted to a pH of 6 using aqueous ammonia with a concentration of 25 wt %, and fully and uniformly mixed; filtered, dried at 115° C. in an air atmosphere for 4 h; then calcined for 2 h at 550° C.; the resulting product was subjected to a hydrothermal treatment for 4 h at a temperature of 600° C. under 100% steam; 0.55 g of $Fe(NO_3)_3\cdot 6H_2O$ was dissolved in 10 g of deionized water, then added into the product resulted from the hydrothermal treatment, and fully and uniformly mixed; and then dried at 115° C. in an air atmosphere for 4 h, and calcined for 2 h at 550° C. to obtain the phosphorus- and metal-containing core-shell molecular sieve according to the present application, designated as DBF-II-5.

The ratio of the height (D1) of the diffraction peak at 2θ=22.4°±0.1° to the height (D2) of the diffraction peak at 2θ=23.1°±0.1° in the X-ray diffraction pattern and the ratio between the area of the peaks in the $^{27}Al$ MAS NMR of the products of each example and comparative example are shown in Table II-2.

TABLE II-1

Properties of some molecular sieves

| Example No. | Example II-1 | Example II-1 | Comparative Example II-3 |
|---|---|---|---|
| Molecular sieve No. | HK-II-1 | PMH-II-1 | D-II-3 |
| D1/D2 | 2:3 | 2:3 | 0.01 |
| Mass ratio of core to shell | 15:1 | 15:1 | 80:1 |
| The proportion of the specific surface area of mesopores to the total specific surface area, % | 35 | 35 | 45 |
| Total specific surface area, $m^2/g$ | 533 | 523 | 398 |
| Average grain size of shell molecular sieve, μm | 0.2 | 0.2 | 0.02 |
| Average grain size of core molecular sieve, μm | 1.2 | 1.2 | 4 |
| Thickness of shell, μm | 0.5 | 0.5 | 0.06 |
| Silica-alumina ratio of core molecular sieve | 30 | 30 | 30 |
| Silica-alumina ratio of shell molecular sieve | 30 | 30 | 31 |
| Shell coverage, % | 100 | 100 | 75 |
| Number of ZSM-5 crystal grains in core molecular sieve | N | N | 1 |
| Pore volume, mL/g | 0.371 | 0.360 | 0.201 |
| Pore diameter distribution, % | | | |
| Proportion of the pore volume of pores with a diameter of 0.3-0.6 nm | 70 | 73 | 80 |
| Proportion of the pore volume of pores with a diameter of 0.7-1.5 nm | 5 | 6 | 10 |
| Proportion of the pore volume of pores with a diameter of 2-4 nm | 10 | 8 | 8 |
| Proportion of the pore volume of pores with a diameter of 20-80 nm | 15 | 13 | 2 |

TABLE II-2

Properties of the molecular sieves obtained in the examples and comparative examples

| Source of molecular sieve | Molecular sieve No. | D1/D2 | Number of crystal grains in core molecular sieve | Ratio of Peak 1 to Peak 2 in the NMR* | $P_2O_5$/wt % | $Fe_2O_3$/wt % | ZnO/wt % | Specific surface area |
|---|---|---|---|---|---|---|---|---|
| Example II-1 | PMH-II-1 | 2:3 | >1 | 1000 | 7.2 | 2.9 | | 520 |
| Example II-2 | PMH-II-2 | 2:3 | >1 | 1000 | 6.9 | 2.8 | | 524 |
| Example II-3 | PMH-II-3 | 2:3 | >1 | 1000 | 6.5 | | 2.4 | 522 |
| Example II-4 | PMH-II-4 | 2:3 | >1 | 1000 | 7.0 | | 2.6 | 525 |
| Comparative Example II-1 | DBF-II-1 | 1:6 | None | 200 | 5.4 | 2.2 | | 343 |
| Comparative Example II-2 | DBF-II-2 | 1:6 | None | 0 | 0.0 | 0.0 | | 320 |
| Comparative Example II-3 | DBF-II-3 | 0.01:1 | 1 | 0 | 0.0 | 0.0 | | 397 |
| Comparative Example II-4 | DBF-II-4 | 0.01:1 | 1 | 40 | 6.5 | 2.0 | | 370 |
| Comparative Example II-5 | DBF-II-5 | 0.01:1 | 1 | 50 | 7.1 | 2.1 | | 385 |

*Note:
Ratio of integrated area of Peak 1 (39 ± 3) ppm to that of Peak 2 (54 ± 3) ppm in $^{27}$Al MAS NMR.

In the following Examples II-5 to II-8 and Comparative Examples II-6 to II-10, the kaolin used is a commercial product from China Kaolin Clay Co. Ltd., having a solid content of 75 wt %; the pseudo-boehmite used is available from Shandong Aluminum Corporation, having an alumina content of 65 wt %; the alumina sol is available from Qilu Branch of Sinopec Catalyst Co. Ltd., having an alumina content of 21 wt %. The silica sol is available from Beijing Chemical Plant, having a silica content of 25 wt % (acidic silica sol, pH 3.0).

Examples II-5 to II-8

Examples II-5 to II-8 illustrate the preparation of light hydrocarbon catalytic cracking catalysts according to the first type of embodiments of the present application, wherein the catalysts were prepared using the phosphorus- and metal-containing ZSM-5/β core-shell molecular sieves obtained in Examples II-1 to II-4, respectively, and designated as: A-II-1, A-II-2, A-II-3 and A-II-4. The method for preparing the catalyst was as follows:

(1) pseudo-boehmite was uniformly mixed with water, concentrated hydrochloric acid (chemically pure, product of Beijing Chemical Plant) with a concentration of 36 wt % was added under stirring, at an acid-to-aluminum ratio of 0.2 (i.e. the weight ratio of the 36 wt % hydrochloric acid to pseudo-boehmite (calculated as $Al_2O_3$)), the resulting mixture was aged at 70° C. for 1.5 hours, to obtain an aged pseudo-boehmite slurry having an alumina content of 12 wt %;

(2) a phosphorus- and metal-containing ZSM-5/β core-shell molecular sieve, alumina sol, silica sol, kaolin, the aged pseudo-boehmite slurry and deionized water were uniformly mixed to form a slurry with a solid content of 30 wt %, and spray dried, to obtain catalyst microspheres;

(3) the catalyst microspheres were calcined at 550° C. for 4 hours; and (4) the calcined catalyst microspheres were subjected to exchanging at a weight ratio of the catalyst microspheres:ammonium salt:$H_2O$=1:1:10 for 1 h at 80° C., filtered, and subjected to the exchanging and filtering process once again, and dried, wherein the ammonium salt was ammonium chloride. The sodium oxide content in the resulting catalytic cracking catalyst was less than 0.15 wt %.

Comparative Examples II-6 to II-10

Catalysts were prepared according to the method for preparing the catalyst as described in Example II-5 using the molecular sieves obtained in Comparative Examples II-1 to II-5, respectively, and designated as: DB-II-1, DB-II-2, DB-II-3, DB-II-4, DB-II-5.

Table II-3 shows the composition of the catalysts obtained in each example and comparative example. The contents of the core-shell molecular sieve, the binder and the kaolin in the catalyst are calculated based on the amounts by dry weight of corresponding starting materials used in the preparation.

TABLE II-3

Composition and properties of the catalysts of each example and comparative example

| Example No. | Catalyst No. | Molecular sieve. No | Composition of catalyst, wt % Molecular sieves | Kaolin | Boehmite | Alumina sol | Silica sol | Position of the peak in the most probable pore distribution nm | Sodium oxide in catalyst wt % | Specific surface area m²/g | External surface area m²/g | Total pore volume cm³/g | Pore volume of mesopores cm³/g |
|---|---|---|---|---|---|---|---|---|---|---|---|---|---|
| Ex. 5 | A-II-1 | PMH-II-1 | 37 | 28 | 10 | 20 | 5 | 6 | 0.08 | 230 | 114 | 0.226 | 0.186 |
| Ex. 6 | A-II-2 | PMH-II-2 | 37 | 28 | 10 | 20 | 5 | 5.0 | 0.07 | 228 | 110 | 0.224 | 0.181 |
| Ex. 7 | A-II-3 | PMH-II-3 | 37 | 28 | 10 | 20 | 5 | 6.5 | 0.10 | 227 | 111 | 0.223 | 0.183 |
| Ex. 8 | A-II-4 | PMH-II-4 | 37 | 28 | 10 | 20 | 5 | 6.5 | 0.12 | 228 | 109 | 0.225 | 0.179 |
| Comp. Ex. 6 | DB-II-1 | DBF-II-1 | 37 | 28 | 10 | 20 | 5 | None | 0.10 | 193 | 102 | 0.215 | 0.175 |
| Comp. Ex. 7 | DB-II-2 | DBF-II-2 | 37 | 28 | 10 | 20 | 5 | None | 0.08 | 194 | 99 | 0.214 | 0.167 |
| Comp. Ex. 8 | DB-II-3 | DBF-II-3 | 37 | 28 | 10 | 20 | 5 | 30 | 0.10 | 173 | 85 | 0.185 | 0.105 |
| Comp. Ex. 9 | DB-II-4 | DBF-II-4 | 37 | 28 | 10 | 20 | 5 | 30 | 0.08 | 160 | 70 | 0.169 | 0.95 |
| Comp. Ex. 10 | DB-II-5 | DBF-II-5 | 37 | 28 | 10 | 20 | 5 | 30 | 0.10 | 165 | 75 | 0.176 | 0.100 |

Catalyst Evaluation

The catalysts obtained in Examples II-5 to II-8 and the catalysts obtained in Comparative Examples II-6 to II-10 were aged at 800° C. for 10 hours under 100 vol % steam, and then evaluated for the performance in light hydrocarbon catalytic cracking reaction in a small fixed bed reactor under conditions including a reaction temperature of 665° C., a nitrogen flow rate of 100 mL/min, an oil feed time of 600 s, a catalyst-to-oil ratio of 3.6, and an oil feed amount of 1.0 g. The properties of the light hydrocarbon used are shown in Table II-4, and the reaction results are shown in Table II-5.

TABLE II-4

Properties of the light hydrocarbon

| Properties | Light hydrocarbon |
|---|---|
| Density, g/cm³ | 0.7494 |
| Initial boiling point | 26.5° C. |
| End boiling point | 210.4° C. |
| Paraffins | 32.20% |
| Isoparaffins | 24.59% |
| Olefins | 0.04% |
| Naphthenes | 31.67% |
| Aromatics | 11.50% |

The product yields listed in Table II-5 were calculated based on the feed quantity of the feedstock:

Product yield=amount of the product (weight)/feed quantity of the light hydrocarbon (weight)×100%;

The conversion rate is the sum of the yield of hydrocarbon products having 4 or less carbon atoms in the molecule, the yield of hydrogen and the yield of coke.

As can be seen from the results listed in Tables II-5, the light hydrocarbon catalytic cracking catalyst according to the first type of embodiments of the present application has a higher light hydrocarbon cracking capacity and higher yields of ethylene, propylene, and butylene, and a significantly improved total yield of ethylene and propylene.

The example series III illustrates the preparation and properties of the catalyst according to the second type of embodiments of the present application.

Example III-1

(1) at room temperature (25° C.), 10.0 g of ZSM-5 molecular sieve (hydrogen-type ZSM-5, with silica-alumina ratio of 30, average grain size of 1.2 μm, average particle size of the particles of agglomerated grains of 15 μm, crystallinity of 93.0%) was added as

TABLE II-5

Evaluation results

| Catalyst | A-II-1 | A-II-2 | A-II-3 | A-II-4 | DB-II-1 | DB-II-2 | DB-II-3 | DB-II-4 | DB-II-5 |
|---|---|---|---|---|---|---|---|---|---|
| | | | | Product yield/% | | | | | |
| Hydrogen gas | 2.14 | 2.08 | 2.01 | 1.97 | 1.64 | 1.54 | 1.03 | 1.13 | 1.32 |
| Methane | 6.13 | 5.95 | 5.84 | 5.64 | 4.96 | 4.01 | 2.41 | 2.97 | 3.54 |
| Ethane | 3.45 | 3.30 | 3.2 | 3.07 | 2.26 | 2.96 | 1.35 | 1.76 | 1.98 |
| Ethylene | 18.67 | 17.42 | 16.93 | 16.08 | 15.42 | 13.67 | 9.87 | 11.37 | 12.46 |
| Propane | 3.29 | 2.87 | 2.67 | 2.57 | 1.67 | 1.48 | 1.03 | 1.26 | 1.06 |
| Propylene | 32.58 | 29.81 | 28.36 | 27.91 | 27.46 | 22.14 | 14.19 | 17.68 | 18.57 |
| C4 alkanes | 3.04 | 2.67 | 2.51 | 2.63 | 2.03 | 2.97 | 1.2 | 1.71 | 1.94 |
| C4 alkenes | 11.27 | 10.72 | 9.64 | 9.51 | 8.46 | 7.14 | 4.03 | 5.3 | 5.49 |
| Ethylene + propylene | 51.25 | 47.23 | 45.29 | 43.99 | 42.88 | 35.81 | 24.06 | 29.05 | 31.03 |

a core into 100.0 g of an aqueous solution containing methyl methacrylate and sodium chloride (having a sodium chloride concentration of 5.0%) with a methyl methacrylate content by mass of 0.2%, stirred for 1 h, filtered and dried at 50° C. in an air atmosphere to obtain a ZSM-5 molecular sieve material I;

(2) the ZSM-5 molecular sieve material I was added into a β molecular sieve suspension (a suspension formed by an Hβ molecular sieve and water, with a concentration by weight of the β molecular sieve in the suspension of 0.3 wt %, average grain size of the β molecular sieve of 200 nm, silica-alumina ratio of 30, crystallinity of 89.0%, and the particles of the β molecular sieve being composed of a single crystal grain) at a weight ratio of the ZSM-5 molecular sieve material I, on a dry basis, to the β molecular sieve suspension of 1:10, stirred for 1 hour at 50° C., filtered, and the resulting filter cake was dried in an air atmosphere at 90° C. to obtain a ZSM-5 molecular sieve material II;

(3) 2.0 g of aluminum isopropoxide was dissolved in 30 g of deionized water, 1.30 g of NaOH particles were added, 20.0 g of basic silica sol (with a $SiO_2$ content of 25.0 wt %, a pH value of 10.0 and a sodium oxide content of 0.10 wt %) and 40 g of tetraethylammonium hydroxide solution (with the content by mass of tetraethylammonium hydroxide in the tetraethylammonium hydroxide solution being 25 wt %) were added sequentially, stirred uniformly, then transferred into a reaction kettle with a polytetrafluoroethylene lining for crystallization, and crystallized at 80° C. for 48 hours to obtain a pre-crystallized synthesis liquid III; after a sample of the pre-crystallized synthesis liquid III was filtered, washed, dried and calcined, it can be observed that there was a peak at $2\theta=22.4°\pm0.1°$ and no peak at $2\theta=21.2°\pm0.1°$ in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), crystallized for 60 hours at 120° C., and filtered to obtain a ZSM-5/β core-shell molecular sieve, designated as HK-III-1, of which the properties are shown in Table III-1;

(5) ammonium exchange was carried out on the ZSM-5/β molecular sieve HK-III-1 to reduce the sodium oxide content to a level of less than 0.1 wt %, to obtain a hydrogen-type molecular sieve, wherein the ammonium exchange conditions included: a ratio of HK-III-1 molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 3 hours at 500° C. to obtain a ZSM-5/β core-shell molecular sieve, designated as core-shell molecular sieve A3;

(6) 1.4 g of $H_3PO_4$ (with a concentration of 85 wt %) was dissolved in 10 g of deionized water, then added into 10 g of the core-shell molecular sieve A3, adjusted to a pH of 6 using aqueous ammonia with a concentration of 25 wt %, and fully and uniformly mixed; filtered, dried at 115° C. in an air atmosphere for 4 h; then calcined for 2 h at 550° C.;

(7) the product obtained in step (6) was subjected to a hydrothermal treatment for 4 h at 600° C. under 100% steam;

(8) 0.54 g of $Ga(NO_3)_3$ was dissolved in 10 g of deionized water, then added into the product obtained in step (7), and fully and uniformly mixed; and then dried for 4 h at 115° C. in an air atmosphere, and calcined for 2 h at 550° C., to obtain a phosphorus- and metal-containing core-shell molecular sieve, designated as PMH-III-1.

Example III-2

The core-shell molecular sieve A3 obtained in step (5) of Example III-1 was used as a parent molecular sieve, 1.4 g of $H_3PO_4$ (with a concentration of 85%) and 0.54 g of $Ga(NO_3)_3$ was dissolved in 10 g of deionized water, then added to 10 g of the core-shell molecular sieve A3, adjusted to a pH of 6 with 25% aqueous ammonia, fully and uniformly mixed; dried at 115° C. in an air atmosphere for 4 h; then calcined at 550° C. for 2 h, and the resulting molecular sieve was designated as PMH-III-2.

Example III-3

(1) 5.0 g of hydrogen-type ZSM-5 molecular sieve (with silica-alumina ratio of 60, average grain size of 0.5 μm, average particle size of 10 μm and crystallinity of 90.0%) was added into 50.0 g of aqueous solution of polydiallyldimethylammonium chloride and sodium chloride (the content by mass of polydiallyldimethylammonium chloride in the solution being 0.2% and the content by mass of sodium chloride being 0.2%) at room temperature (25° C.), stirred for 2 h, filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (with a concentration expressed in weight percentage of the β molecular sieve in the β molecular sieve suspension of 2.5%, average grain size of the β molecular sieve of 0.1 μm, silica-alumina ratio of 30.0, and crystallinity of 92.0%) at a weight ratio of the ZSM-5 molecular sieve material I to the β molecular sieve suspension of 1:45, stirred for 2 hours at 50° C., filtered and dried in an air atmosphere at 90° C. to obtain a ZSM-5 molecular sieve material II;

(3) 2.0 g of alumina sol (with an $Al_2O_3$ concentration of 25 wt %, an aluminum-to-chlorine molar ratio of 1.1) was dissolved in 5.0 g of deionized water, 0.3 g of NaOH particles were added, 45.0 mL of water glass (with a $SiO_2$ concentration of 251 g/L, and a modulus of 2.5) and 16 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, and crystallized at 150° C. for 10 hours to obtain a pre-crystallized synthesis liquid III; after a sample of the pre-crystallized synthesis liquid III was filtered, washed, dried and calcined, it can be observed that there was a peak at $2\theta=22.4°$ and no peak at $2\theta=21.2°$ in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), and then crystallized for 80 hours at 130° C. to obtain a ZSM-5/β core-shell molecular sieve HK-III-2;

(5) ammonium exchange was carried out on the ZSM-5/β molecular sieve HK-III-2 to reduce the sodium oxide content to a level of less than 0.1 wt %, to obtain a hydrogen-type molecular sieve, wherein the ammonium exchange conditions included: a weight ratio of HK-III-2 molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 3 hours at 500° C. to obtain a ZSM-5/β core-shell molecular sieve;

(6) 1.4 g $H_3PO_4$ (with a concentration of 85 wt %) was dissolved in 10 g of deionized water, then added into 10 g of the core-shell molecular sieve obtained in step (5), adjusted to a pH of 6 using aqueous ammonia with a concentration of 25 wt %, and fully and uniformly mixed; filtered, dried at 115° C. in an air atmosphere for 4 h; then calcined for 2 h at 550° C.; (7) the product obtained in step (6) was subjected to a hydrothermal treatment for 4 h at 600° C. under 100% steam;

(8) 0.54 g of $Ga(NO_3)_3$ was dissolved in 10 g of deionized water, then added into the product obtained in step (7), and fully and uniformly mixed; and then dried for 4 h at 115° C. in an air atmosphere, and calcined for 2 h at 550° C., to obtain a phosphorus- and metal-containing core-shell molecular sieve, designated as PMH-III-3.

Example III-4

The core-shell molecular sieve A3 obtained in step (5) of Example III-1 was used as a parent molecular sieve and treated as follows:

(1) 1.0 g of ammonium dihydrogen phosphate (with a content of 98%) was dissolved in 10 g of deionized water, then added into 10 g of core-shell molecular sieve A3, adjusted to a pH of 6 using aqueous ammonia with a concentration of 25 wt %, and fully and uniformly mixed; filtered, dried at 115° C. in an air atmosphere for 4 h, and then calcined for 2 h at 550° C.;

(2) the product obtained in step (1) was subjected to a hydrothermal treatment for 4 h at 600° C. under 100% steam;

(3) 0.53 g of $Fe(NO_3)_3$ was dissolved in 10 g of deionized water, then added into the product obtained in step (2), and fully and uniformly mixed; and then dried for 4 h at 115° C. in an air atmosphere, and calcined for 2 h at 550° C., to obtain a phosphorus- and metal-containing core-shell molecular sieve, designated as PMH-III-4.

Comparative Example III-1

(1) 1.4 g $H_3PO_4$ (with a concentration of 85%) and 0.55 g of $Fe(NO_3)_3 \cdot 6H_2O$ were dissolved in 10 g of deionized water, then added into 10 g of ZSM-5 molecular sieve (hydrogen-type ZSM-5, with silica-alumina ratio of 30, average grain size of 1.2 μm, average particle size of the particles of agglomerated grains of 25 μm, crystallinity of 93.0%), adjusted to a pH of 6 using 25% aqueous ammonia, fully and uniformly mixed, dried for 4 h at 115° C. in an air atmosphere, and then calcined for 2 h at 550° C., to obtain a phosphorus- and metal-containing ZSM-5 molecular sieve;

(2) 2.0 g of aluminum isopropoxide was dissolved in 30 g of deionized water, 1.3 g of NaOH particles were added, 20.0 g of silica sol (with a $SiO_2$ content of 25.0 wt %) and 40 g of tetraethylammonium hydroxide solution (with the content by mass of tetraethylammonium hydroxide in the tetraethylammonium hydroxide solution being 25 wt %) were added sequentially, uniformly stirred, then transferred into a reaction kettle with a polytetrafluoroethylene lining for crystallization, crystallized at 120° C. for 60 hours, filtered, washed, dried and calcined to obtain a β molecular sieve; ammonium exchange was carried out on the β molecular sieve under conditions including: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 2 h at 550° C.; 1.4 g of $H_3PO_4$ (with a concentration of 85%) and 0.55 g of $Fe(NO_3)_3 \cdot 6H_2O$ were dissolved in 10 g of deionized water, then added into 10 g of the resulting β molecular sieve, adjusted to a pH of 6 using 25% aqueous ammonia, fully and uniformly mixed, dried for 4 hours at 115° C. in an air atmosphere, and then calcined for 2 hours at 550° C., to obtain a phosphorus- and metal-containing β molecular sieve;

(3) the products obtained in step (1) and step (2) were mechanically mixed at a ratio of 6:4, and the resulting molecular sieve mixture was designated as DBF-III-1.

Comparative Example III-2

A ZSM-5 molecular sieve (with silica-alumina ratio of 30, average grain size of 1.2 μm, average particle size of the particles of agglomerated grains of 25 μm, crystallinity of 93.0%) and the ammonium exchanged hydrogen-type β molecular sieve obtained in step (2) of Comparative Example III-1 were mechanically mixed at a ratio of 6:4, and the resulting molecular sieve mixture was designated DBF-III-2.

Comparative Example III-3

(1) water glass, aluminum sulfate and aqueous ethylamine solution were used as starting materials, and mixed at a molar ratio of $SiO_2$:$Al_2O_3$:$C2H_5NH_2$:$H_2O$=40:1:10:1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the weight ratio of the ZSM-5 molecular sieve to the β molecular sieve suspension being 1:10) dispersed with deionized water to 0.5 wt %, adhered for 30 min, filtered, dried, and calcined for 5 h at 540° C., to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of TEAOH:$SiO_2$:$Al_2O_3$:$H_2O$=13:30:1:1500, and then charged into a stainless steel kettle with a tetrafluoroethylene lining for crystallization at 140° C. for 54 hours;

(4) after the completion of the crystallization, the resultant was filtered, washed, dried, and calcined at 550° C. for 4 hours to obtain a molecular sieve designated as DBF-III-3.

Comparative Example III-4

The molecular sieve obtained in step (4) of Comparative Example III-3 was used as a parent molecular sieve, 1.4 g $H_3PO_4$ (with a concentration of 85%) and 0.54 g $Ga(NO_3)_3$ were dissolved in 10 g of deionized water, then added into 10 g of the molecular sieve, adjusted to a pH of 6 with 25% aqueous ammonia, and fully and uniformly mixed; dried at 115° C. in an air atmosphere for 4 h; then calcined for 2 h at 550° C., and the resulting molecular sieve was designated as DBF-III-4.

Comparative Example III-5

The molecular sieve obtained in step (4) of Comparative Example 3 was used as a parent molecular sieve, 1.4 g $H_3PO_4$ (with a concentration of 85 wt %) was dissolved in 10 g of deionized water, then added into 10 g of the molecular sieve, adjusted to a pH of 6 using aqueous ammonia with a concentration of 25 wt %, and fully and uniformly mixed; filtered, dried at 115° C. in an air atmosphere for 4 h, and then calcined for 2 h at 550° C.; the resulting product was subjected to a hydrothermal treatment for 4 h at a temperature of 600° C. under 100% steam; 0.54 g of $Ga(NO_3)_3$ was dissolved in 10 g of deionized water, then added into the product resulted from the hydrothermal treatment, and fully and uniformly mixed; and then dried for 4 h at 115° C. in an air atmosphere, and calcined for 2 h at 550° C., to obtain a phosphorus- and metal-containing core-shell molecular sieve, designated as DBF-III-5.

The ratio of the height (D1) of the diffraction peak at 2θ=22.4°±0.1° to the height (D2) of the diffraction peak at 2θ=23.1°±0.1° in the X-ray diffraction pattern and the ratio between the area of the peaks in the $^{27}$Al MAS NMR of the products of each example and comparative example are shown in Table III-2

TABLE III-1

Properties of some molecular sieves

| Example No. | Example III-1 | Example III-1 | Comparative Example III-3 | Example III-3 |
|---|---|---|---|---|
| Molecular sieve No. | HK-III-1 | PMH-III-1 | DBF-III-3 | HK-III-2 |
| D1/D2 | 2:3 | 2:3 | 0.01:1 | 4:1 |
| Mass ratio of core to shell | 15:1 | 15:1 | 80:1 | 1:5 |
| The proportion of the specific surface area of mesopores to the total specific surface area, % | 35 | 35 | 45 | 25 |
| Total specific surface area, $m^2/g$ | 533 | 523 | 398 | 547 |
| Average grain size of shell molecular sieve, μm | 0.2 | 0.2 | 0.02 | 0.05 |
| Average grain size of core molecular sieve, μm | 1.2 | 1.2 | 4 | 0.5 |
| Thickness of shell, μm | 0.5 | 0.5 | 0.06 | 0.05 |
| Silica-alumina ratio of core molecular sieve | 30 | 30 | 30 | 60 |
| Silica-alumina ratio of shell molecular sieve | 30 | 30 | 31 | 34 |
| Shell coverage, % | 100 | 100 | 75 | 100 |
| Number of ZSM-5 crystal grains in core molecular sieve | >1 | >1 | 1 | >1 |
| Pore volume, mL/g | 0.371 | 0.360 | 0.201 | 0.377 |
| Pore diameter distribution, % | | | | |
| Proportion of the pore volume of pores with a diameter of 0.3-0.6 nm | 70 | 73 | 80 | 72 |
| Proportion of the pore volume of pores with a diameter of 0.7-1.5 nm | 5 | 6 | 10 | 3 |
| Proportion of the pore volume of pores with a diameter of 2-4 nm | 10 | 8 | 8 | 9 |
| Proportion of the pore volume of pores with a diameter of 20-80 nm | 15 | 13 | 2 | 16 |

TABLE III-2

Properties of the molecular sieves obtained in the examples and comparative examples

| Source of molecular sieves | Molecular sieves No. | D1/D2 | Number of crystal grains in core molecular sieve | Ratio of Peak 1 to Peak 2 in the NMR* | $P_2O_5$/ wt % | $Ga_2O_3$/ wt % | $Fe_2O_3$/ wt % |
|---|---|---|---|---|---|---|---|
| Example III-1 | PMH-III-1 | 2:3 | >1 | 1000 | 7.2 | 3.1 | |
| Example III-2 | PMH-III-2 | 2:3 | >1 | 80 | 6.9 | 3.0 | |
| Example III-3 | PMH-III-3 | 4:1 | >1 | 700 | 6.5 | 2.8 | |

TABLE III-2-continued

Properties of the molecular sieves obtained in the examples and comparative examples

| Source of molecular sieves | Molecular sieves No. | D1/D2 | Number of crystal grains in core molecular sieve | Ratio of Peak 1 to Peak 2 in the NMR* | $P_2O_5$/ wt % | $Ga_2O_3$/ wt % | $Fe_2O_3$/ wt % |
|---|---|---|---|---|---|---|---|
| Example III-4 | PMH-III-4 | 2:3 | >1 | 650 | 7.0 | | 2.7 |
| Comparative Example III-1 | DBF-III-1 | 1:6 | None | 200 | 5.4 | 2.1 | |
| Comparative Example III-2 | DBF-III-2 | 1:6 | None | 0 | 0.0 | 0.0 | |
| Comparative Example III-3 | DBF-III-3 | 0.01:1 | 1 | 0 | 0.0 | 0.0 | |
| Comparative Example III-4 | DBF-III-4 | 0.01:1 | 1 | 40 | 6.5 | 2.0 | |
| Comparative example III-5 | DBF-III-5 | 0.01:1 | 1 | 50 | 7.1 | 2.3 | |

*Note:
Ratio of integrated area of Peak 1 (39 ± 3) ppm to that of Peak 2 (54 ± 3) ppm in $^{27}$Al MAS NMR.

In the following Examples III-5 to III-8 and Comparative Examples III-6 to III-10, the kaolin used is a commercial product from China Kaolin Clay Co. Ltd., having a solid content of 75 wt %; the pseudo-boehmite used is available from Shandong Aluminum Corporation, having an alumina content of 65 wt %; the alumina sol is available from Qilu Branch of Sinopec Catalyst Co. Ltd., having an alumina content of 21 wt %; and the silica sol is available from Beijing Chemical Plant, having a silica content of 25 wt % (acidic silica sol, pH 3.0).

Examples III-5 to III-8

Examples III-5 to III-8 illustrate the preparation of the hydrogenated LCO catalytic cracking catalyst according to the second type of embodiments of the present application.

Catalysts were prepared using the molecular sieves obtained in Examples III-1 to III-4, respectively, and designated as: A-III-1, A-III-2, A-III-3 and A-III-4. The method for preparing the catalyst was as follows:

(1) pseudo-boehmite (boehmite for short) was uniformly mixed with water, concentrated hydrochloric acid (chemically pure, product of Beijing Chemical Plant) with a concentration of 36 wt % was added under stirring, at an acid-to-aluminum ratio of 0.2 (i.e. the weight ratio of the 36 wt % hydrochloric acid to pseudo-boehmite (calculated as $Al_2O_3$)), the resulting mixture was aged at 70° C. for 1.5 hours, to obtain an aged pseudo-boehmite slurry having an alumina content of 12 wt %;

(2) preparation of an additive-containing silicon-based matrix: $Al(NO_3)_3 \cdot 9H_2O$ and deionized water were mixed to obtain an aluminum-containing solution having an $Al_2O_3$ concentration of 0.2 g/L; added into silica sol to form a silica-alumina gel, wherein the weight ratio of silica to alumina is 3.5:1; an aqueous ammonia solution (with an $NH_3$ content 25 wt %) was added into the silica-alumina gel, adjusted to a pH of 7.6, and stood for 15 min; filtered, dried and calcined (at 550° C. for 2 hours) to obtain the additive-containing silicon-based matrix, wherein the most portable pore diameter of the additive-containing silicon-based matrix was 8 nm;

(3) the phosphorus- and metal-containing core-shell molecular sieve, an alumina sol, the additive-containing silicon-based matrix, kaolin, the aged pseudo-boehmite slurry and deionized water were uniformly mixed to form a slurry with a solid content of 30 wt %, and spray dried, to obtain catalyst microspheres;

(4) the resulting catalyst microspheres were calcined at 550° C. for 4 hours;

(5) the calcined catalyst microspheres were subjected to exchanging at a ratio of the catalyst microspheres: ammonium salt:$H_2O$=1:1:10 for 1 h at 80° C., filtered, and subjected to the exchanging and filtering process once again, and dried, wherein the ammonium salt was ammonium chloride. The sodium oxide content in the resulting catalyst was less than 0.15 wt %.

Comparative Examples III-6 to III-10

Comparative Examples III-6 to III-10 illustrate the catalysts prepared using the molecular sieves obtained in Comparative Examples III-1 to III-5.

Catalysts were prepared according to the method for preparing the catalyst as described in Example III-5 using the molecular sieves obtained in Comparative Examples III-1 to III-5, and designated as: DB-III-1, DB-III-2, DB-III-3, DB-III-4 and DB-III-5.

Table III-3 shows the composition expressed in weight percentage of the catalysts obtained in each example and comparative example. The contents of the molecular sieve, the binder and the kaolin in the catalyst are calculated based on the amounts of corresponding starting materials used in the preparation. The amounts by weight of the molecular sieve and the kaolin are calculated on a dry basis, the amount of the additive-containing silicon-based matrix is calculated as silica ($SiO_2$), and the amounts of the alumina sol and the boehmite are calculated as $Al_2O_3$.

TABLE III-3

Composition of the catalysts obtained in examples and comparative examples

| Example No. | Catalyst No. | Molecular sieve | Kaolin | Boehm-ite | Alumina sol | Additive-containing silicon-based matrix | Additive | Position of the peak in the most probable pore distribution nm | Sodium oxide in catalyst wt % | Specific surface area $m^2/g$ | External surface area $m^2/g$ | Total pore volume $cm^3/g$ | Pore volume of meso-pores $cm^3/g$ |
|---|---|---|---|---|---|---|---|---|---|---|---|---|---|
| | | wt % | | | | | | | | | | | |
| Examples III-5 | A-III-1 | 37 | 28 | 10 | 15 | 10 | Alumina | 15 | 0.05 | 388 | 193 | 0.318 | 0.237 |
| Examples III-6 | A-III-2 | 37 | 28 | 10 | 15 | 10 | Alumina | 10 | 0.04 | 376 | 182 | 0.309 | 0.221 |
| Examples III-7 | A-III-3 | 37 | 28 | 10 | 15 | 10 | Alumina | 12 | 0.02 | 354 | 172 | 0.287 | 0.200 |
| Examples III-8 | A-III-4 | 37 | 28 | 10 | 15 | 10 | Alumina | 13 | 0.03 | 324 | 160 | 0.276 | 0.187 |
| Comparative Examples III-6 | DB-III-1 | 37 | 28 | 10 | 15 | 10 | Alumina | 5 | 0.05 | 313 | 140 | 0.240 | 0.111 |
| Comparative Examples III-7 | DB-III-2 | 37 | 28 | 10 | 15 | 10 | Alumina | 5 | 0.02 | 295 | 120 | 0.219 | 0.100 |
| Examples III-8 Comparative | DB-III-3 | 37 | 28 | 10 | 15 | 10 | Alumina | 5 | 0.07 | 245 | 58 | 0.120 | 0.061 |
| Comparative Examples III-9 | DB-III-4 | 37 | 28 | 10 | 15 | 10 | Alumina | 5 | 0.08 | 231 | 55 | 0.112 | 0.050 |
| Comparative Examples III-10 | DB-III-5 | 37 | 28 | 10 | 15 | 10 | Alumina | 5 | 0.06 | 237 | 57 | 0.118 | 0.052 |

Catalyst Evaluation

The catalysts obtained in Examples III-5 to III-8 and the catalysts obtained in Comparative Examples III-6 to III-10 were aged at 800° C. for 4 hours under 100 vol % steam, then evaluated for the performance in the hydrogenated LCO catalytic cracking reaction in a small fixed bed reactor under conditions including a reaction temperature of 650° C. and a catalyst-to-oil ratio of 20. The properties of the hydrogenated LCO used are shown in Table III-4, and the reaction results are shown in Table III-5.

TABLE III-4

Properties of hydrogenated LCO

| Properties | Hydrogenated LCO |
|---|---|
| Carbon content, wt % | 88.37 |
| Hydrogen content, wt % | 11.63 |

TABLE III-4-continued

Properties of hydrogenated LCO

| Properties | Hydrogenated LCO |
|---|---|
| Density at 20° C., $kg/m^3$ | 888.7 |
| 10% carbon residue, wt % | <0.1 |
| Freezing point, ° C. | <−50 |
| Paraffins, wt % | 13.0 |
| Monocycloalkanes, wt % | 7.6 |
| Bicycloalkanes, wt % | 18.1 |
| Tricycloalkanes, wt % | 8.7 |
| Total naphthenes, wt % | 34.4 |
| Total bicyclic aromatics, wt % | 6.4 |

TABLE III-5

Evaluation results

| Catalyst | A-III-1 | A-III-2 | A-III-3 | A-III-4 | DB-III-1 | DB-III-2 | DB-III-3 | DB-III-4 | DB-III-5 |
|---|---|---|---|---|---|---|---|---|---|
| | Product yield, wt % | | | | | | | | |
| Dry gas | 9.46 | 8.06 | 7.98 | 7.7 | 4.49 | 4.81 | 7.06 | 5.98 | 4.16 |
| Liquefied gas | 24.65 | 23.03 | 22.69 | 22.44 | 8.71 | 9.82 | 21.91 | 20.9 | 9.28 |
| $C5^+$ gasoline | 36.21 | 33.33 | 33.01 | 32.87 | 39.27 | 38.28 | 31.08 | 30.65 | 40.58 |
| Diesel oil | 19.3 | 25.68 | 26.29 | 26.97 | 42.15 | 39.25 | 29.15 | 32.25 | 39.07 |
| Heavy oil | 1.02 | 2.64 | 3.04 | 3.55 | 2.78 | 2.85 | 4.96 | 6.13 | 2.82 |
| Coke | 9.36 | 7.26 | 6.99 | 6.47 | 2.6 | 4.99 | 5.84 | 4.09 | 4.09 |

TABLE III-5-continued

| Evaluation results | | | | | | | | | |
|---|---|---|---|---|---|---|---|---|---|
| Catalyst | A-III-1 | A-III-2 | A-III-3 | A-III-4 | DB-III-1 | DB-III-2 | DB-III-3 | DB-III-4 | DB-III-5 |
| | Product yield, wt % | | | | | | | | |
| Ethylene | 5.69 | 15.03 | 4.88 | 4.65 | 2.64 | 2.65 | 4.15 | 3.03 | 2.03 |
| Propylene | 14.5 | 13.67 | 13.1 | 12.68 | 5.97 | 6.1 | 11.63 | 9.67 | 5.31 |
| Content by mass of benzene and methylbenzenes having 10 or less carbon atoms in gasoline, %* | 39.43 | 37.36 | 36.9 | 36.32 | 11.9 | 11.92 | 36.27 | 35.02 | 11.45 |

Note*:
the methylbenzenes having 10 or less carbon atoms are toluene, xylene, trimethylbenzene and tetramethylbenzene.

The product yield was calculated based on the feed quantity of the feedstock.

Product yield=amount of the product (weight)/feed quantity of the hydrogenated LCO (weight)×100%;

As can be seen from the results listed in Tables III-5, the hydrogenated LCO catalytic cracking catalyst according to the second type of embodiments of the present application shows a higher hydrogenated LCO cracking capacity, as well as higher yields of light olefins and aromatics.

The example series IV illustrates the preparation and properties of the catalyst according to the third type of embodiments of the present application.

Example IV-1

(1) at room temperature (25° C.), 10.0 g of ZSM-5 molecular sieve (hydrogen-type ZSM-5, with silica-alumina ratio of 30, average grain size of 1.2 μm, average particle size of the particles of agglomerated grains of 15 μm, crystallinity of 93.0%) was added as a core into 100.0 g of an aqueous solution containing methyl methacrylate and sodium chloride (having a sodium chloride concentration of 5.0%) with a methyl methacrylate content by mass of 0.2%, stirred for 1 h, filtered and dried at 50° C. in an air atmosphere to obtain a ZSM-5 molecular sieve material I;

(2) the ZSM-5 molecular sieve material I was added into a β molecular sieve suspension (a suspension formed by an β molecular sieve and water, with a concentration by weight of the β molecular sieve in the suspension of 0.3 wt %, average grain size of the β molecular sieve of 200 nm, silica-alumina ratio of 30, crystallinity of 89.0%, and the particles of the β molecular sieve being composed of a single crystal grain) at a weight ratio of the ZSM-5 molecular sieve material I, on a dry basis, to the β molecular sieve suspension of 1:10, stirred for 1 hour at 50° C., filtered, and the resulting filter cake was dried in an air atmosphere at 90° C. to obtain a ZSM-5 molecular sieve material II;

(3) 2.0 g of aluminum isopropoxide was dissolved in 30 g of deionized water, 1.30 g of NaOH particles were added, 20.0 g of basic silica sol (with a $SiO_2$ content of 25.0 wt %, a pH value of 10.0 and a sodium oxide content of 0.10 wt %) and 40 g of tetraethylammonium hydroxide solution (with the content by mass of tetraethylammonium hydroxide in the tetraethylammonium hydroxide solution being 25 wt %) were added sequentially, stirred uniformly, then transferred into a reaction kettle with a polytetrafluoroethylene lining for crystallization, and crystallized at 80° C. for 48 hours to obtain a pre-crystallized synthesis liquid III; after a sample of the pre-crystallized synthesis liquid III was filtered, washed, dried and calcined, it can be observed that there was a peak at 2θ=22.4°±0.1° and no peak at 2θ=21.2°±0.1° in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), crystallized for 60 hours at 120° C., and filtered to obtain a ZSM-5/β core-shell molecular sieve, designated as HK-IV-1, of which the properties are shown in Table IV-1;

(5) ammonium exchange was carried out on the ZSM-5/β molecular sieve HK-IV-1 to reduce the sodium oxide content to a level of less than 0.1 wt %, to obtain a hydrogen-type molecular sieve, wherein the ammonium exchange conditions included: a weight ratio of HK-IV-1 molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 3 hours at 500° C., to obtain a ZSM-5/β core-shell molecular sieve, designated as core-shell molecular sieve A4;

(6) 1.4 g $H_3PO_4$ (with a concentration of 85 wt %) was dissolved in 10 g of deionized water, then added into 10 g of the core-shell molecular sieve A4, adjusted to a pH of 6 using aqueous ammonia with a concentration of 25 wt %, and fully and uniformly mixed; filtered, dried at 115° C. in an air atmosphere for 4 h, and then calcined for 2 h at 550° C.;

(7) the product obtained in step (6) was subjected to a hydrothermal treatment for 4 h at 600° C. under 100% steam;

(8) 0.55 g of $Fe(NO_3)_3 \cdot 6H_2O$ was dissolved in 10 g of deionized water, then added into the product obtained in step (7), and fully and uniformly mixed; and then dried for 4 h at 115° C. in an air atmosphere, and calcined for 2 h at 550° C., to obtain a phosphorus- and metal-containing core-shell molecular sieve, designated as PMH-IV-1.

Example IV-2

The core-shell molecular sieve A4 obtained in step (5) of Example IV-1 was used as a parent molecular sieve, 1.4 g $H_3PO_4$ (with a concentration of 85%) and 0.55 g of $Fe(NO_3)$ $_3$·$6H_2O$ were dissolved in 10 g of deionized water, then added to 10 g of the core-shell molecular sieve A4, adjusted to a pH of 6 with 25% aqueous ammonia, fully and uniformly mixed; dried at 115° C. in an air atmosphere for 4 h, and then calcined at 550° C. for 2 h, to obtain a molecular sieve, designated as PMH-IV-2.

Example IV-3

(1) at room temperature (25° C.), 5.0 g of hydrogen-type ZSM-5 molecular sieve (with silica-alumina ratio of 60, average grain size of 0.5 μm, average particle size of 10 μm and crystallinity of 90.0%) was added into 50.0 g of aqueous solution of polydiallyldimethylammonium chloride and sodium chloride (the content by mass of polydiallyldimethylammonium chloride in the solution being 0.2% and the content by mass of sodium chloride being 0.2%), stirred for 2 h, filtered, and the resulting filter cake was dried at 50° C. in an air atmosphere, to obtain a ZSM-5 molecular sieve material I;

(2) the ZSM-5 molecular sieve material I was added into a hydrogen-type β molecular sieve suspension (with a concentration expressed in weight percentage of the β molecular sieve in the β molecular sieve suspension of 2.5%, average grain size of the β molecular sieve of 0.1 μm, silica-alumina ratio of 30.0, and crystallinity of 92.0%) at a weight ratio of the ZSM-5 molecular sieve material I to the β molecular sieve suspension of 1:45, stirred for 2 hours at 50° C., filtered and dried in an air atmosphere at 90° C., to obtain a ZSM-5 molecular sieve material II;

(3) 2.0 g of alumina sol (with an $Al_2O_3$ concentration of 25 wt %, an aluminum-to-chlorine molar ratio of 1.1) was dissolved in 5.0 g of deionized water, 0.3 g of NaOH particles were added, 45.0 mL of water glass (with a $SiO_2$ concentration of 251 g/L, and a modulus of 2.5) and 16 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, and crystallized at 150° C. for 10 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III (at a weight ratio of the ZSM-5 molecular sieve material II, on a dry basis, to the pre-crystallized synthesis liquid III of 1:10), and then crystallized for 80 hours at 130° C., to obtain a ZSM-5/β core-shell molecular sieve, designated as HK-IV-2;

(5) ammonium exchange was carried out on the ZSM-5/β molecular sieve HK-IV-2 to reduce the sodium oxide content to a level of less than 0.1 wt %, to obtain a hydrogen-type molecular sieve, wherein the ammonium exchange conditions included: a weight ratio of HK-IV-2 molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 3 hours at 500° C., to obtain a ZSM-5/β core-shell molecular sieve;

(6) 1.4 g $H_3PO_4$ (with a concentration of 85 wt %) was dissolved in 10 g of deionized water, then added into 10 g of the core-shell molecular sieve obtained in step (5), adjusted to a pH of 6 using aqueous ammonia with a concentration of 25 wt %, and fully and uniformly mixed; filtered, dried at 115° C. in an air atmosphere for 4 h, and then calcined for 2 h at 550° C.;

(7) the product obtained in step (6) was subjected to a hydrothermal treatment for 4 h at 600° C. under 100% steam;

(8) 0.54 g of $Fe(NO_3)_3$ was dissolved in 10 g of deionized water, then added into the product obtained in step (7), and fully and uniformly mixed; and then dried for 4 h at 115° C. in an air atmosphere, and calcined for 2 h at 550° C., to obtain a phosphorus- and metal-containing core-shell molecular sieve, designated as PMH-IV-3.

Example IV-4

The core-shell molecular sieve A4 obtained in step (5) of Example IV-1 was used as a parent molecular sieve and treated as follows:

(1) 1.2 g of diammonium hydrogen phosphate (with a content of 98%) was dissolved in 10 g of deionized water, then added into 10 g of core-shell molecular sieve A4, adjusted to a pH of 6 using aqueous ammonia with a concentration of 25 wt %, and fully and uniformly mixed; filtered, dried at 115° C. in an air atmosphere for 4 h, and then calcined for 2 h at 550° C.;

(2) the product obtained in step (1) was subjected to a hydrothermal treatment for 4 h at 600° C. under 100% steam;

(3) 0.55 g of $Fe(NO_3)_3$ was dissolved in 10 g of deionized water, then added into the product obtained in step (2), fully and uniformly mixed, then dried for 4 h at 115° C. in an air atmosphere, and calcined for 2 h at 550° C., to obtain a phosphorus- and metal-containing core-shell molecular sieve, designated as PMH-IV-4.

Comparative Example IV-1

(1) 1.4 g $H_3PO_4$ (with a concentration of 85%) and 0.55 g of $Fe(NO_3)_3$·$6H_2O$ were dissolved in 10 g of deionized water, then added into 10 g of ZSM-5 molecular sieve (hydrogen-type ZSM-5, with silica-alumina ratio of 30, average grain size of 1.2 μm, average particle size of the particles of agglomerated grains of 25 μm, crystallinity of 93.0%), adjusted to a pH of 6 by 25% aqueous ammonia, and fully and uniformly mixed; dried at 115° C. in an air atmosphere for 4 h; then calcined for 2 hours at 550° C., to obtain a phosphorus- and metal-containing ZSM-5 molecular sieve;

(2) 2.0 g of aluminum isopropoxide was dissolved in 30 g of deionized water, 1.3 g of NaOH particles were added, 20.0 g of silica sol (with a $SiO_2$ content of 25.0 wt %) and 40 g of tetraethylammonium hydroxide solution (with the content by mass of tetraethylammonium hydroxide in the tetraethylammonium hydroxide solution being 25 wt %) were added sequentially, uniformly stirred, then transferred into a reaction kettle with a polytetrafluoroethylene lining for crystallization, crystallized at 120° C. for 60 hours, filtered, washed, dried and calcined to obtain a β molecular sieve; ammonium exchange was carried out on the β molecular sieve under conditions including: a ratio of molecular sieve:ammonium chloride:$H_2O$=1:0.5:10, an ammonium exchange temperature of 80° C., and an ammonium exchange time of 1 h. After the ammonium exchange, the resultant was filtered, washed, dried and calcined for 2 h at 550° C.; 1.4 g $H_3PO_4$ (with a concentration of 85%) and 0.55 g of $Fe(NO_3)_3 \cdot 6H_2O$ were dissolved in 10 g of deionized water, then added into 10 g of the resulting β molecular sieve, adjusted to a pH of 6 with 25% aqueous ammonia, and fully and uniformly mixed; dried at 115° C. in an air atmosphere for 4 h; then calcined for 2 hours at 550° C., to obtain a phosphorus- and metal-containing β molecular sieve;

(3) the molecular sieves obtained in step (1) and step (2) were mechanically mixed at a ratio of 6:4, and the resulting molecular sieve mixture was designated as DBF-IV-1.

Comparative Example IV-2

A ZSM-5 molecular sieve (with silica-alumina ratio of 30, average grain size of 1.2 μm, average particle size of the particles of agglomerated grains of 25 μm, crystallinity of 93.0%) and the ammonium exchanged hydrogen-type β molecular sieve obtained in step (2) of Comparative Example IV-1 were mechanically mixed at a ratio of 6:4, and the resulting molecular sieve mixture was designated DBF-IV-2.

Comparative Example IV-3

(1) water glass, aluminum sulfate and aqueous ethylamine solution were used as starting materials, and mixed at a molar ratio of $SiO_2$:$Al_2O_3$:$C2H_5NH_2$:$H_2O$=40:1:10:1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the weight ratio of the ZSM-5 molecular sieve to the β molecular sieve suspension being 1:10) dispersed with deionized water to 0.5 wt %, adhered for 30 min, filtered, dried, and calcined for 5 h at 540° C., to obtain a core molecular sieve;

(3) silica white and tetraethoxysilane (TEOS) were used as a silicon source, sodium aluminate and TEAOH were used as starting materials, they were added into the core molecular sieve obtained in step (2) at a ratio of TEAOH:$SiO_2$:$Al_2O_3$:$H_2O$=13:30:1:1500, and then charged into a stainless steel kettle with a tetrafluoroethylene lining for crystallization at 140° C. for 54 hours;

(4) after the completion of the crystallization, the resultant was filtered, washed, dried, and calcined at 550° C. for 4 hours to obtain a molecular sieve designated as DBF-IV-3.

Comparative Example IV-4

The molecular sieve obtained in step (4) of Comparative Example IV-3 was used as a parent molecular sieve, 1.4 g $H_3PO_4$ (with a concentration of 85%) and 0.55 g of $Fe(NO_3)_3 \cdot 6H_2O$ were dissolved in 10 g of deionized water, then added into 10 g of the molecular sieve, adjusted to a pH of 6 using 25% aqueous ammonia, fully and uniformly mixed, dried for 4 h at 115° C. in an air atmosphere, and then calcined for 2 h at 550° C., the resulting molecular sieve was designated as DBF-IV-4.

Comparative Example IV-5

The molecular sieve obtained in step (4) of Comparative Example IV-3 was used as a parent molecular sieve, 1.4 g $H_3PO_4$ (with a concentration of 85 wt %) was dissolved in 10 g of deionized water, then added into 10 g of the core-shell molecular sieve, adjusted to a pH of 6 using aqueous ammonia with a concentration of 25 wt %, and fully and uniformly mixed; filtered, dried at 115° C. in an air atmosphere for 4 h, and then calcined for 2 h at 550° C.; the resulting product was subjected to a hydrothermal treatment for 4 h at a temperature of 600° C. under 100% steam; 0.55 g of $Fe(NO_3)_3 \cdot 6H_2O$ was dissolved in 10 g of deionized water, then added into the product resulted from the hydrothermal treatment, and fully and uniformly mixed; and then dried for 4 h at 115° C. in an air atmosphere, and calcined for 2 h at 550° C., to obtain a phosphorus- and metal-containing core-shell molecular sieve, designated as DBF-IV-5.

The ratio of the height (D1) of the diffraction peak at 2θ=22.4°±0.1° to the height (D2) of the diffraction peak at 2θ=23.1°±0.1° in the X-ray diffraction pattern and the ratio between the area of the peaks in the $^{27}Al$ MAS NMR of the products of each example and comparative example are shown in Table IV-2.

TABLE IV-1

Properties of some molecular sieves

| Example No. | Example IV-1 | Example IV-1 | Example IV-3 | Comparative Example IV-3 |
|---|---|---|---|---|
| Product No. | HK-IV-1 | PMH-IV-1 | HK-IV-2 | DBF-IV-3 |
| D1/D2 | 2:3 | 2:3 | 4:1 | 0.01:1 |
| Mass ratio of core to shell | 15:1 | 15:1 | 1:5 | 80:1 |
| The proportion of the specific surface area of mesopores to total specific surface area, % | 35 | 35 | 25 | 45 |
| Total specific surface area, $m^2/g$ | 533 | 523 | 547 | 398 |
| Average grain size of shell molecular sieve, μm | 0.2 | 0.2 | 0.05 | 0.02 |
| Average grain size of core molecular sieve, μm | 1.2 | 1.2 | 0.5 | 4 |
| Thickness of shell, μm | 0.5 | 0.5 | 0.05 | 0.06 |
| Silica-alumina ratio of core molecular sieve | 30 | 30 | 60 | 30 |
| Silica-alumina ratio of shell molecular sieve | 30 | 30 | 34 | 31 |
| Shell coverage, % | 100 | 100 | 100 | 75 |
| Number of ZSM-5 crystal grains in core molecular sieve | >1 | >1 | >1 | 1 |
| Pore volume, mL/g | 0.371 | 0.360 | 0.377 | 0.201 |
| Pore diameter distribution, % | | | | |
| Proportion of the pore volume of pores with a diameter of 0.3-0.6 nm | 70 | 73 | 72 | 80 |

TABLE IV-1-continued

| Properties of some molecular sieves | | | | |
|---|---|---|---|---|
| Example No. | Example IV-1 | Example IV-1 | Example IV-3 | Comparative Example IV-3 |
| Proportion of the pore volume of pores with a diameter of 0.7-1.5 nm | 5 | 6 | 3 | 10 |
| Proportion of the pore volume of pores with a diameter of 2-4 nm | 10 | 8 | 9 | 8 |
| Proportion of the pore volume of pores with a diameter of 20-80 nm | 15 | 13 | 16 | 2 |

TABLE IV-2

Properties of the molecular sieves obtained in the examples and comparative examples

| Source of product | Product No. | D1/D2 | Number of crystal grains in core molecular sieve | Ratio of Peak 1 to Peak 2 in the NMR* | $P_2O_5$/ wt % | $Fe_2O_3$/ wt % |
|---|---|---|---|---|---|---|
| Example IV-1 | PMH-IV-1 | 2:3 | 1000 | 7.2 | 2.9 | 1000 |
| Example IV-2 | PMH-IV-2 | 2:3 | 80 | 6.9 | 2.8 | 80 |
| Example IV-3 | PMH-IV-3 | 4:1 | 955 | 7.2 | 2.9 | 955 |
| Example IV-4 | PMH-IV-4 | 2:3 | 1000 | 7.6 | 2.8 | 1000 |
| Comparative Example IV-1 | DBF-IV-1 | 1:6 | 200 | 5.4 | 2.2 | 200 |
| Comparative Example IV-2 | DBF-IV-2 | 1:6 | 0 | 0.0 | 0.0 | 0 |
| Comparative Example IV-3 | DBF-IV-3 | 0.01:1 | 0 | 0.0 | 0.0 | 0 |
| Comparative Example IV-4 | DBF-IV-4 | 0.01:1 | 40 | 6.5 | 2.0 | 40 |
| Comparative Example IV-5 | DBF-IV-5 | 0.01:1 | 50 | 7.1 | 2.1 | 50 |

*Note:
Ratio of integrated area of Peak 1 (39 ± 3) ppm to that of Peak 2 (54 ± 3) ppm in $^{27}$Al MAS NMR.

In Examples IV-5 to IV-8 and Comparative Examples IV-6 to IV-10, the kaolin used is a commercial product from China Kaolin Clay Co. Ltd., having a solid content of 75 wt %; the pseudo-boehmite used is available from Shandong Aluminum Corporation, having an alumina content of 65 wt %; the alumina sol is available from Qilu Branch of Sinopec Catalyst Co. Ltd., having an alumina content of 21 wt %; the silica sol is available from Beijing Chemical Plant, having a silica content of 25 wt % and a pH of 3.1; the Y molecular sieve is available from Qilu Branch of Sinopec Catalyst Co. Ltd. under the trade name HSY-12, having a rare earth content of 12 wt %, silica-alumina ratio of 6.09, crystallinity of 53.0%; the β molecular sieve is an Hβ molecular sieve, having a silica-alumina ratio of 25.0, crystallinity of 91.4%, available from Qilu Branch of Sinopec Catalyst Co. Ltd.

Examples IV-5 to IV-8

Examples IV-5 to IV-8 illustrate the preparation of the catalytic cracking catalyst according to the third type of embodiments of the present application.

Catalysts were prepared using the core-shell molecular sieves obtained in Examples IV-1 to IV-4, respectively, and designated as: A-IV-1, A-IV-2, A-IV-3 and A-IV-4. The method for preparing the catalyst was as follows:

(1) pseudo-boehmite (boehmite for short) was uniformly mixed with water, concentrated hydrochloric acid (chemically pure, product of Beijing Chemical Plant) with a concentration of 36 wt % was added under stirring, at an acid-to-aluminum ratio of 0.2 (i.e. the weight ratio of the 36 wt % hydrochloric acid to pseudo-boehmite (calculated as $Al_2O_3$)), the resulting mixture was aged at 70° C. for 1.5 hours, to obtain an aged pseudo-boehmite slurry having an alumina content of 12 wt %;

(2) the phosphorus- and metal-containing core-shell molecular sieve, a Y molecular sieve, a β molecular sieve, an alumina sol, a silica sol, kaolin, the aged pseudo-boehmite and deionized water were mixed to obtain a slurry with a solid content of 28 wt %, stirred for 30 minutes, and spray dried, to obtain catalyst microspheres;

(3) the catalyst microspheres were subjected to exchanging at a weight ratio of catalyst microspheres:ammonium salt:$H_2O$=1:1:10 for 1 h at 80° C., filtered, subjected to the exchanging and filtering process once again, dried and calcined to obtain the catalyst.

Comparative Examples IV-6 to IV-10

Comparative Examples IV-6 to IV-10 illustrate the catalysts prepared using the molecular sieves obtained in Comparative Examples IV-1 to IV-5.

Catalysts were prepared according to the method for preparing the catalyst as described in Example IV-5 using the molecular sieves obtained in Comparative Examples IV-1 to IV-5, and designated as: DB-IV-1, DB-IV-2, DB-IV-3, DB-IV-4 and DB-IV-5.

Table IV-3 shows the composition expressed in weight percentage, on a dry basis, of the catalysts obtained in each example and comparative example. The contents of the core-shell molecular sieve (first molecular sieve), the Y molecular sieve (second molecular sieve), the β molecular sieve (third molecular sieve), the alumina sol, the silica sol, the boehmite and the kaolin are calculated based on the amounts of corresponding starting materials used in the preparation.

TABLE IV-3

| Composition of the catalysts obtained in the examples and comparative examples | | | | | | | | |
|---|---|---|---|---|---|---|---|---|
| Example No. | Catalyst No. | First molecular sieve | Second molecular sieve | Third molecular sieve | Kaolin | Boehmite | Alumina sol | Silica sol |
| Example IV-5 | A-IV-1 | 15% | 17% | 5% | 28% | 10% | 20% | 5% |
| Example IV-6 | A-IV-2 | 15% | 17% | 5% | 28% | 10% | 20% | 5% |
| Example IV-7 | A-IV-3 | 15% | 17% | 5% | 28% | 10% | 20% | 5% |
| Example IV-8 | A-IV-4 | 15% | 17% | 5% | 28% | 10% | 20% | 5% |
| Comparative Example IV-6 | DB-IV-1 | 15% | 17% | 5% | 28% | 10% | 20% | 5% |
| Comparative Example IV-7 | DB-IV-2 | 15% | 17% | 5% | 28% | 10% | 20% | 5% |
| Comparative Example IV-8 | DB-IV-3 | 15% | 17% | 5% | 28% | 10% | 20% | 5% |
| Comparative Example IV-9 | DB-IV-4 | 15% | 17% | 5% | 28% | 10% | 20% | 5% |
| Comparative Example IV-10 | DB-IV-5 | 15% | 17% | 5% | 28% | 10% | 20% | 5% |

Catalyst Evaluation

The catalysts obtained in Examples IV-5 to IV-8 and Comparative Examples IV-6 to IV-10 were aged at 800° C. for 17 hours under 100% steam, and then evaluated for the performance in heavy oil catalytic cracking reaction in a small fixed fluidized bed reactor under the conditions including a reaction temperature of 510° C., a weight space velocity of 40 $h^{-1}$, and a catalyst-to-oil ratio of 6 (by weight). The properties of the heavy oil used are shown in Table IV-4, and the reaction results are shown in Table IV-5.

TABLE IV-4

| Properties of heavy oil | |
|---|---|
| Properties | Heavy oil |
| Density at 20° C., $g/cm^3$ | 0.8974 |
| Refraction at 70° C. | 1.4794 |
| Viscosity at 80° C., $mm^2/s$ | 15.87 |
| Carbon residue, m % | 0.3 |
| Four-component composition, m % | |
| Saturates | 78.8 |
| Aromatics | 19.6 |
| Resins | 1.6 |
| Asphaltenes | <0.1 |
| Hydrocarbon composition, m % | |
| Paraffins | 30.5 |
| Total naphthenes | 48.3 |

As can be seen from the results shown in Tables IV-5, the catalytic cracking catalyst according to the third type of embodiments of the present application shows a higher heavy oil conversion capacity, a higher yield of light olefins (ethylene and propylene), and higher yields of liquefied gas and gasoline.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A phosphorus- and metal-containing core-shell molecular sieve, having a core composed of a ZSM-5 molecular sieve, and a shell composed of a β molecular sieve, wherein,

TABLE IV-5

| Evaluation results | | | | | | | | | |
|---|---|---|---|---|---|---|---|---|---|
| Catalyst | A-IV-1 | A-IV-2 | A-IV-3 | A-IV-4 | DB-IV-1 | DB-IV-2 | DB-IV-3 | DB-IV-4 | DB-IV-5 |
| Product distribution, wt % | | | | | | | | | |
| Dry gas | 10.02 | 9.37 | 9.27 | 9.24 | 8.25 | 7.16 | 5.86 | 6.81 | 7.01 |
| Liquefied gas | 21.06 | 19.43 | 18.97 | 19.45 | 17.69 | 16.64 | 14.32 | 15.64 | 16.02 |
| Gasoline | 46.34 | 45.78 | 46.89 | 46.11 | 44.70 | 44.69 | 40.31 | 42.72 | 43.26 |
| Diesel oil | 13.20 | 15.21 | 14.81 | 15.10 | 17.20 | 18.60 | 23.45 | 21.69 | 20.16 |
| Heavy oil | 2.09 | 3.56 | 3.82 | 3.37 | 5.67 | 6.68 | 12.94 | 9.03 | 18.21 |
| Coke | 7.29 | 6.65 | 6.24 | 6.73 | 6.49 | 6.23 | 3.12 | 4.11 | 5.34 |
| Yield of ethylene + propylene, wt % | 16.04 | 14.97 | 15.06 | 14.90 | 12.27 | 11.57 | 8.50 | 10.31 | 10.81 |
| Yield of ethylene, wt % | 5.51 | 5.06 | 5.01 | 5.17 | 3.96 | 3.58 | 2.34 | 3.19 | 3.36 |
| Yield of propylene, wt % | 10.53 | 19.91 | 10.05 | 9.73 | 8.31 | 7.99 | 6.16 | 7.12 | 7.45 |

The product yields listed in Table IV-5 were calculated based on the feed quantity of the feedstock.

based on the dry weight of the phosphorus- and metal-containing core-shell molecular sieve, the core-shell molecular sieve has a phosphorus content, calculated as $P_2O_5$, of 1-10 wt %, and a metal content, calculated as metal oxide, of 0.1-10 wt %;

the phosphorus- and metal-containing core-shell molecular sieve shows an 27Al MAS NMR with a ratio of the area of a resonance signal peak at a chemical shift of 39±3 ppm to the area of a resonance signal peak at a chemical shift of 54±3 ppm of 0.01-∞:1, and the metal is selected from Fe, Co, Ni, Ga, Zn, Cu, Ti, K, Mg, and combinations thereof; and the phosphorus- and metal-containing core-shell molecular sieve shows an X-ray diffraction pattern with a ratio of the height of a diffraction peak at 2θ=22.4°±0.1° to the height of a diffraction peak at 2θ=23.1°±0.1° of 0.1-10:1.

2. The phosphorus- and metal-containing core-shell molecular sieve according to claim 1, wherein the mass ratio of the core to the shell of the phosphorus- and metal-containing core-shell molecular sieve is 0.2-20:1.

3. The phosphorus- and metal-containing core-shell molecular sieve according to claim 1, wherein the phosphorus- and metal-containing core-shell molecular sieve has a total specific surface area of 450-620 $m^2$/g, and a proportion of the specific surface area of pores with a pore diameter of 2-50 nm to the total specific surface area of 10-40%.

4. The phosphorus- and metal-containing core-shell molecular sieve according to claim 1, wherein the core is composed of at least two ZSM-5 molecular sieve crystal grains, the shell is composed of a plurality of β molecular sieve crystal grains, the ZSM-5 molecular sieve crystal grains have an average grain size of 0.05-15 μm, the core-shell molecular sieve has a shell coverage of 50-100%, a shell thickness of 10-2000 nm, and the β molecular sieve crystal grains in the shell have an average grain size of 10-500 nm.

5. A method for synthesizing a phosphorus- and metal-containing core-shell molecular sieve according to claim 1, comprising the steps of: loading phosphorus and metal on a hydrogen-type core-shell molecular sieve, and calcining, wherein the hydrogen-type core-shell molecular sieve has a core composed of a ZSM-5 molecular sieve, a shell composed of a β molecular sieve, and a sodium content, calculated as sodium oxide, of not more than 0.2 wt %, and the metal is selected from Fe, Co, Ni, Ga, Zn, Cu, Ti, K, Mg, and combinations thereof.

6. The method according to claim 5, comprising the steps of:

1) loading phosphorus on the hydrogen-type core-shell molecular sieve to obtain a modified core-shell molecular sieve material I;
2) calcining the modified core-shell molecular sieve material I in an atmosphere comprising steam to obtain a modified core-shell molecular sieve material II; and
3) loading the metal on the modified core-shell molecular sieve material II and calcining to obtain the phosphorus- and metal-containing core-shell molecular sieve.

7. The method according to claim 6, wherein the method is carried out by:

mixing the hydrogen-type core-shell molecular sieve with a solution of a phosphorus-containing compound with a pH of 4-10, drying, and optionally calcining to obtain the modified core-shell molecular sieve material I;

calcining the modified core-shell molecular sieve material I for 0.5-24 h at 400-1000° C. in the atmosphere comprising steam to obtain the modified core-shell molecular sieve material II; and mixing the modified core-shell molecular sieve material II with a solution comprising one or more compounds comprising the metal, drying and calcining to obtain the phosphorus- and metal-containing core-shell molecular sieve.

8. The method according to claim 5 further comprising preparing the hydrogen-type core-shell molecular sieve that comprises:

i) treating a particulate ZSM-5 molecular sieve with a surfactant solution to obtain a ZSM-5 molecular sieve material I;
ii) treating the ZSM-5 molecular sieve material I with a slurry comprising a particulate β molecular sieve to obtain a ZSM-5 molecular sieve material II;
iii) providing a mixture comprising a silicon source, an aluminum source, an optional alkali source, a template and water, and crystallizing at a temperature of 50-300° C. for 4-100 h to obtain a pre-crystallized synthesis liquid III;
iv) mixing the ZSM-5 molecular sieve material II with the pre-crystallized synthesis liquid III, and carrying out crystallization at a temperature of 50-300° C. for 10-400 h to obtain a sodium-type core-shell molecular sieve; and
v) subjecting the sodium-type core-shell molecular sieve to ammonium and/or acid exchange, drying and calcining to obtain the hydrogen-type core-shell molecular sieve.

9. The method according to claim 8, wherein step i) comprises: adding the particulate ZSM-5 molecular sieve into a surfactant solution having a concentration by weight of 0.05-50%, contacting at a temperature of 20-70° C. for at least 0.5 h, and then filtering and drying.

10. The method according to claim 8, having one or more of the following characteristics:

the surfactant solution further comprises 0.05-10 wt % of a salt, wherein the salt is one or more selected from sodium chloride, potassium chloride, ammonium chloride and ammonium nitrate;

in step i), the weight ratio of the surfactant solution to the particulate ZSM-5 molecular sieve, on a dry basis, is 10-200:1;

the particles of the ZSM-5 molecular sieve used in step i) are composed of at least two ZSM-5 molecular sieve crystal grains, wherein the average grain size of the ZSM-5 molecular sieve crystal grains is 0.05-20 μm; the particles of the ZSM-5 molecular sieve have an average particle size of 0.1-30 μm;

the ZSM-5 molecular sieve used in step i) is a Na-type ZSM-5 molecular sieve, a hydrogen-type ZSM-5 molecular sieve or a metal ion-exchanged ZSM-5 molecular sieve;

the ZSM-5 molecular sieve used in step i) has a silica to alumina molar ratio, calculated as $SiO_2/Al_2O_3$, of 10-∞, and the surfactant used in step i) is at least one selected from polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, and tetrabutylammonium hydroxide.

11. The method according to claim 8, wherein step ii) comprises: adding the ZSM-5 molecular sieve material I into the slurry comprising the particulate β molecular sieve, and contacting for at least 0.5 hours at 20-60° C., then filtering and drying.

12. The method according to claim 8, having one or more of the following characteristics:

the concentration of the β molecular sieve in the slurry comprising the particulate β molecular sieve used in step ii) is 0.1-10 wt %;

in step ii), the weight ratio of the slurry comprising the particulate β molecular sieve to the ZSM-5 molecular sieve material I, on a dry basis, is 10-50:1;

the particles of the β molecular sieve used in step ii) are composed of at least one β molecular sieve crystal grain, and the average grain size of the β molecular sieve crystal grain is 10-500 nm; and the silica to alumina mole ratio, calculated as $SiO_2/Al_2O_3$, of the β molecular sieve used in step ii) is 10-500.

13. The method according to claim 8, wherein in step iii), $R/SiO_2$=0.1-10:1, $H_2O/SiO_2$=2-150:1, $SiO_2/Al_2O_3$=10-800:1, and $Na_2O/SiO_2$=0-2:1, wherein R represents the template, $SiO_2$ represents the silicon source calculated as $SiO_2$, $Al_2O_3$ represents the aluminum source calculated as $Al_2O_3$, $Na_2O$ represents the alkali source calculated as $Na_2O$.

14. The method according to claim 8, wherein the crystallization of step iv) is performed at a temperature of 50-300° C. for 10-400 h; or in step iv), the weight ratio of the pre-crystallized synthesis liquid III to the ZSM-5 molecular sieve material II, on a dry basis, is 2-10:1.

15. A catalyst, comprising, on a dry basis and based on the weight of the catalyst, 30-85 wt % of a carrier, 5-50 wt % of the phosphorus- and metal-containing core-shell molecular sieve according to claim 1, and 0-55 wt % of an additional molecular sieve.

16. The catalyst according to claim 15, suitable for the catalytic cracking of light hydrocarbons, wherein the catalyst comprises, on a dry basis, 50-85 wt % of a carrier and 15-50 wt % of the phosphorus- and metal-containing core-shell molecular sieve, wherein the carrier comprises one or more selected from clay, alumina, silica and aluminophosphate; optionally, the carrier further comprises an additive that is one or more selected from phosphorus oxides and alkaline earth metal oxides.

17. The catalyst according to claim 15, suitable for the catalytic cracking of hydrogenated LCO, wherein the catalyst comprises, on a dry basis, 50-85 wt % of a carrier and 15-50 wt % of the phosphorus- and metal-containing core-shell molecular sieve, the carrier comprises a silicon-based matrix comprising an additive selected from boron oxide, aluminum oxide, magnesium oxide, zirconium oxide, and combinations thereof, and the additive is present in an amount of 5-50 wt %, calculated as the oxide and based on the dry weight of the additive-containing silicon-based matrix.

18. The catalyst according to claim 15, suitable for the production of gasoline and light olefins by catalytic cracking of heavy oil, wherein the catalyst comprises, on a dry basis, 30-79 wt % of a carrier, 5-15 wt % of the phosphorus- and metal-containing core-shell molecular sieve, 15-45 wt % of the Y molecular sieve, and 1-10 wt % of the molecular sieve having a pore opening diameter of 0.65-0.70 nm, the carrier is selected from alumina sol, zirconia sol, pseudo-boehmite, silica sol, clay, and combinations thereof.

19. A process for the catalytic conversion of a hydrocarbon-containing feedstock, comprising a step of contacting the hydrocarbon-containing feedstock with the catalyst according to claim 15.

* * * * *